(12) United States Patent
de Strulle

(10) Patent No.: US 7,604,732 B2
(45) Date of Patent: *Oct. 20, 2009

(54) ENVIRONMENTALLY-NEUTRAL PROCESSING WITH CONDENSED PHASE CRYOGENIC FLUIDS

(76) Inventor: Ronald de Strulle, 159 Crane Rd., Carmel, NY (US) 10512

( * ) Notice: Subject to any disclaimer, the term of this patent is extended or adjusted under 35 U.S.C. 154(b) by 1 day.

This patent is subject to a terminal disclaimer.

(21) Appl. No.: 11/839,077

(22) Filed: Aug. 15, 2007

(65) Prior Publication Data

US 2009/0044840 A1    Feb. 19, 2009

(51) Int. Cl.
*E02B 15/04* (2006.01)

(52) U.S. Cl. .................. 210/143; 210/198.1; 210/242.3; 210/177; 210/923; 62/52.1

(58) Field of Classification Search .................. 210/104, 210/143, 170.09, 170.11, 177, 198.1, 242.3, 210/923; 62/52.1
See application file for complete search history.

(56) References Cited

U.S. PATENT DOCUMENTS

| | | |
|---|---|---|
| 2,330,508 A | 9/1943 | McColl |
| 3,338,414 A | 8/1967 | Lefke et al. |
| 3,614,873 A | 10/1971 | Cole et al. |
| 3,643,804 A | 2/1972 | Sharpton |
| 3,700,108 A | 10/1972 | Richards |
| 3,766,583 A | 10/1973 | Phelps |
| 3,979,953 A | 9/1976 | Johns |
| 4,031,707 A | 6/1977 | Ross et al. |
| 4,043,140 A | 8/1977 | Wendt et al. |
| 4,060,487 A | 11/1977 | Samsel |
| 4,061,569 A | 12/1977 | Bennett et al. |
| 4,129,431 A | 12/1978 | Ross et al. |
| 4,153,537 A | 5/1979 | Ross et al. |
| 4,153,555 A | 5/1979 | Acker et al. |
| 4,157,016 A | 6/1979 | Wendt et al. |
| 4,223,536 A | 9/1980 | Ross et al. |
| 4,356,094 A | 10/1982 | Ross |
| 4,409,034 A | 10/1983 | Williams |
| 4,420,400 A | 12/1983 | Weitzen |
| 4,456,536 A | 6/1984 | Lorenz et al. |

(Continued)

FOREIGN PATENT DOCUMENTS

GB    2007747    5/1979

(Continued)

OTHER PUBLICATIONS

Souda, "Hydrophobic hydration of alkanes: Its implication for the property of amorphous solid water," Journal of Chemical Physics 121(18):8676-8679, Nov. 8, 2004.

(Continued)

*Primary Examiner*—Christopher Upton
(74) *Attorney, Agent, or Firm*—Fish & Richardson P.C.

(57) ABSTRACT

Systems, methods and apparatus are provided for utilizing a substantially condensed phase cryogenic fluid for the purpose of remediation and retrieval of, e.g., spilled crude oil and other "oil spill"-related products from marine/aquatic and terrestrial environments. In some implementations, systems and apparatus are provided for applying a substantially condensed phase cryogenic fluid to a volume of spilled oil, and further having structure for collecting the spilled oil. Some implementations are environmentally-neutral. Substances other than oil may be remediated as well.

46 Claims, 23 Drawing Sheets

U.S. PATENT DOCUMENTS

| | | | |
|---|---|---|---|
| 4,491,484 | A | 1/1985 | Williams |
| 4,492,001 | A | 1/1985 | Hedrenius |
| 4,575,426 | A | 3/1986 | Littlejohn et al. |
| 5,045,216 | A | 9/1991 | Eller |
| 5,075,014 | A | 12/1991 | Sullivan |
| 5,143,629 | A | 9/1992 | Link |
| 5,160,638 | A | 11/1992 | Petkovic |
| 5,632,150 | A * | 5/1997 | Henzler ..................... 62/52.1 |
| 5,948,266 | A | 9/1999 | Gore et al. |
| 6,233,949 | B1 | 5/2001 | Baker |
| 6,269,763 | B1 | 8/2001 | Woodland |
| 6,945,187 | B1 | 9/2005 | Woodall et al. |
| 2006/0283977 | A1 | 12/2006 | Macdonald |

FOREIGN PATENT DOCUMENTS

| | | |
|---|---|---|
| WO | WO9904101 | 1/1999 |

OTHER PUBLICATIONS

Tanaka & Koga, "Formation of ice nanotube with hydrophobic guests inside carbon nanotube," The Journal of Chemical Physics 123:094706-1-094706-6, 2005.

Koga et al., "Ice nanotube: What does the unit cell look like?," Journal of Chemical Physics 113(12): 5037-5040, Sep. 22, 2000.

Koga & Tanaka, "Phase diagram of water between hydrophobic surfaces," The Journal of Chemical Physics, 122:104711-1-104711-10, 2005.

Bai et al., "Ab initio studies of quasi-one-dimensional pentagon and hexagon ice nanotubes," Journal of Chemical Physics 118(9):3913-3916, Mar. 1, 2003.

United States Patent and Trademark Office Action dated Feb. 17, 2009 for U.S. Appl. No. 11/839,077.

United States Patent and Trademark Office Action dated Feb. 19, 2009 for U.S. Appl. No. 11/839,126.

United States Patent and Trademark Office Action dated Feb. 25, 2009 for U.S. Appl. No. 11/839,178.

Office Action of Apr. 2, 2009 U.S. Appl. No. 11/839,338, filed Aug. 15, 2007 (005001).

Office Action of Mar. 25, 2009 U.S. Appl. No. 11/839,196, filed Aug. 15, 2007 (009001).

Office Action of Mar. 25, 2009 U.S. Appl. No. 11/839,233, filed Aug. 15, 2007 (010001).

Financial Products Offered by the African Development Bank; Brochure of ADP Group dated Jun. 24, 2005 (pp. 1-37).

Bhattacharjee, Yudhijit; Pioneers to Feed Africa; Science vol. 318 Nov. 23, 2007 pp. 1223.

Putt, Ron; Submitted by Center for Microfibrous materials Manufacturing (CM3) Department of Chemical Engineering; Auburn University, "Algae as a Biodiesel Feedstock: A Feasibility Assessment"; pp. 1-47.

Butunyi, Cosmas; Kenya: Fresh Worries over Hyacinth that Sunk in Lake Victoria; AllAfrica.com; Sep. 16, 2008; pp. 1-2.

Alternative Fuels: Biodiesel; http://www.epa.gov/smartway; EPA420-f06-044; Oct. 2006; pp. 1-2.

Aquarius Systems; The Solution re LVEMP Lake Victoria Environmental Management Project; pp. 1-3.

Zelkowitz; Rachel; "Bells Ring for First U.S. Carbon Auction"; ScienceNOW Daily News; Sep. 29, 2008; pp. 1-2.

TheBioenergySite News Desk; Potential of Water Hyacinth in Biofuel Production; Nov. 13, 2008; pp. 1-2.

Nrel; "Research Advances Cellulosic Ethanol; Enabling total control of ethanol production" ; National Renewable Energy Laboratory; Mar. 2007; pp. 1-8.

Nrel; "From Biomass to Biofuels; How Biofuels are Produced" ; National Renewable Energy Laboratory; Mar. 2007; pp. 1-6.

Scott, Elinor et al.; "Biomass in the manufacture of industrial products— the use of proteins and amino acids"; Appl Microbiol Biotechnol (2007) 75: 751-762.

Cho, Adrian; "Profile: James Dumesic—Catalyzing the Emergence of a Practical Biorefinery"; Science vol. 315 Feb. 9, 2007; p. 795.

Marland, Greg et al..; "The Carbon Benefits of Biofuels" Science vol. 318 Nov. 16, 2007; pp. 1065-1068.

Dodds, David R. et al.; "Chemicals From Biomass"; Science vol. 318; Nov. 23, 2007; pp. 1250-1251.

Ghazarian, V. et al.; Universal molecule injector in liquid helium: Pulsed cryogenic doped helium droplet source; Review of Scientific Instruments; vol. 73, No. 10; Oct. 2002; pp. 3606-3613.

Whitesides, George M. et al.; "Don't Forget Long-Term Fundamental Research in Energy"; Science vol. 315; Feb. 9, 2007 p. 796-798.

Eichhornia Crassipes (mart.) Solms-Laub.; Waterhyacinth p. 48-49.

Eichhornia Crassipes (mart.) Solms-Laub.; Waterhyacinth ; James A. Duke. Handbook of Energy Crops. Unpublished 1983 p. 1-7.

Kintisch, Eli; The Greening of Synfuels; Science; vol. 320; Apr. 18, 2008; p. 306-308.

Bernstein, Lenny et al.; Climate Change 2007 Synthesis Report Summary for Policymakers p. 1-22.

Solomon, S., D et al.; Climate Change 2007, The Physical Science Basis; IPPC. 2007; Contribution of Working Group I to the Fourth Assessment Report of the Intergovernmental Panel on Climate Change; Cambridge University Press, Cambridge UK and NY USA 996pp p. 1-10.

Parry, M.L. et al.; IPCC, 2007: Summary for Policymakers. In: Climate Change 2007: Impacts, Adaptation and Vulnerability. Contribution of Working Group II to the Fourth Assessment Report of the Intergovernmental Panel on Climate Change; Cambridge University Press, Cambridge UK.

Metz, B et al.; IPPC, 2007: Summary for Policymakers. In: Climate Change 2007: Mitigation. Contribution of Working Group III to the Fourth Assessment Report of the Intergovernmental Panel on Climate Change; Cambridge University Press, Cambridge UK.

Bates, B.C., et al.; Climate Change and Water. Technical Paper of the Intergovernmental Panel on Climate Change, IPCC Secretariat, Geneva, 210pp.

Nyanza Gulf Communities (Kenya), et al., (Plaintiffs) vs. The World Bank, and Lake Victoria Environmental Management Project (LVEMP), et al. (Defendants); Sep. 1999; 1-10.

Dr. Faustino L. Orach-Meza and Dr. Tom Okurut; Background to the Preparatin of the Second Phase of the Lake Victoria Environmental Management Project (LVEMP-II); Regional Stakeholders' Workshop on Launching of the Preparation of the LVEMP Phase Two (LVEMP-II); Jan. 2005 1-36.

Dr. Faustino L. Orach-Meza and Dr. Tom Okurut; Background to the Preparation of the Second Phase of the Lake Victoria Environmental Management Project (LVEMP-II); Regional Stakeholders' Workshop on Launching of the Preparation of the LVEMP Phase Two (LVEMP-II); Jan. 2005; 1-22.

Grom, Jackie; Malaria Forecast Varies by Temperature; Findings, The Science Magazine news Blog; Feb. 15, 2009.

Roberts; Leslie; New Malaria Plan Called Ambitious By Some, Unrealistic by Others; Science vol. 322; Oct. 3, 2008; p. 26-27.

Roberts; Leslie and Enserink, Martin; Did they Really Say . . . Eradication?; Science vol. 318; Dec. 7, 2007; p. 1544-1545.

Remick, Dr. Robert J.; Many Pathways to Renewable Hydrogen; Power Gen: Renewable Energy and Fuels 2008 conference held Feb. 19-21, 2008 in Las Vegas, Nevada; p. 1-23.

Biorefineries; The Biomass Economy; NREL/JA-810-31967; Jul. 2002 p. 1-4.

Ogoch, Ojwang; Un in Sh56m Kisumu Conservation Project; Capital Business; Feb. 12, 2009; Cap[ital Business Capital Group Limited.

The Marrakech Process; Providing Solutions to Climate Change Mitigation through Sustainable Consumption and Production; United Nations Department of Economic and Social Affairs United Nations Environment Programme.

Biological Control of Invasive Plants; University of Florida; Aquatic, Wetland and Invasive Plant Information Retrieval System.

Aquatic, Wetland and Invasive Plant Particulars and Photographs, University of Florida Center for Aquatic and Invasive Plants.

Non-Native Invasive Aquatic Plants in the United States Center for Aquatic and Invasive Plants, University of Florida and Sea Grant; Eichhornia Crassipes (Mart.) Solms; Water Hyacinth pp. 1-6.

Himmel, Michael E. et al.; *Biomass Recalcitrance: Engineering Plants and Enzymes for Biofuels Production*; www.sciencemag.org; Science; vol. 315; Feb. 9, 2007, pp. 804-807.

Cho, Adrian; *Profile: James Dumesic—Catalyzing the Emergence of a Practical Biorefinery*; www.sciencemag.org; Science; Vo.l 315; Feb. 9, 2007; pp. 795.

Whitesides, George M. and Crabtree, George W.; *Don't Forget Long-Term Fundamental Research in Energy*; www.sciencemag.org; Science; vol. 315; Feb. 9, 2007; pp. 796.

Goldemberg; Jose; *Ethanol for a Sustainable Energy Future*; www.sciencemag.org; Science; vol. 315; Feb. 9, 2007; pp. 808-810.

Kintisch, Eli; *Profile: Clint Chapple—How to Make Biofuels Truly Poplar* www.sciencemag.org; Science; vol. 315; Feb. 9, 2007; pp. 786.

Service, Robert F.; *Profile: Daniel Nocera—Hydrogen Economy? Let sunlight Do the Work*; www.sciencemag.org; Science; vol. 315; Feb. 9, 2007; pp. 789.

Clery, Daniel; *Profile: Steven Koonin—Guiding an Oil Tanker Into Renewable Waters*; www.sciencemag.org; Science; vol. 315; Feb. 9, 2007; pp. 790.

Schrag, Daniel P.; *Preparing to Capture Carbon*; www.sciencemag.org; Science; vol. 315; Feb. 9, 2007; pp. 812-813.

Potocnik, Janez; *Renewable Energy Sources and the Realities of Setting an Energy Agenda*; www.sciencemag.org; Science; vol. 315; Feb. 9, 2007; pp. 810-811.

Service, Robert F.; *Profile: Jay Keasling—Rethinking Mother Nature's Choices*: www.sciencemag.org; Science; vol. 315; Feb. 9, 2007; pp. 793.

Clery, Daniel; *A Sustainable Future, If we pay up front*; www.sciencemag.org; Science; vol. 315; Feb. 9, 2007; pp. 782-783.

Koenig, Robert; *Meeting of Research Leaders Spotlights African Development, Disaster Planning*; www.sciencemag.org; Science; vol. 322; Oct. 10, 2008; pp. 178-179.

Dodds, David R. And Gross, Richard A.; *Chemicals from Biomass*; www.sciencemag.org; Science; vol. 318; Nov. 23, 2007; pp. 1250-1251.

Aigner, et al; *Incurring Carbon Debs in Biofuel Production*; www.sciencemag.org; Science; vol. 319; Feb. 29, 2008; pp. 1157.

Kintisch, Eli; *The Greening of Synfuels*; www.sciencemag.org; Science; vol. 320; Apr. 18, 2008; pp. 178-179.

Holm, L.G. et al.; *The worlds worst weeds*; CAB International abstract database; pp. 1-3 (article 1).

Enserink, Martin; *The Mosquito Paradox*; ScienceNOW Daily News; Jul. 17, 2008, pp. 1-4.

The Oil Drum Mission Statement Peak Oil Overview; Nov. 2008; C:\Documents and Settings\jsm\Local Settings\Temporary Internet Files\OLK35\Oil Drum_Energy and Our Future.htm (pp. 1-9); this work licensed under a Creative Commons Attribution-Share Alike 3.0 United States License.

Kintisch, Eli; *Tropical Biofuels Getting Less and Less Green*; ScienceNOW Daily News; Jul. 9, 2008; pp. 1-3.

Mervis, Jeffrey; *Tax Credit Extension Is Silver Lining for Science*; www.sciencemag.org; Science; vol. 322; Oct. 10, 2008; pp. 181.

Bhattacharjee,, Yudhijit; *Panel Provides Peer Review of Intelligence Research*; www.sciencemag.org; Science; vol. 318; Dec. 7, 2007; pp. 15358.

Ward, Marsha D.W. et al; et al; Benefits and Risks in Malaria Control; www.sciencemag.org; Science; vol. 310; Oct. 7, 2005; pp. 49.

PCT/US2007/076145 -International Search Report dated Jun. 16, 2009.

\* cited by examiner

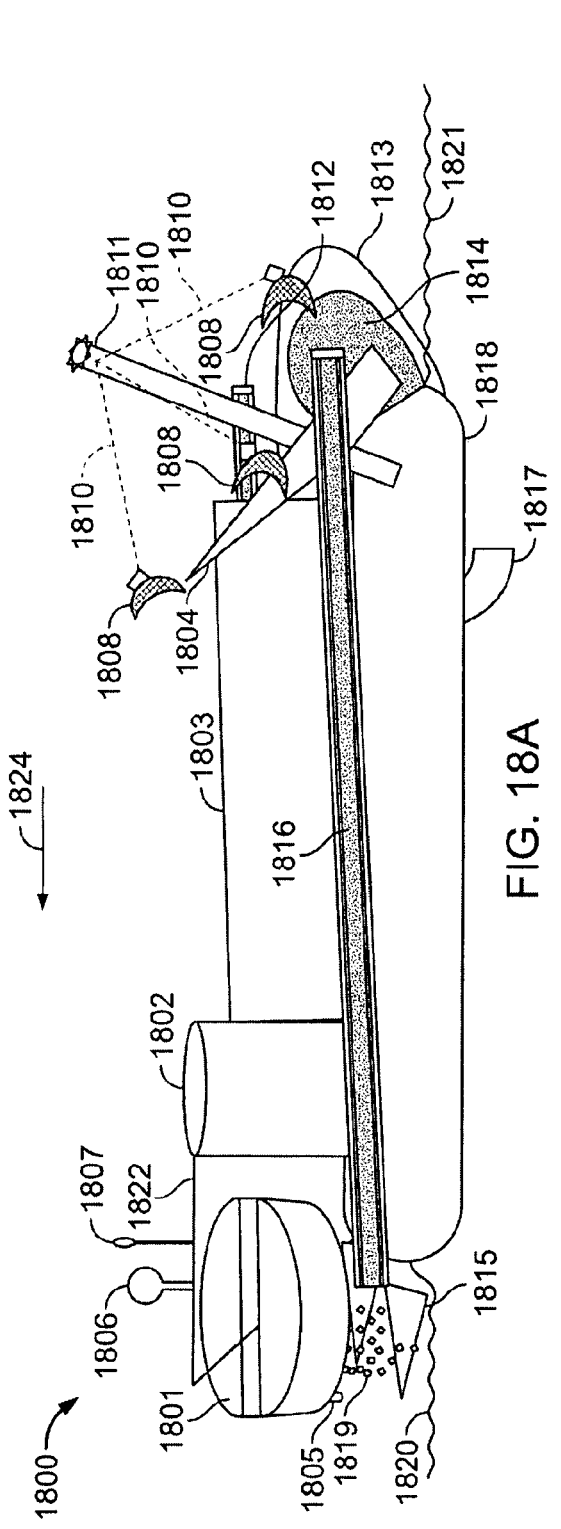
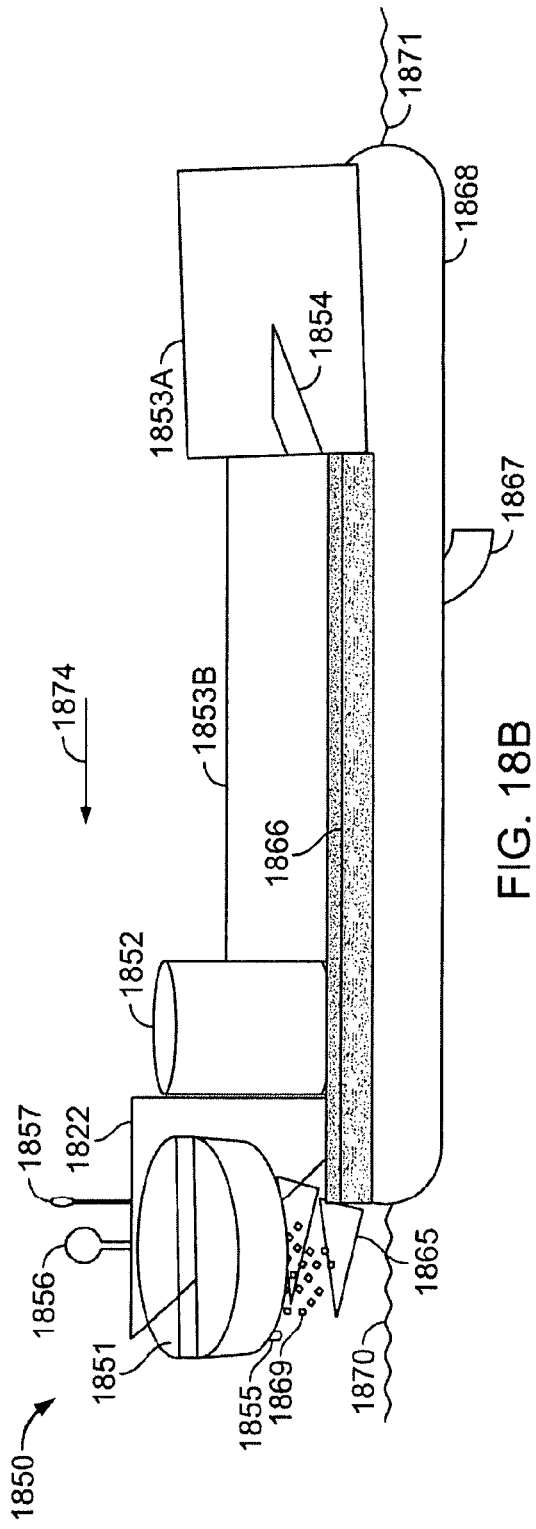
FIG. 18A
FIG. 18B

ENVIRONMENTALLY-NEUTRAL PROCESSING WITH CONDENSED PHASE CRYOGENIC FLUIDS

TECHNICAL FIELD

This disclosure relates to environmentally-neutral processing with condensed phase cryogenic fluids (CPCF).

BACKGROUND

In the wake of the 1989 Exxon Valdez oil spill, numerous measures were taken in attempt to cleanup the spill. A trial burn was conducted during the early stages of the spill, in a small region of the spill isolated from the rest by a fire-resistant boom. The test was of questionable success, and because of unfavorable winds and weather (e.g., regional meteorological dynamics), and the negative potential impact on air quality and the general environment (e.g., as effects to Nature) no additional burning was attempted during the next 16 years of this (ongoing) cleanup effort. Mechanical cleanup was started shortly afterwards using booms and skimmers, but technical problems due to the thickness of the oil layer and kelp that tended to clog the equipment, became a serious issue. On Mar. 24, 1989, a private company was retained to apply a dispersant, using a helicopter and dispersant buckets. The results and/or findings showed, however, that there was insufficient wave action to mix the oil and the dispersant, and use of this method was also discontinued. Degradation and byproducts from additive dispersants and/or reactions with oil constituents and petroleum derivatives, became a concern to many. Another concern arose from the fact that the skimmers could not be made readily available during the critical first 24 hours after the spill, i.e., a crucial period for response time, in dealing with wildlife and fragile ecosystems.

Working with the U.S. Coast Guard, who officially led the response, Exxon mounted a cleanup effort that is said to have exceeded in cost, scope, and thoroughness, any previous oil spill cleanup operation. In addition to the Exxon employees, more than 11,000 Alaska residents worked throughout the region, helping to restore the environment. Three years after the event of the spill, in 1992, the Coast Guard declared the cleanup complete. However, to this day, many environmental problems remain, and wildlife are still recovering from this disaster.

The Exxon-Valdez case, along with the standard practices for dealing with oil-spills, and the results of clean-up operations and remediation efforts in subsequent spills, indicate that the current methodologies and technologies used in dealing with spills of crude oil and its derivatives are far from ideal. The impacts to our environment and local ecology, resulting from oil-spills, are significant, and remain a serious problem.

The problem, to a large degree, is due to the natural properties of the oil or pollutant substrate itself: its immiscibility, its tendency to disperse over aqueous surfaces (or to form thin films), its viscosity (e.g., that results in the smothering of aquatic birds and mammals, or clinging to coastal rocks), its potential toxicity, and the nature and/or longevity of these pollutant effects. Additionally, spilled oils can vary from low viscosity fluids containing (in various parts) volatile and/or combustible moieties, to highly-viscous and very gummy or tar-like products. Thus, oil and other immiscible pollutant substances are difficult to handle and effectively remove, both from the body of water where the spill occurs, and from surrounding environmental areas, e.g., beaches, rocks, and other natural habitats.

SUMMARY

In an aspect of the invention, system, method and/or apparatus are provided for utilizing a substantially condensed phase cryogenic fluid for the purpose(s) of clean-up, retrieval, and/or removal of, e.g., spilled crude oil, processed oils, petroleum byproducts and derivatives, lipid-based pharmaceuticals, reactive chemicals, toxic or noxious waste, and/or spills of other hydrophobic or immiscible products from marine/aquatic and terrestrial environments, and the remediation of those environments. Substances other than oil may be remediated as well. In some implementations, designs for vessels, remediation systems, sparging units and other apparatus are provided for use in the delivery, distribution, and/or application of the substantially condensed phase cryogenic fluid to a volume of spilled oil or other immiscible substance, along with structures for collecting, storing, and removing the sequestered oil or other materials spilled, and instruments for "real-time" testing/monitoring of spill conditions, pollutant wastes, and/or efficiency of the remediation operation. Some implementations are environmentally-neutral.

BRIEF DESCRIPTION OF DRAWINGS

FIG. 18A illustrates an example of a remediation apparatus.
FIG. 18B illustrates an example of a remediation apparatus.

DETAILED DESCRIPTION

Figure 1:
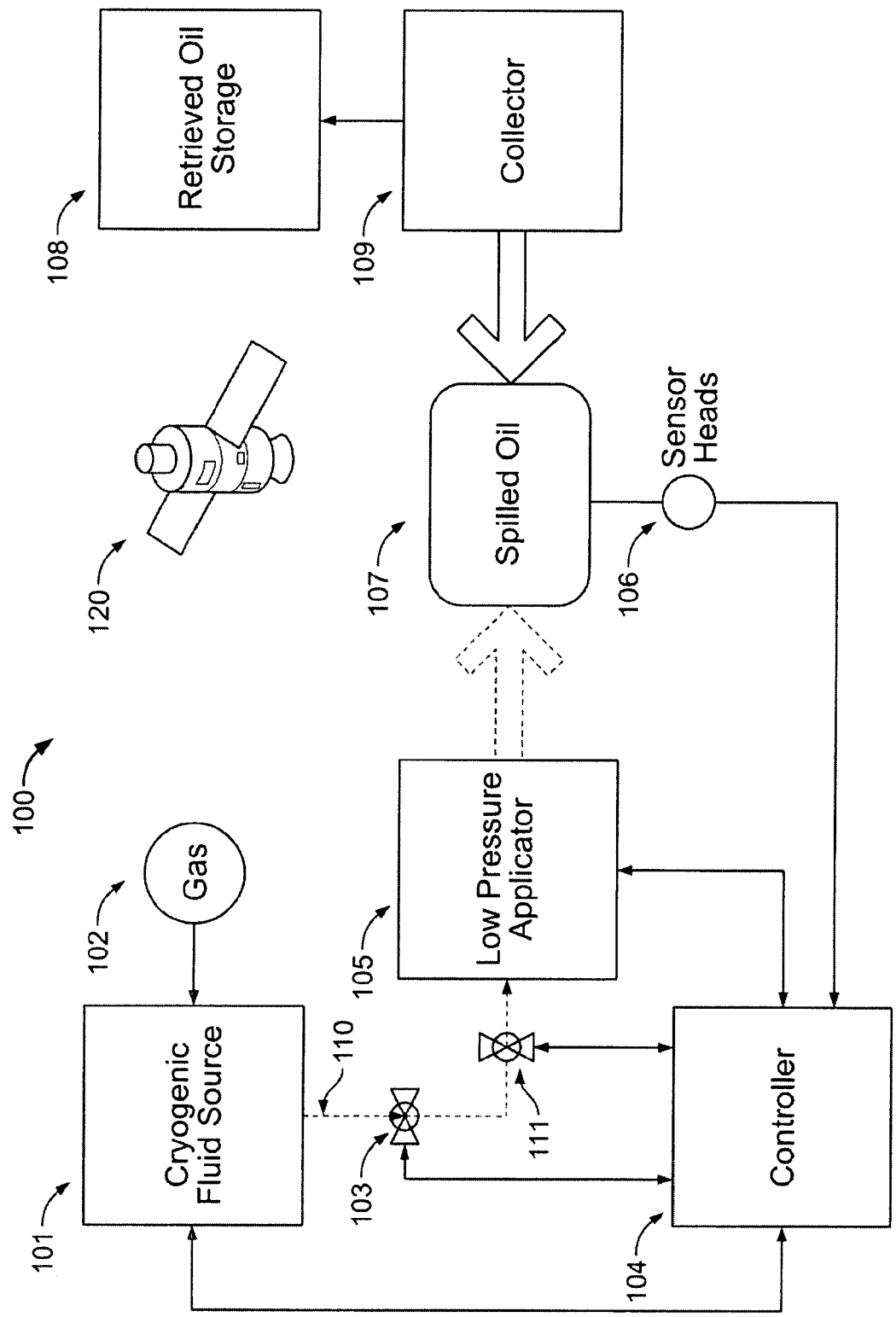
FIG. 1 illustrates an example of a remediation system.

The following is a description of preferred implementations, as well as some alternative implementations, of systems, methods and apparatus for environmentally-neutral processing using substantially condensed phase cryogenic fluids (CPCF). An environmentally-neutral technology or remediation operation may be considered one that neither employs as an active agent in any clean-up process or remediation operation, nor transports to the spill site or remediation environment for use as such an active agent, any material that is not natural or "normal to" (i.e., normally found in), and/or already present in that environment or ecosystem.

Moreover, this disclosure relates to, e.g., the clean-up of crude oil, processed oils, and other forms of spilled oils, lipid-based pharmaceuticals, and/or other hydrophobic or immiscible substances; it further relates to such corollary areas as containment, confinement, and removal of such hazardous pollutant and/or spilled substrates; as well as certain methodologies for critical response in cases of terrorist threats, and/or events involving deployment of harmful reactive chemicals, radiological, and/or biological agents.

CPCF such as the saturated liquid states or condensed phases of liquefied air, liquefied nitrogen, liquefied helium, argon, etc. can provide viable methods for use in oil-spill clean-up and retrieval operations, environmental remediation, and other applications.

Processes using CPCF have multiple applications in the remediation of small-to-large scale spills of crude oil, hydrocarbons and petroleum byproducts, and/or other immiscible substrates (as noted above, and discussed further below) from the open oceans, coastal waters, inland waterways, and other marine or aquatic bodies. CPCF processes are also well-suited for use in fragile ecosystems and boundary areas, e.g., ranging from estuaries, wetlands, and wildlife preserves, to beaches, parks, and rocky shoreline areas, as well as for terrestrial areas (where they are applicable for both miscible and immiscible substances), e.g. refineries, power plants, pipelines, airports. Other independent applications are for extinguishing oil-well and oil-field fires, incendiaries, and extreme (high intensity or high velocity fires); in dealing with hazardous corrosive and/or reactive chemicals, noxious and toxic waste, as well as harmful biological, chemical, and radiological agents, e.g., caused by willful deployments and/or terrorist threats.

A feature common to CPCF techniques, in some implementations, is that the methods, systems and apparatus are environmentally-neutral. Environmental neutrality, or environmentally-neutral remediation is consistent with sustainability. Put another way, an environmentally-neutral process or remediation operation neither employs as an active agent in any clean-up process or environmental remediation operation, nor transports to spill site for use as an active remediant, any material that is not natural or "normal" to (i.e., normally found to be present) and/or already present in that environment or ecosystem.

For example, some techniques utilize liquefied nitrogen and/or liquefied air. Only the phase, or state, from a gas to a condensed liquid, is changed. The mere introduction of air (or re-introduction of the air that has been liquefied) leaves behind nothing that is not "normal" to that environment, and/or that was not already in the ecosystem. Likewise, nitrogen is the predominant component of air, and therefore, its presence also is environmentally-neutral. In some implementations, the liquefied nitrogen or liquefied air is made on-site.

Overview and Fundamentals

The following includes a description of some general principles relevant to some implementations, and some potentially relevant scientific bases for those general principles.

Generally speaking, low temperature liquefied gases (e.g., liquid air, nitrogen, carbon dioxide, neon, argon, helium) can be used to freeze oil and other immiscible substances which have been spilled into a salt water (e.g., oceanic) or fresh water (e.g., aquatic) environment. An important issue, however, is whether or not oil or immiscibles frozen by such a method will remain in a solid form long enough for it to be effectively handled and removed from the spill area in an economical and technologically viable manner. Given the thermodynamic, fluid mechanical, chemical, and physical properties of the substances involved (e.g., the spilled oil or immiscible substrate, the resultant viscous or solid product, the fluid and thermodynamic properties of the water environment, and effects of the addition of cryogenic fluids upon it, the qualitative physical properties of the various cryogenic gases, etc.), particular methods, systems and apparatus are disclosed for using and applying condensed phase cryogenic fluid ("CPCF") to the spill area and retrieving the solid mixed phase (frozen ice-oil) or solid composite of water-ice and an immiscible pollutant.

Given the relevant chemical and thermodynamic properties, most implementations, facilitate the delivery and distribution of a saturated liquid or condensed phase cryogenic fluid (e.g., liquefied nitrogen in a saturated-liquid state). It is desirable, in most implementations, to maximize the percentage of condensed phase cryogenic fluid distributed to the spilled oil. One manner of achieving this is delivering the CPCF to the substrate at atmospheric pressure. Based upon these chemical and thermodynamic properties, the availability, ease/difficulty of production and transportation, and the relative costs of applicable cryogenic fluids, most implementations utilize the saturated liquid or condensed phase of liquefied nitrogen and/or liquefied air. Both of these can be either produced directly at the spill site (e.g., on board a suitable vessel or barge) or transported to the spill site (e.g., in tankers, via helicopters and aircraft, by trucks, or otherwise).

Delivering a saturated liquid or condensed phase cryogenic fluid causes significant chemical and physical changes in the hydrophobic substrates (e.g., crude oils, crude or processed oil byproducts, hydrocarbons and petroleum derivatives, lipids or other immiscible substrates), in the lattice structure of the water ice, and/or the solid phase dynamics of the frozen ice-oil composite. These changes may suggest the role of hydrophobicity in the viscous agglomeration, accretion and encapsulation, and/or sequestration by lattice uptake, of such hydrocarbons, lipids and/or immiscibles, as well as in the maximization of the 'oil'-to-water ratio in the cleanup and remediation of these spilled oils and immiscible substrates from marine/aquatic bodies, terrestrial systems, beaches and rocky shorelines, and estuarine and other fragile ecosystems (e.g., wetlands and migratory wildlife refuges). Such processing via use of CPCF in land-based or terrestrial systems, however, is not in any way limited or constrained to hydrophobic or immiscible substances, and is applicable generally.

The chemical and/or physical changes are cryogenically induced in the environment to affect: a) the hydrophobic substrates (e.g. crude oils) or immiscibles being remediated, in terms of substantial increases in the viscosity and mean density (thus resulting in the observed increases in manageability) of these substrates via hydrophobic effects; b) the structure of the bulk 'water' ice, as it undergoes lattice changes; and/or c) the solid phase dynamics of the mixed-state (frozen) oil-ice composite. The nature of the frozen oil-ice composite is affected by the structure of the bulk water ice as it goes through several lattice changes. At least two of these lattice changes relate to changes in the crystalline form (geometry) of the ice, whereas two are transitions to amorphous solid states. Such changes are a function of the rapid decrease in temperature produced via the application of the saturated liquid phase of a cryogenic fluid (e.g., liquefied nitrogen or air that is in a liquid state rather than a vapor or mixed-state). These changes may be induced to facilitate clean-up of the spilled substrate and remediation of the environment.

These changes in hydrophobicity (chemical) and in lattice (crystal) or solid-phase structure (physical) of the material substances being remediated, in the aqueous medium or bulk fluid, and in the composite material being removed (e.g., the oil-ice composite)—result in three independent methodologies or technologies for the clean-up of oil-spills and other pollutant wastes:
  a) viscous agglomeration;
  b) accretion and encapsulation; and
  c) sequestration by lattice uptake.

These three methodologies can be employed strategically, upon consideration of the specific properties of the pollutant materials to be remediated and/or the conditions of the operating environment. Thus, some implementations provide a choice of methodologies that are specific to a given substrate, or class of hydrophobic substrates, and/or to particular spill conditions, and yield the capacity for increased facility in the sequestration, transport, and removal of such pollutant materials; thus providing, generally, for the easier and quicker clean-up of spilled oil and other immiscible substrates. Generally speaking, heavier weight oils are better suited to viscous agglomeration and accretion and encapsulation, whereas lighter oils are better suited to sequestration by lattice uptake.

Put simply, viscous agglomeration refers to the increase in viscosity and density of the immiscible substrate upon application of the condensed phase cryogenic fluid. The viscosity of the immiscible substrate increases to the point that it can be handled as or like a solid. This is due to the hydrophobic effect, where the immiscible substrate "balls-up" and repels the aqueous or hydrophilic bulk medium. Accretion and encapsulation, like viscous agglomeration, is based on the hydrophobic characteristics of the immiscible substrate—i.e., where upon application of CPCF, the immiscible substrate gathers together and thickens, or agglomerates, repelling the surrounding water or aqueous bulk medium, and producing a meniscus. Application of additional CPCF yields further cooling of the viscous agglomerate, and its accretion to an even denser (more compactified) substance. The meniscus thus appears, first, as the viscous agglomerate; which then, upon further application of CPCF, as it continues to accrete, becomes encapsulated within a mass of solid water-ice as the temperature of the aqueous bulk medium is reduced (locally). With lighter weight oils and immiscibles, i.e., where the hydrophobic effects (and thus changes in viscosity) are less pronounced, the oil or immiscible is encapsulated into the water-ice in a more liquid form (e.g., one can pick up a chunk of ice and observe pockets of the encapsulated oil or immiscible that can freely flow within the specific pockets). The immiscible substrate can then be handled as a solid (ice-oil composite); in this case an encapsulated product trapped in the solid lattice of the ice. While produced via application of CPCF in a manner similar to that of the "solid" of the thick tar-like in the case of the viscous agglomerate, the encapsulation methodology traps the oil or immiscible in regions of a bulk solid of water-ice (and remains more fluid or is accreted and becomes more viscous, depending upon the properties of the immiscible (or type of oil)); whereas in the agglomeration methodology there is no bulk ice and the oil or immiscible (usually a heavier weight or denser product) becomes sufficiently viscous or tar-like to be removed or remediated directly. Lattice uptake occurs, upon longer exposure to the CPCF, and cooling of the ice-oil mixed-state to a temperature of below approximately 100 degrees Kelvin (100 K or ≈−173° C.), and optimally when cooled to between ≈60 and 90 K (between ≈−213 and −183° C.), when the water ice undergoes a transition to an amorphous solid phase (referred to as "amorphous solid water" or "ASW"). Upon this transition in the water-ice lattice, or solid-phase dynamics of the mixed-state, the immiscible substrate is absorbed or taken-up into the pores of the amorphous structure.

The physical chemistry and/or material science of the process describes the cryogenically induced changes in the spilled oils, or other immiscible pollutant substrates; either in terms of induced hydrophobic effects that result in the viscous agglomeration, or (upon further cooling) the accretion and encapsulation of the immiscible pollutant. When additional CPCF is applied and the local temperature is reduced below the thermodynamic threshold at ca. 100 K or −173° C. (with the precise transition temperature also determined by salinity, turbidity, detrital organic carbon concentrations, and other specific properties of the bulk medium at the spill site), physical and/or material changes occur in the water-ice lattice and bulk medium; the resulting solid-phase dynamics of the oil-ice mixed state, within the amorphous water-ice structure, yield the sequestration of the spilled oil or immiscible pollutant by the process of lattice-uptake.

The foregoing scientific principles are believed by the inventor to be relevant and are discussed in the interest of providing a complete disclosure. Those principles should not be taken as limiting the implementations in any way.

FIG. 1 illustrates an implementation of a system 100 for environmentally-neutral remediation of oil-spill related contaminants and the like. The system 100 may effect viscous agglomeration of the spill substrate, or its accretion and encapsulation, and/or sequestration via lattice uptake. The system includes a condensed phase cryogenic fluid source 101. The CPCF source 101 is, in some implementations, one or more insulated vessels that are adapted to keeping the contents in the liquid state along with a pump to control the pressure in the supply pipe 110. One example of an implementation of a cryogenic fluid source 101 includes a Dewar jar or vacuum flask. Such vessels are often used to store liquids which become gaseous at well below ambient temperature, such as nitrogen. The leakage of heat into the extremely cold interior of the vessel results in a slow "boiling-off" of the liquid so that a narrow unstoppered opening, or a stoppered opening protected by a pressure relief valve, is necessary to prevent pressure from building up and shattering the flask. The excellent insulation of the Dewar flask results in a very slow "boil" and thus the contents remain liquid for a long time without the need for expensive refrigeration equipment. The escaped liquid that boils off can be captured, compressed (or otherwise cooled) and reintroduced into the vessel to reduce fluid loss.

The CPCF source 101 can contain, e.g., liquid nitrogen that was created at an industrial site and later adapted for use with the system 100. Alternatively, the CPCF source 101 can store compressed ambient gas 102, e.g., liquefied atmospheric air. One manner of converting the air into a cryogenic fluid is through the use of a multistage compressor or a cascade liquefaction system. The term "multistage compressor" can designates either a single compressor assembly with a plurality of compression stages (e.g., a multistage centrifugal compressor with a common shaft) or a series of physically separate compressor assemblies (e.g., two or more single stage compressors operatively connected in series, with the outlet of a first compressor feeding the suction inlet of a downstream compressor).

A cascade liquefaction system uses a series of refrigeration loops, each having a single refrigerant, to cool the natural gas stream to successively lower temperatures. Some cascade systems generally work as follows. The first refrigeration loop utilizes propane as the refrigerant to cool the gas to about −40° F., and to condense the refrigerant used in the second loop. The second refrigeration loop uses either ethane or ethylene as the refrigerant to cool the gas to about −120° F., and to condense the refrigerant used in the third loop. The third loop uses methane or nitrogen as the refrigerant to further cool and condense the gas. The major pieces of equipment in a cascade system are the compressors (at least one compressor for each refrigerant), a cooling water system or ambient air coolers, refrigerant accumulators, expansion valves, and numerous heat exhangers. In the interest of energy efficiency, many of the heat exchangers and other parts of the refrigeration loops may be grouped inside one or more cold boxes. Mobile (or portable) multistage compression and cascade liquefaction systems are currently available from vendors of cryogenic systems.

A controller 104 is provided to, among other things, monitor the status of the CPCF source 101. The controller 104 receives signals from the cryogenic fluid source 101 indicative of, e.g., temperature of the fluid, the rate of boil-off and/or other loss, the amount of fluid remaining, and the pressure. The controller 104 can take the form of a PC, a special purpose processor or a PLC (programmable logic controller). The controller 104 also controls the pump in the fluid source 101 so as to vary the pressure in the supply pipe 110. In some implementations, the preferred supply pipe 110 is vacuum insulated.

The valve assemblies 103 are coupled to the condensed phase cryogenic fluid source 101. The valves of 103 perform two functions: a) controlling the fluid phases, i.e. the pressures of the liquid and vapor phases of the CPCF; this assembly acts as a "keepfull," release valves for the purging of vapor (gas) phases that are generated by the heat from friction incurred in the pumping or transport of CPCF through an insulated supply pipe; and in some implementations, this component of 103 may also contain a phase-separator; b) controlling the rate of flow of CPCF from its source to the low pressure applicator 105. In some implementations, it is preferred that the controller 104 control the valve 103 such that the rate of cryogenic fluid flow can be controlled based on the conditions including the pressures of vapor and liquid phases, and/or the phase densities of the cryogenic fluid, the amount of cryogenic fluid remaining in the source 101, and the properties of the substrate (monitored by sensor heads 106).

Sensor heads 106 installed under CPCF delivery system (e.g., drizzle bar manifolds and/or sparging arrays) and may also include IR sensors, optoacoustic sensors, or the like, to determine the spill/substrate thickness, IR signatures (e.g., as FTIR or Raman spectra of molecular vibrations from each organic moiety) and/or other measurements that make the constituents of the spill, and their concentration in the spill substrate identifiable (or show their absence). The properties, e.g., thickness, densities, viscosities, and/or IR spectra of the spill components, as well as the properties of the agglomerated and/or solidified substrate (solid mixed-state) are determined and monitored. In some implementations the data and/ or measurements are also sent from the sensors to the controller 104 to control the flow and/or distribution of CPCF, operation and/or navigation, or other aspects of the remediation systems.

The sensor heads 106 may also include a GPS receiver that receives signals from one or more satellites 120 for navigational purposes.

The low pressure applicator 105 can take many forms, but in some implementations, is adapted to minimize fluctuations in pressure and flow rate, and to maintain an optimally constant pressure, at (or as close as possible to) atmospheric pressure during applications. The applicator 105 may include sparger bars, drizzle bars, spray-bars, or arrays thereof. Possible applicators are discussed in greater detail in connection with FIGS. 5-12. The line pressures for CPCF inflow and flow rate of cryogenic fluid from the applicator 105 can be controlled by the controller 104. The controller 104 can be set to a particular flow rate by a user, and can maintain that rate by controlling the pump in the fluid source 101 and/or valves or the like in the applicator 105.

Maintaining a small pressure drop during use of the applicator 105 helps to keep the applied cryogenic fluid in a condensed phase. The pressure of the liquefied nitrogen (LN) or other cryogenic fluid, as well as the allowable variability in pressure (the pressure range), is kept to a minimum throughout all stages of the operation in most implementations. Several techniques can be employed to this end:

a) To ensure the flow of a saturated liquid phase of cryogenic fluid or LN to the applicator device 105, and to maximize the delivery a condensed phase to the spill site 107 (note that spill site/contaminant 107 is not generally considered to be part of the system 100), the LN pressure at the point of emission from the fluid source 101 and within the supply pipe (or cryogenic flex conduit) 110 that carries the cryogenic fluid to the applicator 105, is controlled (e.g., by controller 104), so as to maintain the pressure between the source 101 and the inlet pressure valve of the applicator 105 at preferably <50 psi. The pressure of the LN can be controlled by controller 104 directly at the source 101, and pumped to provide a constant LN influx or inlet pressure to the applicator 105 of <50 psi (e.g., as measured at the initial pressure control valve of the device). Depending on the implementation, LN influx pressures in the range from about 35 to 50 psi are preferred, but can vary as a function of the dimensions of the low pressure applicator 105 (e.g., the length and diameter of the applicator bar(s), and/or the size and configuration of the array (or assembly) of applicator bars used (see FIG. ZOT).

b) Delivery of a condensed phase or saturated liquid by the applicator 105 is further enhanced by the use of cryogenic "keepfulls" or pressure release valves (that are set to open at a particular predetermined threshold pressure) 111, at various points along the flow path, which effectively vent off excess pressure, along with any gas phase LN (evaporated liquid). The threshold pressure can be varied by the controller 104. Also, in the case that a dangerous level of pressure arises in the supply pipe 110, the controller 104 can cause the release valve 111 to open.

c) Pressure is reduced at the inlet pressure valve so that the outflow of LN into the applicator 105 (i.e., applicator inflow pressure) is at slightly above atmospheric pressure.

d) Pressure of the LN from the applicator 105 (i.e., the outflow pressure) onto the immiscible substrate of the spill is at about atmospheric pressure.

Since LN is kept at about −195° C. (or about −320° F.), with a critical temperature of about −148° C., it partially vaporizes, even when traveling through a vacuum insulated hose (such as 110 used between the source 101 and the applicator 105), and the longer the distance of the hose 110, the greater the losses to gas. In addition, this gas can add significant amounts of pressure within the hose(s) 110, or in the applicator 105. This can create more of a two phase LN flow (liquid and vapor), and if no compensation mechanism is employed, then a large force is easily induced when the LN escapes from the applicator onto the spilled oil 107. Such a force can easily build within the system 100 (as the condensed phase expands to vapor), and the higher pressure LN exiting from the applicator 105 in the vapor phase can then readily disperse the pollutant 107, pushing it away from the cooled area, and making the remediation process much harder and longer, and more costly. Moreover, the mere release of the LN vapor phase onto the spill-site (even though it may remain and exit the sparging unit at the same temperature) generally cannot cryogenically induce the same physical and chemical effects.

With vapor phase LN, one may be able to attain some viscous agglomeration, making the oil contract and repel the water in its nexus (and this could possibly make some of the heavier types of oil, or the higher molecular weight hydrocarbons, somewhat more manageable). However, the delivery and distribution of vapor phase LN is generally unable to induce sufficient chemical change or hydrophobic effects for a full viscous agglomeration of the pollutant substrate (even with 90 weight gear oils and other more viscous substances), and is neither generally able to induce sufficient and timely physical changes in the bulk medium, as needed for the rapid formation of a water-ice lattice that is sufficiently strong (thick) for the process of accretion and encapsulation. Moreover, vapor phase LN is not generally able to cool the substrate sufficiently for its rapid transition to a solid phase, and/or to sufficiently cool any of the oil-water-ice mixed-states such that lattice uptake is not possible, even when the vapor phase LN was delivered in much larger amounts, and for longer periods of time. For example, using vapor phase LN is unable to cause any appreciable amount of accretion and encapsulation and/or lattice uptake.

Thus, the maintenance and delivery of a maximally condensed or saturated liquid cryogenic fluid (e.g., in droplets approximately the size and range of raindrops) is preferred in most implementations. To maximize the flux and delivery of condensed liquid phase LN, a low pressure applicator 105, vacuum insulated tubing 105, and/or "keepfulls" or pressure release valves 111 at or near the inflow valve of the applicator 105 can be employed. Alternately, a phase separator, in lieu of the "keepfulls" 111 can be employed to maintain an optimal flow of condensed LN. In implementations in which phase separators are utilized, the gas phase nitrogen can be circulated into the gas supply 102 and converted back into LN.

The low pressure applicator 105 applies the condensed phase LN to the spilled oil 107 (or other like spill). As discussed, this causes the properties of the oil to change such that it becomes more easily handled. A collector 109 (examples of which are discussed in connection with FIGS. 13-20) captures the oil and removes it from the spill site. The captured oil is transferred into a storage area 108. The storage area 108 may be adapted to maintain the temperature of the oil (or oil/ice) or allow it to increase. In implementations that allow the oil (or oil/ice) to increase in temperature, the storage area may have a separator that allows the oil to separate from any water (e.g., ice) that was collected by the collector 109. The water may be returned to the site after separation (e.g., after filtering or ensuring an appropriate level of purity). Moreover, the oil can then be stored in the storage area 108 for subsequent refining or other use.

Figure 2:
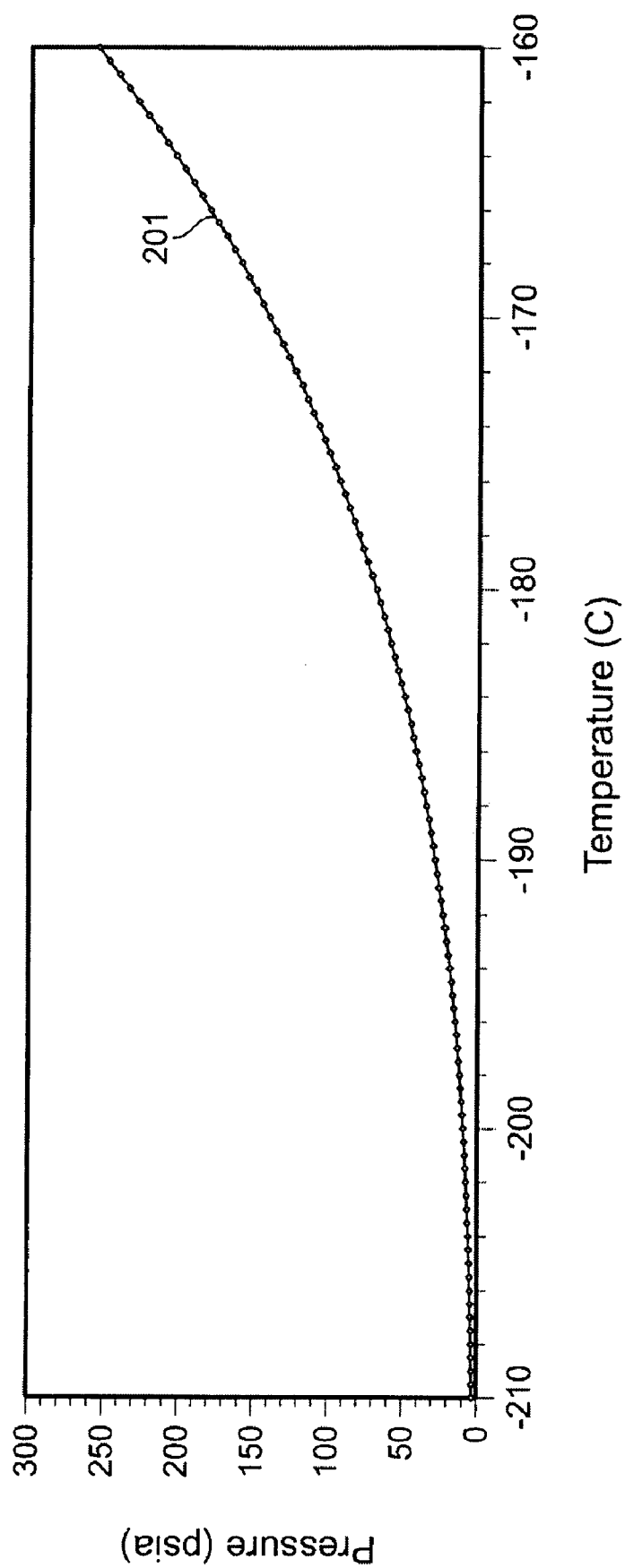
FIG. 2 illustrates certain characteristics of liquid nitrogen.

FIG. 2, which illustrates the saturation properties of nitrogen, is relevant to understanding the importance—in most implementations—of maintaining a near constant final pressure, at or very close to atmospheric pressure in the applicator 105, with minimal pressure fluctuations in the system 100. In the illustration, the Y-axis represents pressure (in PSI) and the X-axis represents temperature (in ° Celsius). The line 201 represents the saturation point of nitrogen as a function of temperature and pressure. Above the line 201, nitrogen is in a liquid phase. Below the line 201, nitrogen is in a gas phase. Thus, if the temperature of nitrogen is maintained at about −195° C., it must be kept at a pressure of at least about 21 PSI to maintain the liquid state or condensed phase. A higher pressure is preferred in some implementations. Thus, to keep nitrogen in the liquid state, the pressure drop in the system (e.g., system 100 of FIG. 1) should be minimized such that nitrogen is not taken to a temperature/pressure below line 201.

Figure 3:
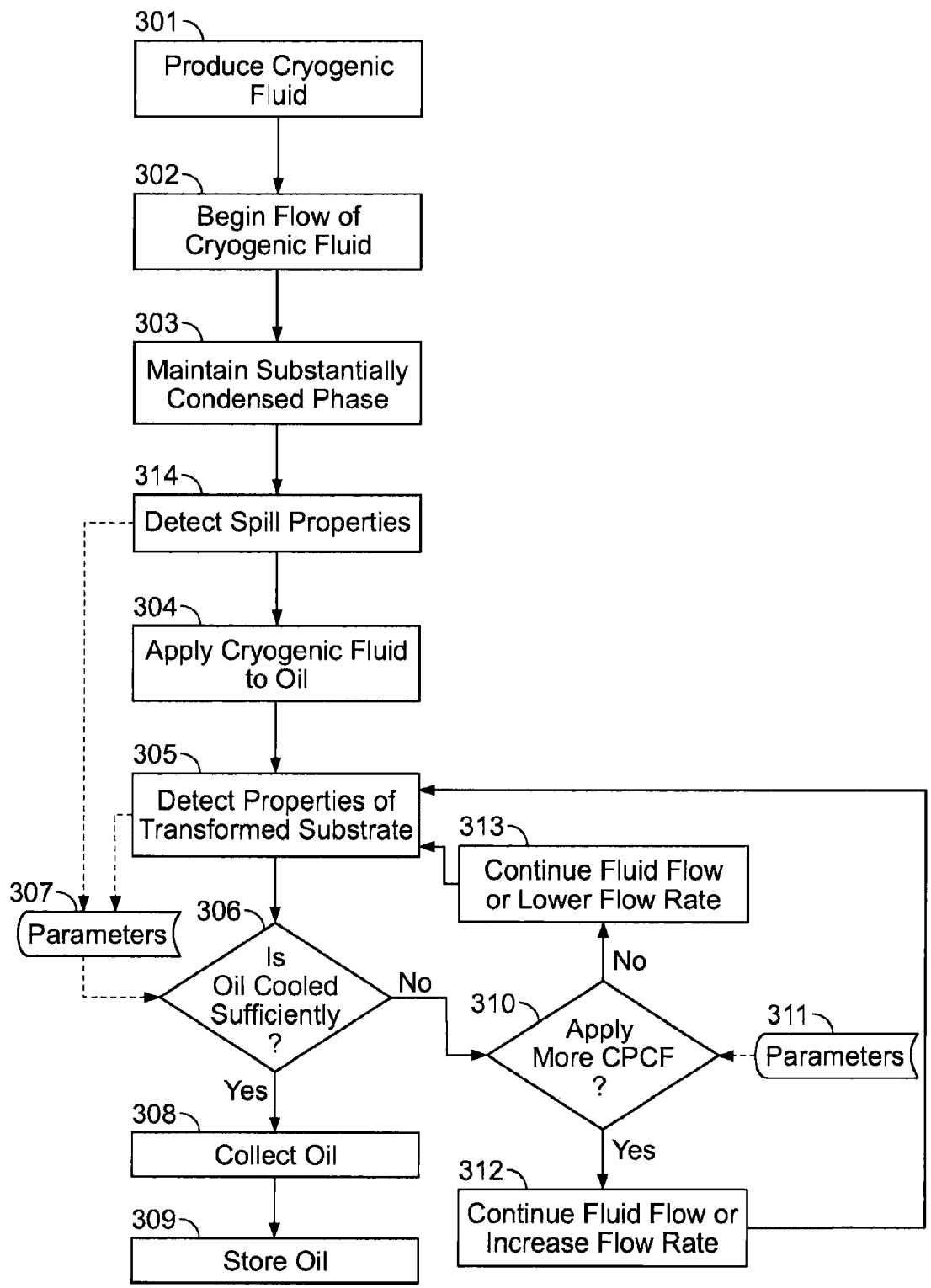
FIG. 3 illustrates an example of a method for remediation.

FIG. 3 illustrates an implementation of a cleanup and control methodology. Some implementations produce condensed phase cryogenic fluid, e.g., at the spill site. For those implementations, the first step is to produce the CPCF (301). The CPCF in those implementations can be liquefied air ("LA"). In other implementations, a cryogenic fluid is brought to the spill site. In those implementations, liquid nitrogen can be used. Next, the flow of CPCF is initiated (302). To maintain the low temperature of the cryogenic fluid, it is preferred, in most implementations, that it flow through insulated channels (e.g., insulated pipe 110 of FIG. 1). The pressure and temperature of the cryogenic fluid are monitored and controlled in some implementations such that the fluid remains in a substantially condensed phase, from the point of storage to the point of being dispensed by the applicator (303).

Before the cryogenic fluid is applied to the spill, the properties of the spill e.g., thickness and densities, viscosities, molecular signatures (or spectra) are detected (314). Also detected are the properties of the agglomerate and/or solid mixed-state being removed (305). The thickness of the spill and other properties affects the remediation techniques, so data pertaining to properties of the spill and/or transformed substrate are stored in the operational database or parameters store 307. Depending upon the implementation, the "substrate" refers to the nature and composition or mixture of the spilled pollutant(s) (e.g., oil), along with the surface layer of the aquatic body or terrestrial boundary layer being remediated, and is characterized by the properties (miscibility, thickness, type(s), concentration(s), molecular signatures (spectra), and other properties of the spill components, etc.), and the nature, composition, and/or mixture of the pollutant materials being removed from the spill (e.g., the agglomerated immiscible substance or oil, and/or the solidified ice-oil composite). For example, if oil or another immiscible substance is spilled into a particular region of the Atlantic ocean, then the substrate is the immiscible/water or oil/water mixture proximate to the surface being remediated, and the solid mixed-state (agglomerated oil or immiscible, and/or the ice-oil or ice-immiscible composite) removed from that spill site. However, for purposes of detecting the properties of the spill (or spilled substances) and/or the remediant (the agglomerate or solid mixed-state being remediated), it should be understood that the properties of the substrate proximate to a sensor (e.g., item 106 of FIG. 1) are detected, and not necessarily those of entire oil-spill or all of the substrate being removed.

Next, the condensed phase cryogenic fluid is then applied to the spill site (304), e.g., the oil spill. As the cryogenic fluid is being applied to the spill site, the properties of the transformed substrate are detected (305) and stored in parameters store 307.

Based on the detected properties, it is determined whether the oil has agglomerated or solidified sufficiently (306). This determination is informed by parameters 307. Since different oils (or lipids, or other immiscibles) become more easily handled at different temperatures, densities, and/or viscosities, in some implementations the desired or selected properties are changed and/or induced by an amount just sufficient to produce the most effective handling characteristics (e.g., to induce the viscous agglomeration, accretion and encapsulation, and/or sequestration via lattice uptake). The parameters 307 can be stored in a controller (e.g., item 104 of FIG. 1), and may contain the characteristics for a variety of oils, e.g., gear oil, motor oil, crude oil, food oils, mineral oil, and other immiscible substances. The parameters 307 include data regarding the thickness of the spill and the molecular identities (spectra), densities, and viscosities, of the spill components and the solid mixed-state being removed, which may cause the controller (e.g., item 104 of FIG. 1) to apply a different amount (or a greater volumetric rate) of CPCF to the substrate, and/or to control other aspects or operations of the remediation systems.

If the oil has cooled or changed its phase or state sufficiently, it is collected (308). In most implementations, the collection is done in a manner that removes a maximum amount of pollutant (e.g., oil) and minimum amount of the bulk material (e.g., ocean water). The oil is then stored (309), and may be subsequently processed or reserved for some other use (e.g., for resale).

If the oil has not cooled or changed in phase or state sufficiently, it is determined how much additional CPCF is to be delivered and/or distributed onto the spill substrate (310). The determination is informed by parameters 311, which may be stored in a controller (e.g., item 104 of FIG. 1). Parameters 311 may take the form of a store that is separate from or integrated with the store associated with parameters 307. Depending on the nature of the substrate and the environment being remediated, it may be desirable that it not reach below a certain temperature, or that it be changed to an increased or decreased amount. For example, some substrates may be home to sensitive aquatic ecosystems that will be damaged by freezing or otherwise reducing the temperature of the water below a particular threshold. If the substrate is not sufficiently cooled, solidified, or otherwise changed, the flow of CPCF continues or is increased (312), and the loop continues at block 305. Blocks 305 and/or 306 can determine whether to increase or maintain fluid flow based on whether the substrate is far from or near to the threshold temperature, or other threshold properties.

If substrate is not cooled enough or is being cooled at a rate that is not optimal, the fluid flow continues or is changed accordingly (313). Block 313 can determine whether to decrease or maintain CPCF flow based on whether (and/or how far) the substrate is above, below, or if just at the threshold value. In this implementation, the CPCF flow continues even if the substrate has become sufficiently cold. Since in some implementations the spill material (e.g., oil) is not collected until it reaches an appropriate temperature, density, and/or viscosity, the substrate may have to be further cooled, or cooled more than desired. In other implementations in which the substrate is particularly sensitive, the step can be modified such that if the substrate reaches a specific or threshold value, the flow of CPCF is stopped.

The determining and/or controlling aspects of blocks 302-306, 308, 310, and 312-14 can be accomplished using a controller, e.g., item 104 of FIG. 1.

Central Hub

Figure 4:
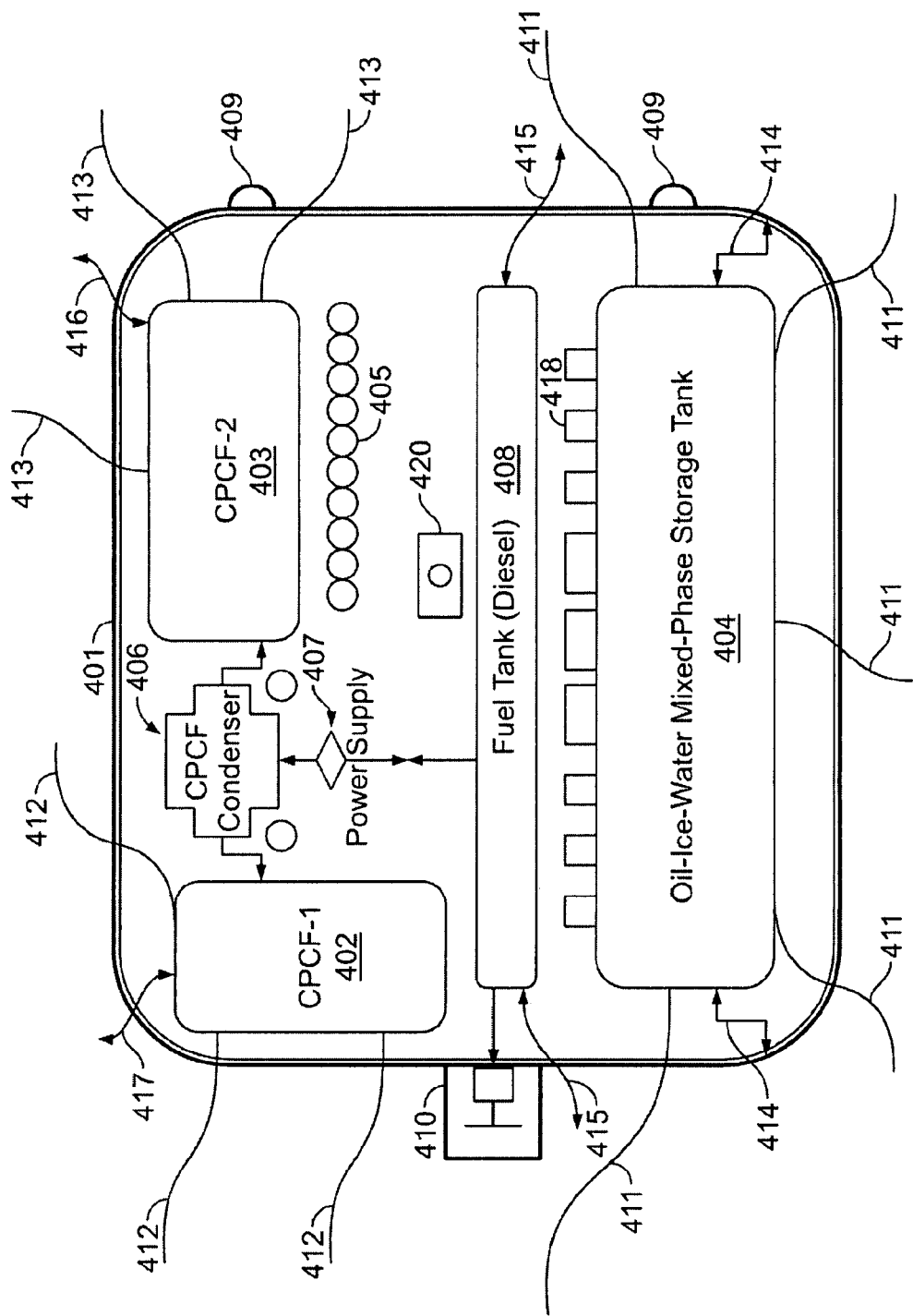
FIG. 4 illustrates an example of a hub.

FIG. 4 illustrates an implementation of a central hub 401 that may be used in conjunction with the remediation systems of FIGS. 1 and 13-20. This implementation of a central hub 401 is a barge-like vessel that serves as: 1) a saturated liquid or condensed phase cryogenic fluid (CPCF) re-filling station and/or modular CPCF tank exchange point to re-supply CPCF and/or self-contained modular CPCF tanks to the mobile delivery systems (see, e.g., FIGS. 1, 13-20); 2) a direct source of CPCF (e.g., condensed phases of liquid nitrogen, liquefied air, liquefied carbon dioxide, and/or liquefied inert gases) pumped to auxiliary condensed phase delivery systems, e.g., tethered devices that act as applicators delivering the CPCF onto the surface of the oil-spill; 3) a central on-site container for storage of mixed phases of ice-water-oil and/or other remediated waste substrates pumped from the pollutant waste receptacles, or intermediary storage tanks of the auxiliary and mobile CPCF delivery/pollutant-removal systems, and/or from the recycled waste storage tanks of the modular remediation units; 4) a refueling site for supply of diesel or other fuels, electric current, or for the exchange of fuel cells, and/or recharging of electric storage batteries for the mobile and auxiliary remediation systems; and 5) an on-site storage vessel for these modular CPCF tanks and modular oil-ice-water or pollutant waste receptacles, or intermediary storage tanks.

The hub 401 can be implemented in a variety of sizes, for example, 10'×10', 20'×20', 40'×40', or 100'×100'. Other sizes are possible to accommodate the specific needs of particular users or spills. The hub can be equipped with moorings spaced approximately 5 ft apart. Tanks 402 and 403 are 2,500, 5,000 or 10,000 gal CPCF storage and refueling tanks. These tanks can be used for refueling (e.g., via pumped lines 416 or 417) mobile remediation systems (e.g., those that have their own CPCF storage tanks). In this implementation, pumped lines 416 or 417 are also used for filling the tanks 402 and 403. Tether lines 412 and 413 provide CPCF to auxiliary vessels or remediation systems (e.g., that include drizzle bars and/or sparger units (or arrays) connected to tanks 402 or 403) that remediate spills proximate to the hub 401.

Also, to provide quicker refueling of mobile remediation systems, modular CPCF delivery tanks or CPCF kegs 405 can be provided, which are pre-filled with CPCF. Tanks 405 may come in various sizes, with possible sizes including 150, 250, 350 or 500 gallons.

In this implementation, storage tank 404 is a 10,000 or 20,000 gal tank for storing immiscible- or oil-ice-water mixed phase and/or other pollutants. Pumped lines 414 can be used for filing the tank 404 with the waste collected by mobile remediation devices (e.g., those devices that have their own immiscible or oil-ice-water mixed-state storage tanks). The pumped lines 414 can also be used for discharging the contents of the storage tank 404 for subsequent on-shore storage, recycling, purification, and/or sale. Tether lines 411 are used for filling the tank 404 with the waste collected by the auxiliary remediation devices (e.g., those devices that do not have their own oil-ice-water mixed-phase storage tanks).

To allow mobile and/or auxiliary remediation devices to more quickly empty collected pollutants, modular oil-ice-water or pollutant waste receptacles 418 can be provided. A mobile or auxiliary device can dispose a full receptacle 418 on the hub 401 and remove an empty receptacle 418 to quickly return to cleaning. The size of the receptacles 418 can vary, but possible sizes include 250 and 500 gallons.

The hub 401 also includes a communications and control center 420 which provides, e.g., global positioning ("GPS") and navigational information, radio frequency ("RF") infrared ("IR") data (from sensors) and processing, and other mobile telecommunication capabilities. The control center 420 can, in some implementations, transmit GPS data and operating instructions to the mobile remediation systems (see, e.g., FIGS. 1, 13-20), e.g., for automated navigation of the remediation units around the spill site. The control center 420 can also receive information from infrared (IR) and/or optoacoustic sensors installed in the sparging units of remediation apparatus to assess and/or monitor, in real time, the thickness of the spill (thus providing the means to estimate the remaining substrate volume to be remediated) and the temperature of the substrate. Moreover, the control center 420 can communicate information and instructions to technical staff, field operations personnel, governmental authorities, etc.

A fuel tank 408 stores fuel. In some implementations, diesel fuel is utilized. The size can vary, but is 2500 gallons in this implementation. The fuel tank 408 provides fuel to a power supply 407 (e.g., a generator) and a motor 410 that can be used for propelling the hub 401. In some implementations, the hub 401 is pulled by another device (e.g., via tow-bar assemblies 409). The fuel tank 408 can fuel mobile remediation devices via pumped lines 415. Pumped lines 415 can also be used for refilling the fuel tank 408.

The power supply 407 is used for supplying electricity to, among other things, a CPCF condenser 406. In some implementations, the condenser 406 is a cryogenic air and nitrogen liquefaction condenser and phase separator. The condenser 406 can condense ambient air to create liquefied air (LA) or can capture gaseous nitrogen and create liquefied nitrogen (LN). The LA or LN is stored in the tanks 402 and/or 403.

Implementations of Applicators for Applying CPCF

Prior to discussing particular implementations of remediation apparatus (and associated hardware), it is instructive to first discuss implementations of applicators that can be employed by such apparatus. While the following describes particular applicators in detail, it should be understood that the actual applicator implemented with a particular remediation apparatus can vary. For example, the shape and size of the applicator may vary depending on the intended use of the remediation apparatus. An apparatus intended for remediating a large area may be implemented with a large array of applicators (in a variety of shapes and configurations), whereas a "hand-held" remediation apparatus may implemented with a small applicator.

As discussed above, it is a concern in some implementations that the applicator cause as small of a pressure drop as possible to ensure that the cryogenic fluid remains in the condensed phase. Accordingly, the following implementations of CPCF applicators are configured so as to result in a small pressure drop, and thereby apply a CPCF to a substrate. As a result, these applicators and the vessels and/or apparatus in which they are implemented may cause viscous agglomeration, accretion and encapsulation, and/or sequestration by lattice uptake of an immiscible substrate.

Figure 5:
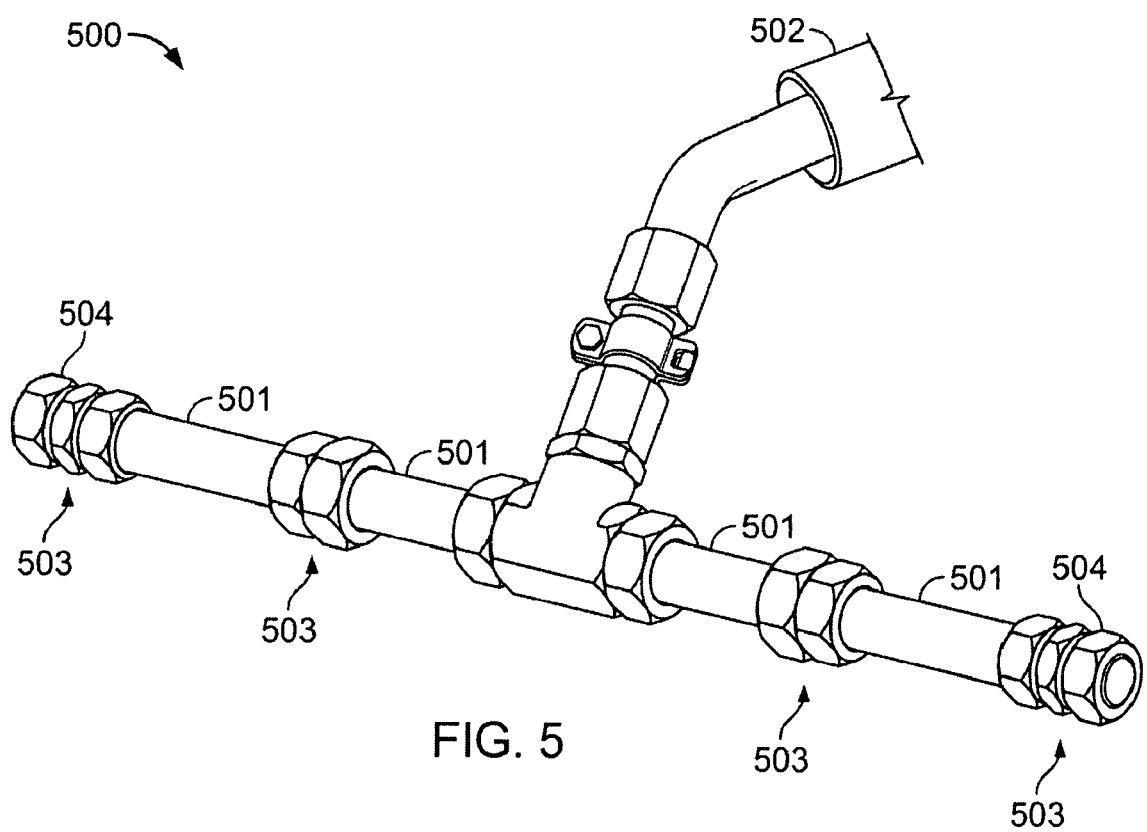
FIG. 5 illustrates an example of an apparatus for dispensing condensed-phase cryogenic fluid ("CPCF").

FIG. 5 illustrates a view of an implementation of a sparger bar 500. The sparger bar receives CPCF via an insulated hose 502. The hose 502, depending on the implementation, may be vacuum insulated. The general construction of this implementation 500 includes of sparging regions 501 and couplers 503. The sparging regions 501 dispense the CPCF (preferably, as close to atmospheric pressure as possible) whereas the couplers 503 enable connection of additional sparging regions 501. Thus, the overall configuration of the sparger bar 500 can vary depending upon how many sparging regions 501 and couplers 504 are utilized. End caps 504 are used at the end(s) of the sparger bar 500 to ensure that CPCF escapes only through the sparging regions 501. In this implementation, a linear arrangement of couplers 503 and sparging regions 501 are employed. Other implementations may employ a variety of shapes and configurations (e.g., circular, angular, etc.).

This particular implementation 500 may be implemented in connection with a hand-held remediation unit, and can be manually rotated, tilted, and/or aligned to different angles. Such a hand-held unit would have capability, e.g., to be adjusted to the geometries of shorelines, coastal rocks, beach dunes, and/or to fit into tighter places such as under and around piers or coastal flora.

The sparging regions 501 preferably distribute the cryogenic fluid in droplets. The sparging regions 501 are, in some implementations, fabricated by a sintering method. The sintered material can vary, but possible materials include brass and bronze alloys, stainless steel, and/or silicon carbide (and composites thereof). In some implementations, stainless steel and/or composite materials are preferred, depending on, e.g., the properties, reactivity, and catalytic degradability of the pollutant substrate to be remediated, the characteristics or severity of the spill and/or surrounding environment (e.g. using a particular composite material with greater porosity, in order to distribute larger droplets over a spill area when wind or turbidity is significant, or to minimize the effects of seawater, brackish systems, and/or reactive or corrosive chemical spills) and the conditions of the marine/aquatic system (e.g., salinity, pH, solar flux within the UVB band (280-320 nm) and aquatic concentrations of dissolved organic carbon (DOC) moieties or detrital matter (DOM) and the production rates for reactive oxygen species (e.g., transient oxidants such as OH, peroxyl, $.O_2$, hydroperoxyl, $.O_2H$, singlet oxygen, $^1O_2(\Delta_g)$, . . . ) and other free-radicals or degradation products).

The mean porosity of the different types of sintered metal suitable for use as sparging regions 501 varies. For example, porosity may range from less than 1 micron to over 10 microns. Yet, in some implementations, it may be particularly preferred that porosity in the 2-3 micron range be employed. Such porosities can be highly effective for the clean-up of bulk crude oil, motor oils (10, 20, 30, and 50 W), motor oil blends and synthetic "racing" oils (5-20, 10-30, 10-40, and 20-40 W), vacuum pump and gear oils (>90 W), mineral oils, vegetable oils (soy, corn, etc.) and/or other hydrophobic or immiscible substrates.

Figure 6:
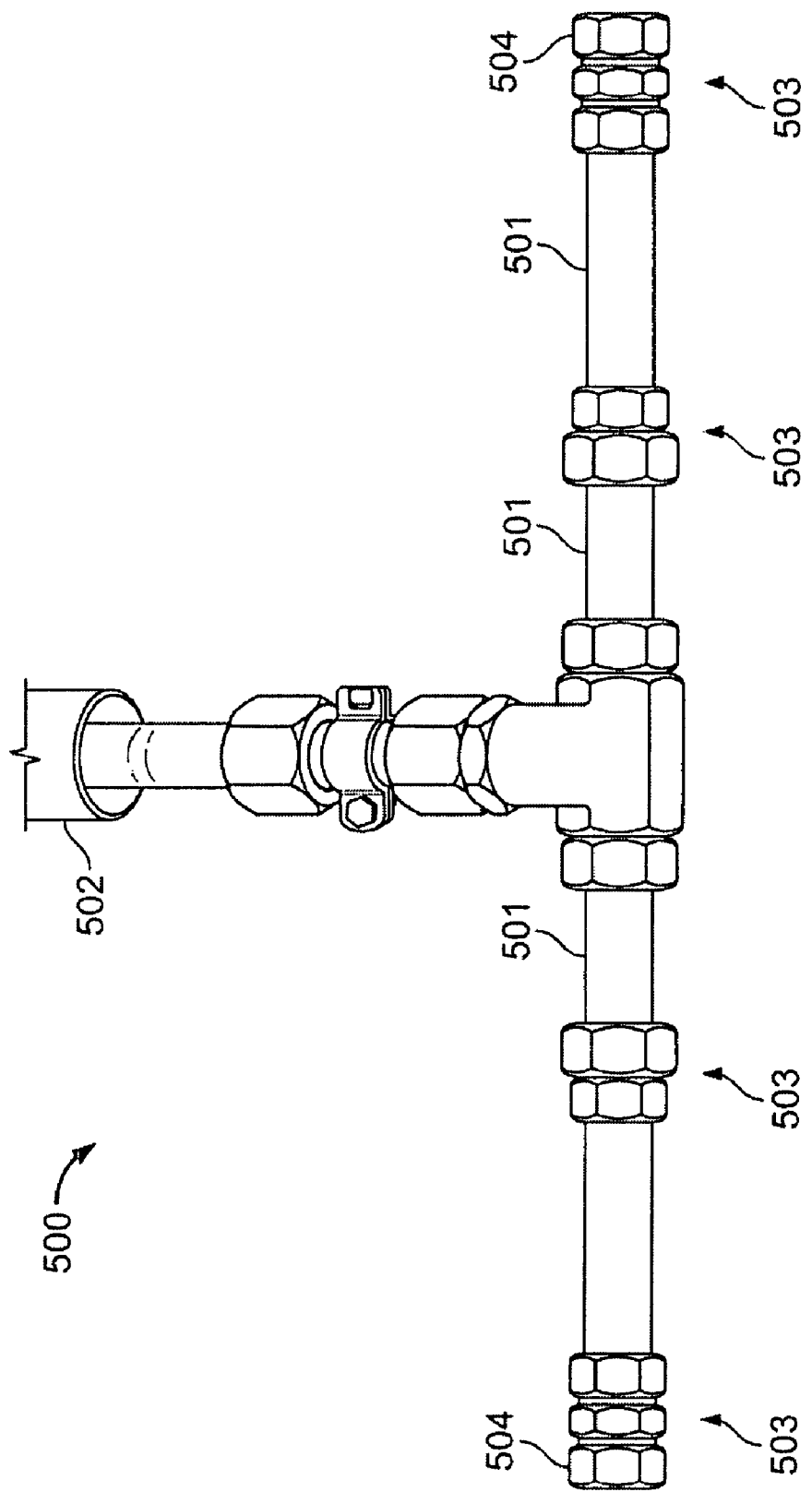
FIG. 6 illustrates an example of an apparatus for dispensing CPCF.

FIG. 6 depicts an alternate view of the sparger bar 500 for applying CPCF.

Figure 7:
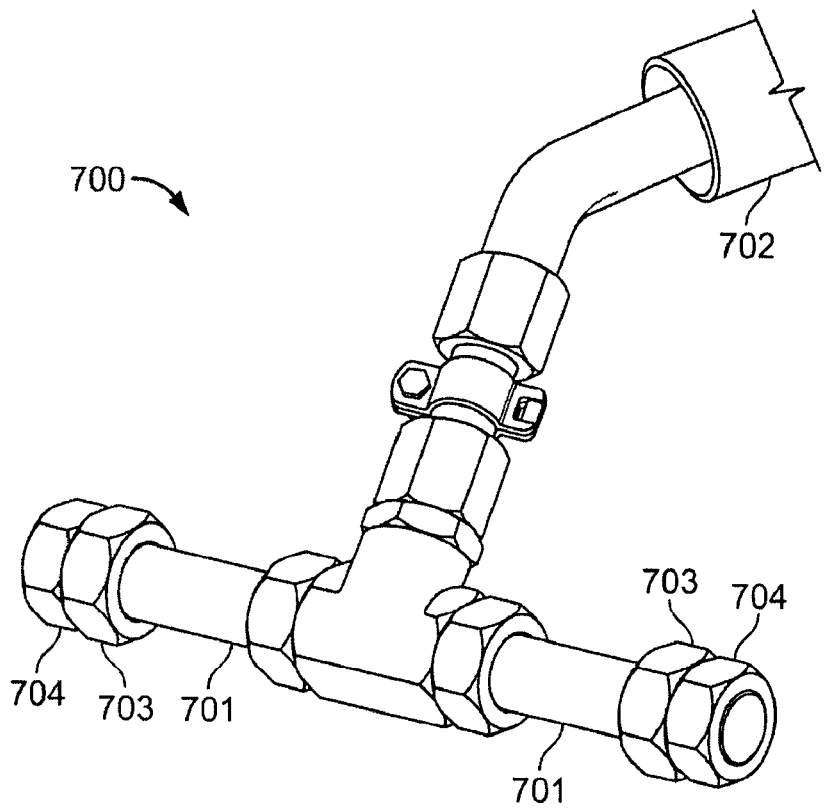
FIG. 7 illustrates an example of an apparatus for dispensing CPCF.

FIG. 7 depicts an alternate implementation of a sparger bar 700. This implementation is constructed in a manner similar to sparger bar 500 (of FIG. 5), but employs only two sparging regions 701. The couplers 703 are terminated by end caps 704. The sparger bar 700 receives CPCF by way of insulated hose 702. This implementation may be implemented so that it is smaller than sparger bar 500 (of FIG. 5), thus making it applicable for hand-held operations that require a great deal of flexibility and precision.

Figure 8:
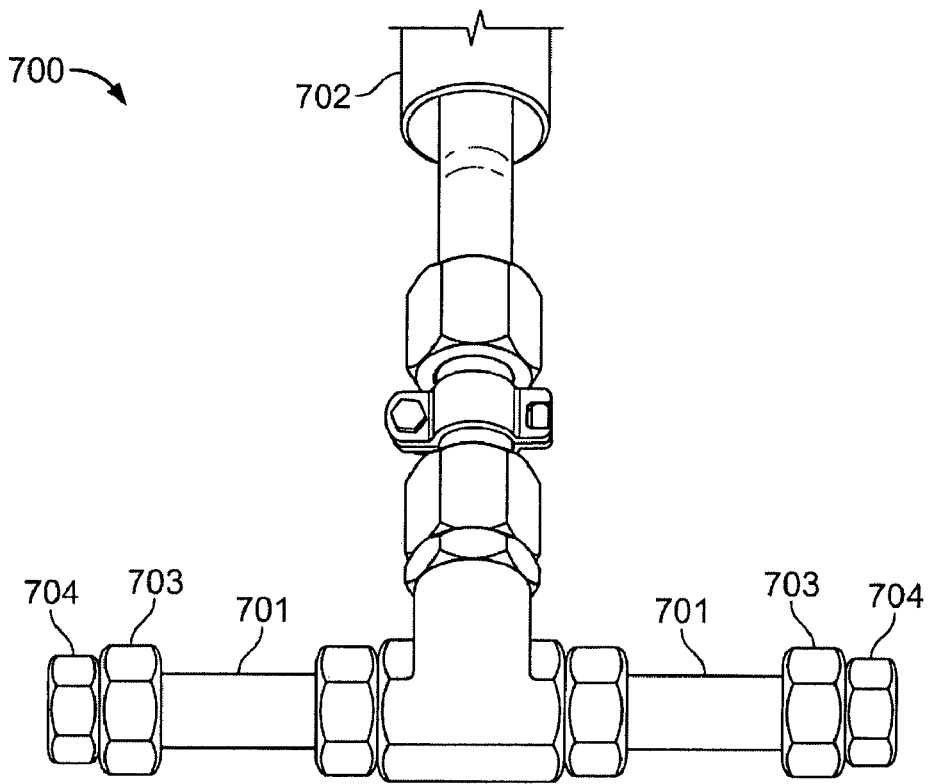
FIG. 8 illustrates an example of an apparatus for dispensing CPCF.

FIG. 8 is an alternate view of the sparger bar 700.

Figure 9:
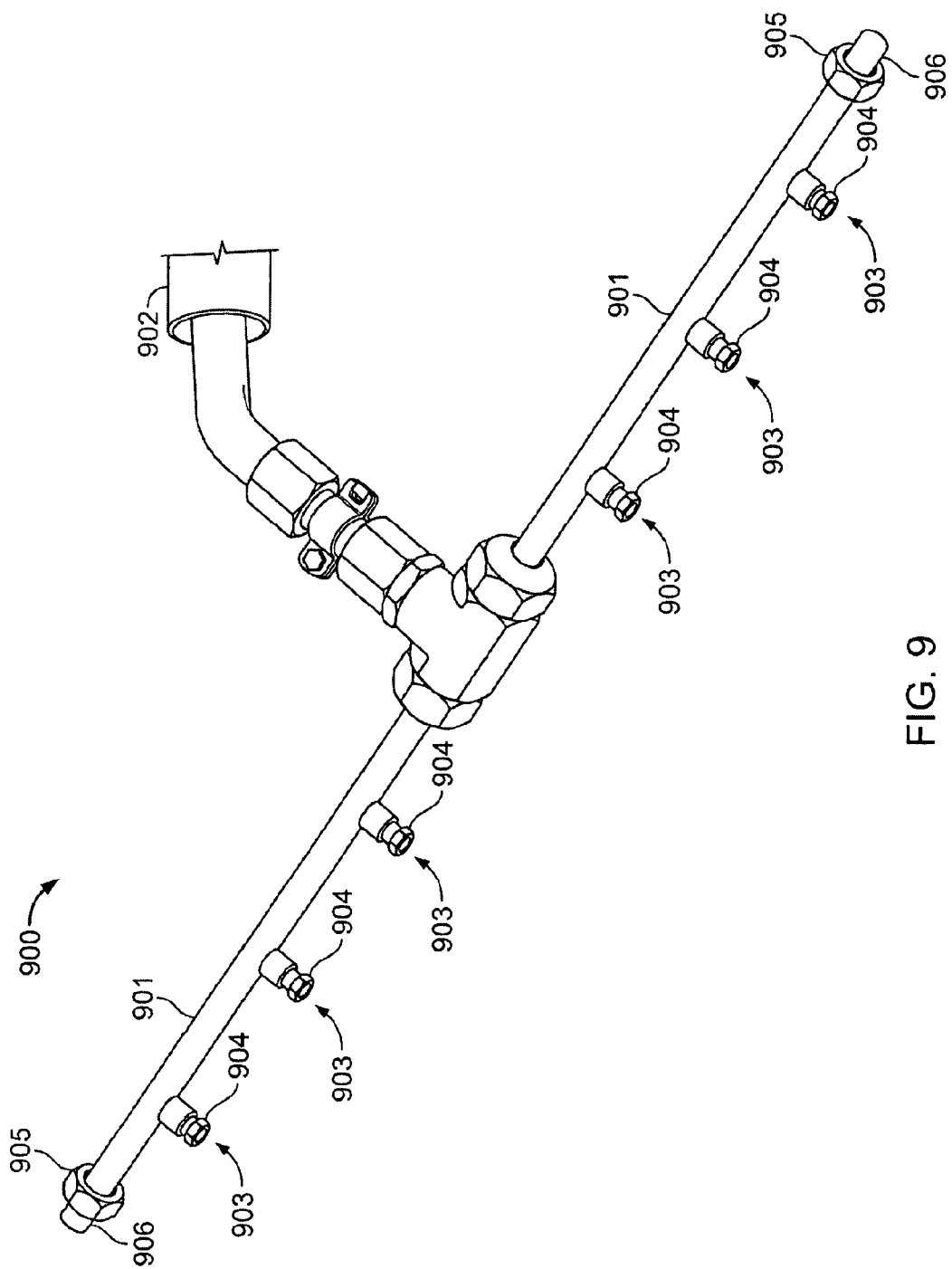
FIG. 9 illustrates an example of an apparatus for dispensing CPCF.

FIG. 9 depicts an implementation of another type of applicator, a spray bar 900. The spray bar 900 receives CPCF via an insulated (e.g., vacuum insulated) hose 902. The CPCF travels through the bar sections 901 and is dispensed via nozzles 903. The nozzles 903 have adjustment dials 904 which are used for adjusting the size of the nozzle 903 aperture. Put another way, adjusting the dial 904 increases or decreases the size of the CPCF droplet that is dispensed, and/or the pressure of the CPCF flow. A coupler 905 can added to a bar section 901 to allow coupling of additional bar sections (e.g., a bar section 901 with additional nozzles 903). End caps 906 are installed at the end(s) of the spray bar 900 to ensure that CPCF is dispensed only through the nozzles 903. In this implementation, a linear arrangement of nozzles 903 and couplers 905 are employed. Other implementations may employ a variety of shapes and configurations (e.g., circular, angular, etc.).

Figure 10:
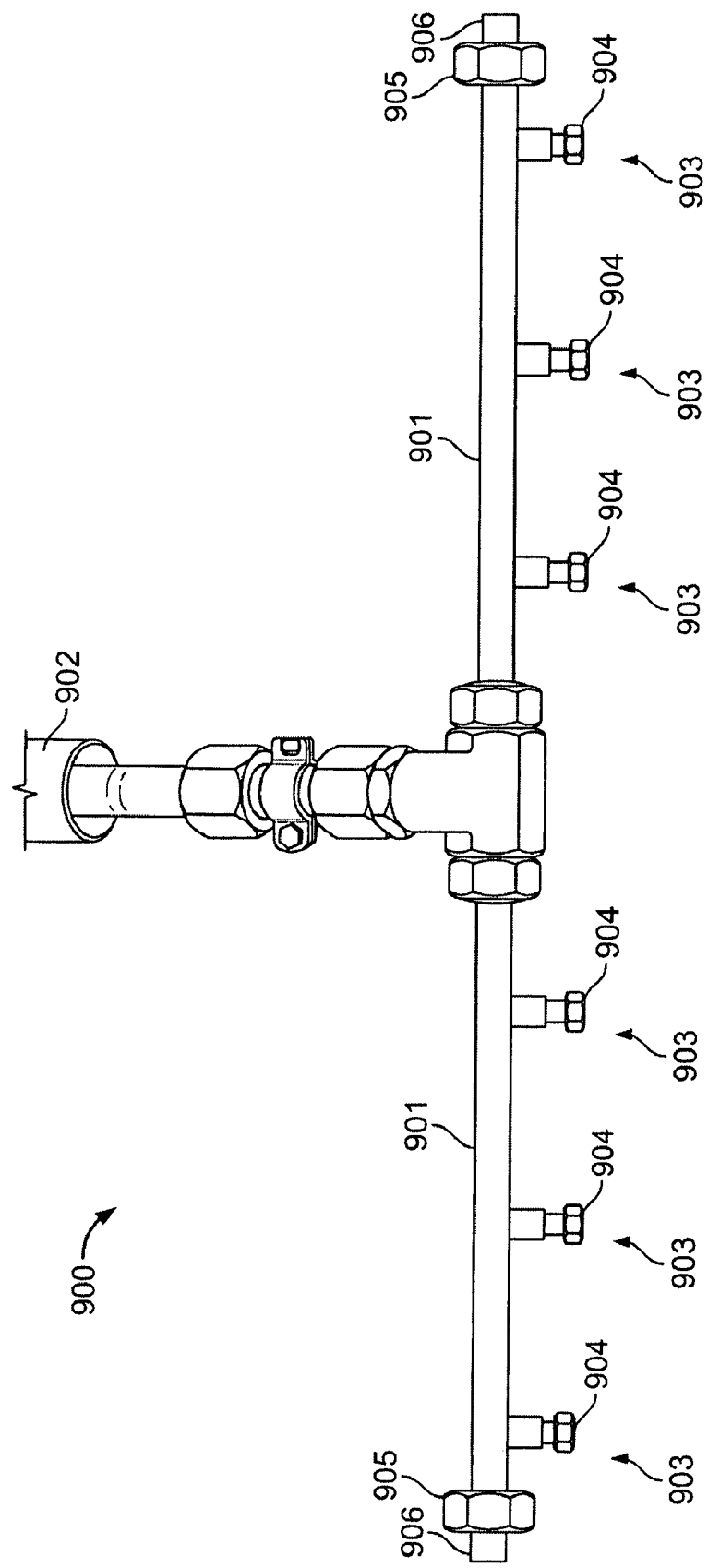
FIG. 10 illustrates an example of an apparatus for dispensing CPCF.

FIG. 10 is an alternate view of spray bar 900.

This particular implementation 900 may be implemented in connection with a hand-held remediation unit, and can be manually rotated, tilted, and/or aligned to different angles. Such a hand-held unit would have capability, e.g., to be adjusted to the geometries of shorelines, coastal rocks, beach dunes, and/or to fit into tighter places such as under and around piers or coastal flora.

The material of the spray bar 900 can vary, with possible materials including stainless steel, non-reactive composites and/or specific polymers, as required or preferred for particular implementations, or depending on, e.g., the properties, reactivity, and catalytic degradability of the pollutant substrate to be remediated, the characteristics or severity of the spill and/or surrounding environment (e.g. to minimize the effects of seawater, brackish systems, and/or reactive or corrosive chemical spills) and the conditions of the marine/aquatic system. Also, the materials and design concerns discussed in connection with implementation 500 are relevant to this implementation as well.

The geometry of the spray bar 900 can vary, but possible dimensions include a bar section 901 diameter of about 0.75" to about 1.5". The adjustable nozzles 903 can take many forms, but some implementations may use a pre-fabricated or adjustable cryogenic nozzle, e.g., as produced by Spraying Systems Co. of Wheaton, Ill.

Figure 11:
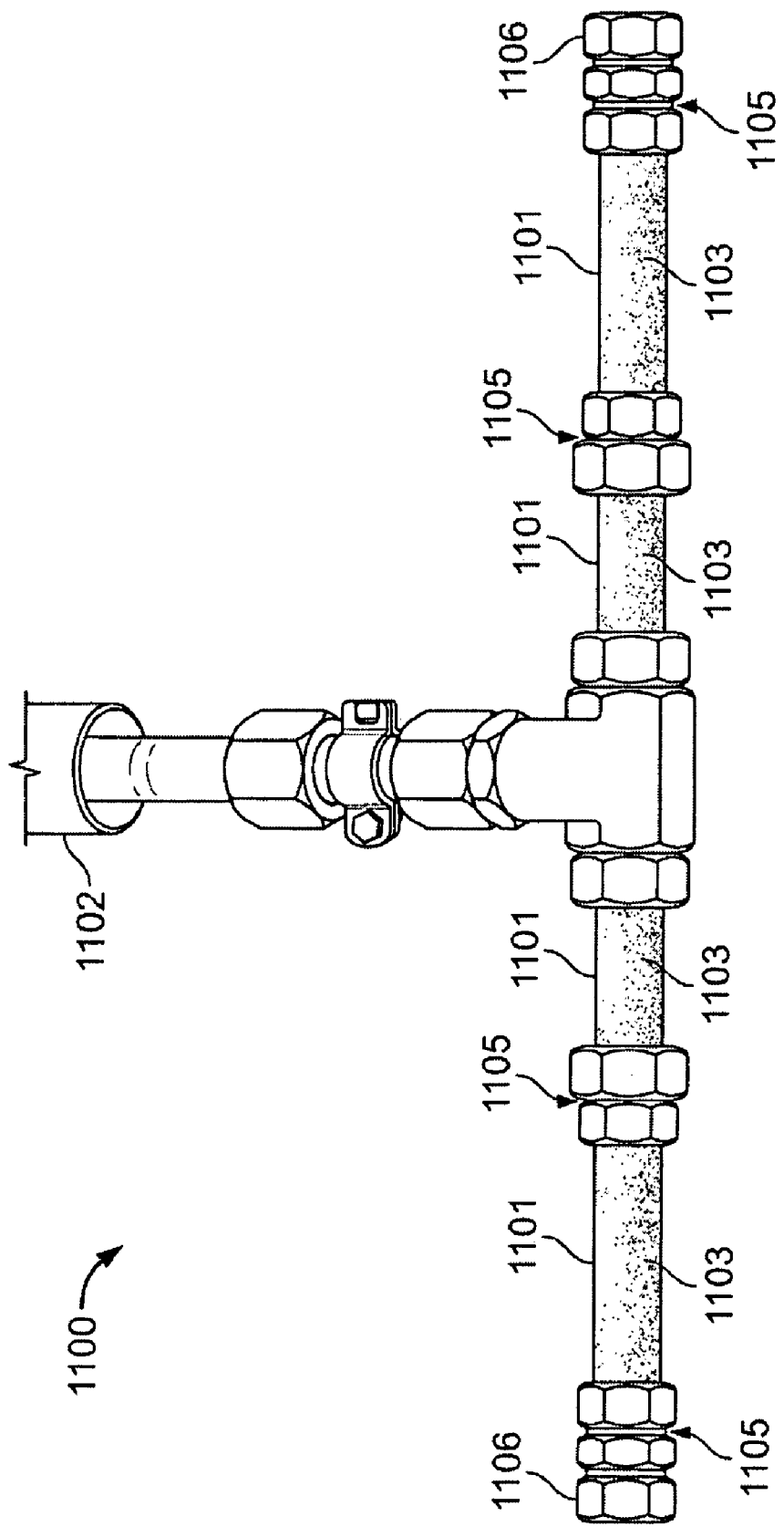
FIG. 11 illustrates an example of an apparatus for dispensing CPCF.

FIG. 11 is an implementation of a drizzle bar 1100 for applying CPCF. The drizzle bar receives CPCF via an insulated (e.g., vacuum insulated) hose 1102. The CPCF travels through the bar sections 1101 and is dispensed through hole arrays 1103. A coupler 1105 can added to a bar section 1101 to allow coupling of additional bar sections (e.g., a bar section 1101 with additional hole arrays 1103). At the end(s) of the drizzle bar 1100, end caps 1106 are installed to ensure that CPCF is dispensed only through the hole arrays 1103. In this implementation, a linear arrangement of bar sections 1101 and couplers 1105 are employed. Other implementations may employ a variety of shapes and configurations (e.g., circular, angular, etc.).

The hole arrays 1103 may include a sequential pattern of holes (e.g., pentagons), with the bore of the holes being approximately from about 0.1 mm to about 0.5 mm (though greater bores are possible for specific uses or applications). The bar sections 1101 may be fabricated in lengths of from about 1' to 10' or more, and diameters from about 1" to more than 5".

This particular implementation 1100 may be implemented in connection with a hand-held remdiation unit, and can be manually rotated, tilted, and/or aligned to different angles. Such a hand-held unit would have capability, e.g., to be adjusted to the geometries of shorelines, coastal rocks, beach dunes, and/or to fit into tighter places such as under and around piers or coastal flora.

The material of the drizzle bar 1100 can vary, with possible materials including stainless steel, non-reactive composites and/or specific polymers, as required or preferred for particular implementations, or depending on, e.g., the properties, reactivity, and catalytic degradability of the pollutant substrate to be remediated, the characteristics or severity of the spill and/or surrounding environment (e.g. to minimize the effects of seawater, brackish systems, and/or reactive or corrosive chemical spills) and the conditions of the marine/aquatic system. Also, the materials and design concerns discussed in connection with implementation 500 are relevant to this implementation as well.

Figure 12:
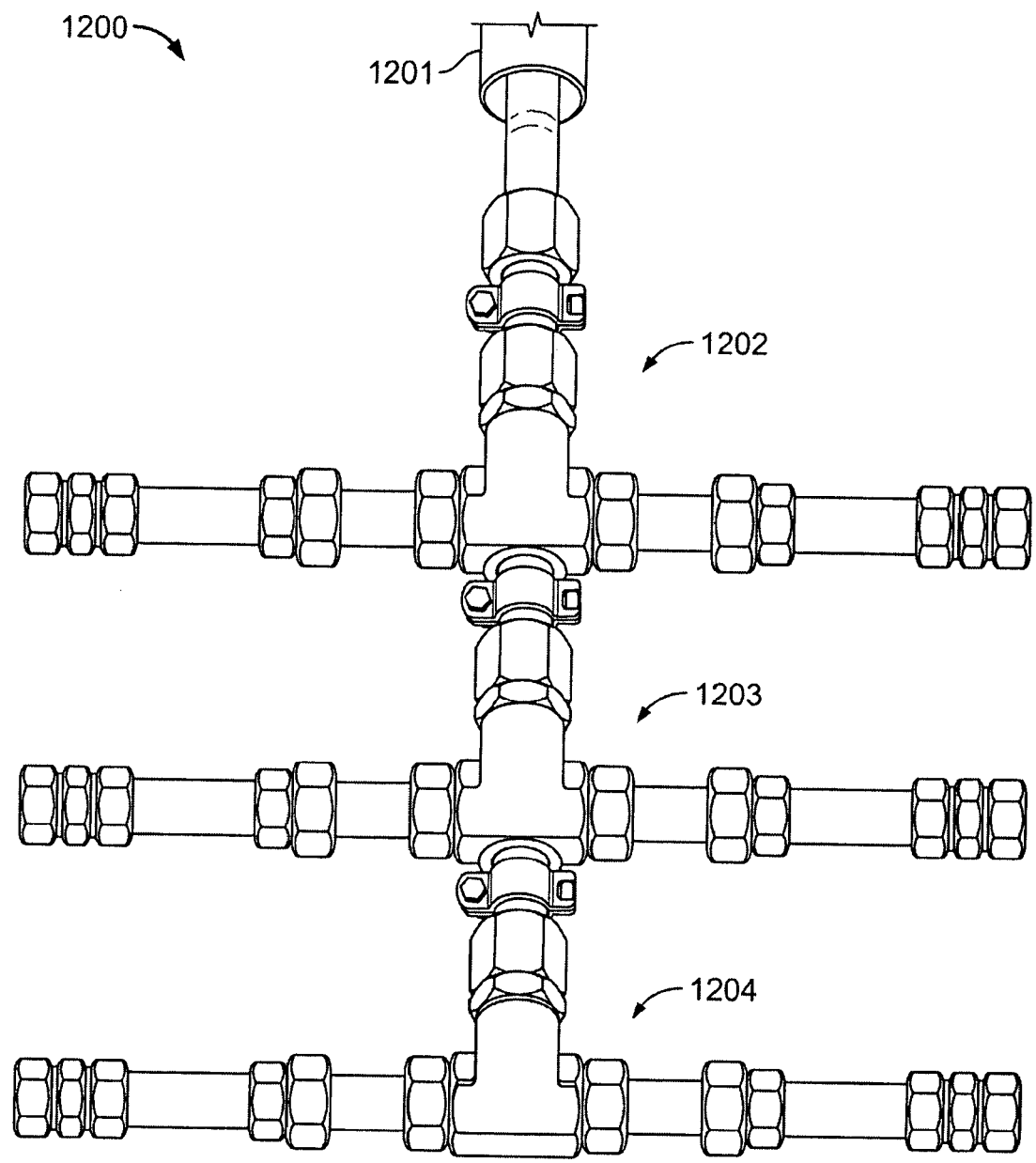
FIG. 12 illustrates an example of an apparatus for dispensing CPCF.

FIG. 12 is an implementation of an array of sparger bars 1200. The sparger bars 1201, 1203 and 1204 can take the form the sparger bars discussed in connection with FIG. 5, and, accordingly, will not be discussed in detail. The array 1200 receives CPCF via an insulated hose 1201 (e.g., a vacuum insulted hose) and distributes the CPCF between each sparger bar 1202, 1203 and 1204. Generally speaking, arrays can be useful for applying CPCF to a larger area. The array can be made as large as needed, thereby allowing efficient application of CPCF to, e.g., a large oil spill. This array 1200 includes generally parallel sparger bars, but can take many forms. The array 1200 can include concentric circles, one or more spirals, or various other shapes or combinations thereof. Generally speaking, arrays are not commonly used with hand-held remediation apparatus, and are instead better suited to larger-scale apparatus.

Implementations of a Portable/Handheld Remediation Apparatus

The following implementations may be viewed as more particular implementations of the system of FIG. 1 and/or the method of FIG. 3. Accordingly, the following may be read in view of, or in conjunction with, the discussion of FIG. 1 and/or FIG. 3.

Figure 13:
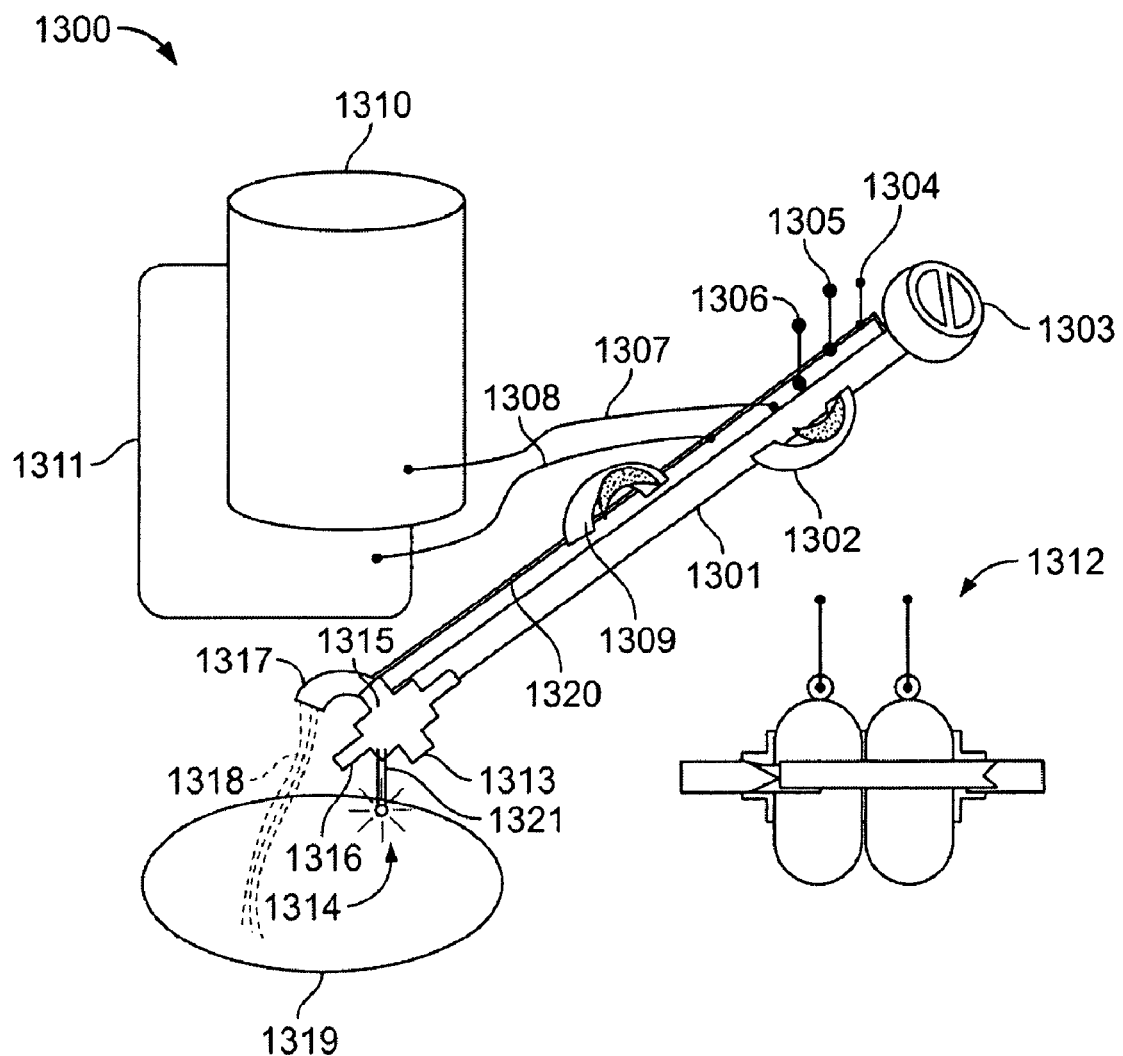
FIG. 13 illustrates an example of a remediation apparatus.

FIG. 13 illustrates an implementation of portable/handheld remediation apparatus 1300. The apparatus 1300 may be used for the capture, removal and/or quarantine of hazardous materials (e.g., pollutants, noxious chemicals, radioactive materials, etc.). The apparatus 1300 is suited to a wide variety of environments, ranging from confined spaces, indoor areas, airports, power plants, to hard/terrestrial surfaces, coastal rocks, to beaches, estuaries, or fragile ecosystems, to remote places such as mountain or wooded areas, streams, remote shorelines, deserts, bunkers, and/or use in war zones, catastrophic or emergency situations.

The apparatus 1300 as shown is implemented as a portable handheld remediation unit for, e.g., clean-up of both miscible and immiscible substrates from terrestrial areas and hard surfaces, generally. This apparatus 1300 can be operated from dune buggies, sport-utility-vehicles, pickup trucks, small boats, motorcycles, snowmobiles, and/or multi-terrain vehicles. One manner of implementing the apparatus 1300 in conjunction with a vehicle is by mounting a low pressure CPCF keg 1310 or other cryogenic fluid delivery system (e.g., liquefaction system) and pollutant waste receptacle 1311 on such vehicles. By using portable, back-packed, or self-contained ("scuba-like") CPCF and waste storage tanks 1312, the apparatus 1300 may be operated and implemented particularly for remediation and/or other applications in very remote locations, areas inaccessible even to off-road vehicles, or where motor vehicles are not permitted, e.g., marshes, streams, wildlife refuges, migratory wetlands, or other fragile or shallow-water ecosystems.

Generally speaking, the apparatus 1300 includes a hand-held wand 1301, a multi-functional sparging unit 1317, plus a vacuum uptake system 1315 to remove pollutant waste in a one-step (or real time) process. Put another way, as the immiscible substrate 1319 is captured, it is vacuumed into a waste tank (e.g., 1311). The apparatus 1200 therefore is capable of minimizing exposure times to hazardous spills (for the community as well as for the remediators) by simultaneously capturing and removing the pollutant waste, and sealing the hazardous substance in a pressurized receptacle (or waste 'keg') 1311. Remediation, e.g., of buildings, coastal rocks, and/or other hardened or solid surfaces, can be further sped up by employing rotating wire brushes (or brushes of non-reactive polymeric or other materials). 1314 feeds the pollutant waste 1319 into the vacuum uptake (1316 or 1313), so that the pollutants—whether captured as viscous agglomerate, as encapsulated substrate, and/or as the mixed-state sequestered via lattice uptake—can be 'quarantined' (sealed in the appropriate containers, e.g., 1311) as they are captured. This implementation is well suited for rapid response, emergency situations in densely populated areas, and applications concerning small hazardous spills of reactive chemicals, corrosives, or combustibles, for incendiaries, and/or in response to radiological or biological threats.

The wand shaft 1301 incorporates a CPCF delivery system (1317) and a vacuum removal tool (1315). The upper section of the wand shaft 1301 contains a cryogenic conduit for delivery of CPCF to capture the hazardous waste. The diameter of the conduit may vary, but diameters from about 0.5" to about 3" are preferred, with 1.5" ideal in some implementations. The lower section of the wand shaft 1301 contains a vacuum tube (or flexible hose), lined in a non-reactive composite material, for removal of the waste substrate 1319. The diameter of the vacuum tube may vary, but diameters from 1.5" to 5.5" are preferred, with 3.5" ideal in some implementations. The length of the wand shaft varies, but lengths from 6' to 18' are preferred, with 12' being ideal in some implementations. This apparatus 1300 can be implemented in a higher capacity format, thus requiring CPCF delivery at rates requiring 5" or greater diameter conduit and/or 6" or greater diameter vacuum efflux tubing.

The CPCF sparger unit 1317 can take many forms, including those applicators discussed in connection with, e.g., FIGS. 5-12. In particular, the sparger unit may take the form of a curved drizzle manifold as described in connection with FIG. 12, an assembly or bundle of smaller diameter sintered metal sparger bars (e.g., such as FIG. 5 or 7) fabricated into the exit end of a curved housing (made of stainless steel or non-reactive composite material), and/or as a spray bar (e.g., such as FIG. 9) array or manifold, for delivery of low pressure condensed droplets of CPCF 1318 onto the spill or site to be remediated 1319. The sparger unit 1317 is adjustable in direction and in the dispersion pattern and area (e.g., in droplet size and density of CPCF per unit of spill surface area). The sparger unit 1317 is connected to the cryogenic conduit for CPCF delivery, and couples to the CPCF influx pressure valve assembly and the control knob 1303 (discussed below).

A vacuum uptake system 1315 located near the surface of the spill 1319 can provide vortex action for maximal suction and removal rate of the substrate to be remediated. The vacuum system 1315 connects directly to a vortex chamber and mechanical auger in which the solid phase is fragmented pneumatically (by vortex action) and mechanically (by the auger) and rapidly evacuated to the sealable waste receptacle (e.g., 1311). The vacuum system 1315 may include more than one inflow port, and is illustrated here with two (1313 and 1316). The inflow ports 1315, 1316 may operate simultaneously or may be individually selected, e.g., depending on the orientation of the wand 1301 relative to the spill 1319. Alternatively, the suction can be continuously varied between the two inflow ports 1315, 1316. Control lever 1306 (which communicates via linkage 1320) can be used to select the vacuum ports.

Rotating brushes 1314 of specific composition (e.g., wire brushes such as stainless steel or brass, polyethylene for corrosive materials, or non-reactive composites where required to deal with specific hazards or conditions) are provided on the distal end of the wand 1301. The brushes 1314 enhance remediation on surfaces such as, e.g., coastal rocks. The brushes rotate on the brush control arm 1321 and can be raised, lowered, and positioned relative to the spill surface, via the brush control arm lever 1304. The rotational speed of the brushes is controlled by the lever 1305. Levers 1304 and 1305 communicate with the brushes 1314 and/or brush control arm 1321 via linkage 1320.

The wand 1301 includes two handles 1302 and 1309. Lower handle 1309 includes a handgrip controller to throttle the rate of CPCF delivery and a safety release (e.g., an on-off toggle switch). Upper handle 1302 includes a handgrip controller to throttle the suction (or rate of vacuum uptake) of the hazardous material. A safety release (e.g., an on-off toggle switch) is also incorporated in the upper handle 1302.

A CPCF influx control knob (or pressure valve assembly) 1303 monitors inflow from the CPCF delivery conduit 1315 (or the conduit associated with 1312) and adjusts the amount of CPCF (pressure) flowing into the sparging manifold 1317.

The linkage 1320 is attached to top of the wand shaft 1301, and contains the mechanical controllers associated with controls 1303, 1304, 1305 and 1306. The linkage 1320 also contains the mechanical cables and circuitry for the CPCF delivery and vacuum efflux throttles (and, e.g., on-off safety switches) installed in the handles 1302 and 1309.

The CPCF keg 1310 is connected to the wand 1301 via a connecting hose 1307, which preferably is insulated (e.g., vacuum insulated). The waste receptacle 1311 is connected to the wand via a connecting hose 1308. In some implementations (e.g., in cases in which the remediated pollutant is harmful or toxic) it is desirable to keep the waste frozen. In that case, it is preferred to use an insulated connecting hose 1308. Some implementations may even utilize CPCF from keg 1310 or another source to keep the waste inside the receptacle 1311 frozen. Similar hoses and configurations can be employed in connection with portable tank assembly 1312. The keg 1310 may take a form analogous to, e.g., item 405 of FIG. 4. The keg construction may take several forms, but in some implementations is a modular, recyclable, CPCF Dewar jar. The keg 1310 may come in a variety of sizes depending upon the implementation, e.g., from 25 gallons up to 350 gallons or more. The keg 1310 may be re-filled or exchanged for replacement (full) kegs at the on-site central hub (e.g., of FIG. 4) or an on-shore CPCF tank.

The waste receptacle 1311 is preferably a sealable container, and may take a form analogous to item 418 of FIG. 4. In some implementations, the waste receptacle 1311 is suited for quarantine and removal of hazardous (e.g., nuclear or biological) waste. Such implementations are discussed in connection with, e.g., FIG. 20. The waste receptacle 1311 can be made in a variety of sizes depending upon the implementation, e.g., from 50 gallons up to 500 gallons or more. The waste receptacle 1311 can be emptied or recycled/exchanged at the on-site central hub (e.g., of FIG. 4) or on-shore pollutant waste storage tank.

Some implementations of the wand 1301 can be used in conjunction with self-contained ("scuba-like") CPCF delivery and pollutant waste tanks 1312. Given that, in most implementations, these tanks are designed for portability, they may be provided in relatively small sizes. Possible sizes include 10, 25, and 50 gallons per side (i.e., per CPCF tank and waste tank). Note that the individual tanks of item 1312 need not be of the same capacity, e.g., a 10 gallon CPCF tank and a 50 gallon pollutant waste tank. When a wand 1301 is used with the self-contained tanks 1312, tanks 1310 and 1311 may not be necessary. The small size of the self-contained tanks 1312 make the overall system, in some implementations, particularly well-suited for remote and/or specialized applications. For example, a self-contained implementation can be provided in a backpack form (or otherwise transported) for use indoors, for densely wooded, estuarine, or otherwise unreachable environments, for remediation of fragile ecosystems, and/or for defense and security applications.

Implementations of Some Self-Contained Remediation Units

The following implementations may be viewed as more particular implementations of the system of FIG. 1 and/or the method of FIG. 3. Accordingly, the following may be read in view of, or in conjunction with, the discussion of FIG. 1 and/or FIG. 3.

The CPCF sparger units discussed in connection with the following implementations can take many forms, including those applicators discussed in connection with, e.g., FIGS. 5-12. In particular, the sparger unit may take the form of a curved drizzle manifold as described in connection with FIG. 12, an assembly or bundle of smaller diameter drizzle bars (e.g., the sintered metal sparger bars in FIG. 5 or 7, and/or as spray bars such as FIG. 9) fabricated into the exit end of a curved housing (made of conventional materials, stainless steel, or non-reactive composite material). These drizzle bars are employed in arrays, or manifolds, for delivery of low pressure condensed droplets of CPCF onto the spill or site to be remediated. The sparger units may be adjustable in direction and in the dispersion pattern and area (e.g., to adjust CPCF droplet size and/or density, per unit of spill surface area). The sparger units may be connected to a cryogenic conduit for CPCF delivery, and may couple to CPCF influx pressure valves, phase separators, or other control assemblies that enable the adjustment of CPCF flow and/or droplet properties according to the type of spilled material(s), and/or according to the environment or conditions at the spill site.

Figure 14A:
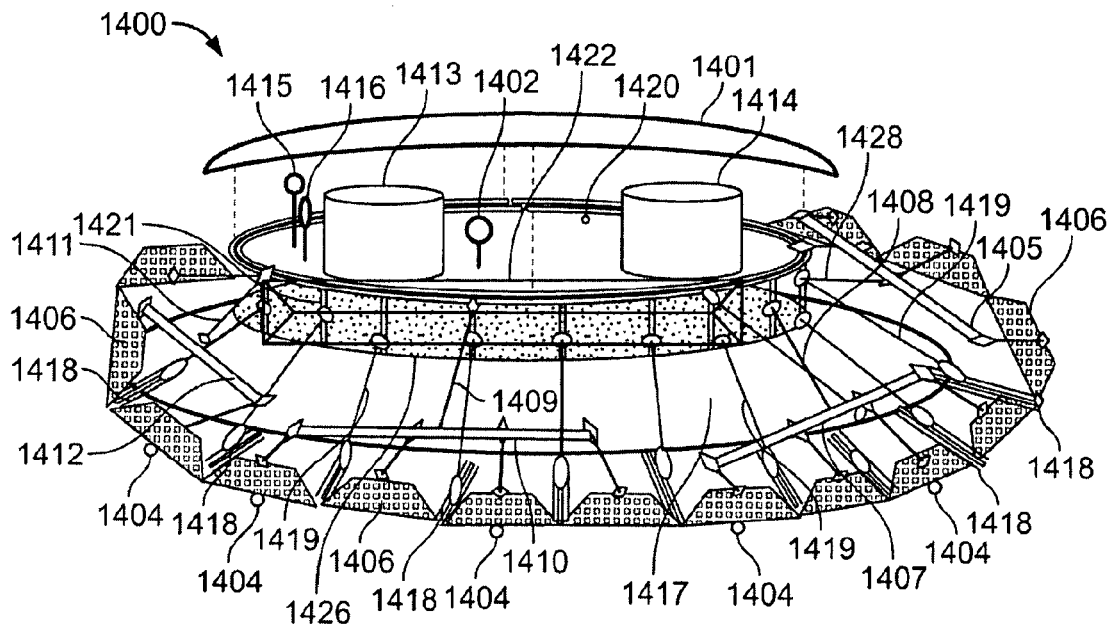
FIGS. 14A and 14B illustrate an example of a remediation apparatus.
Figure 14B:
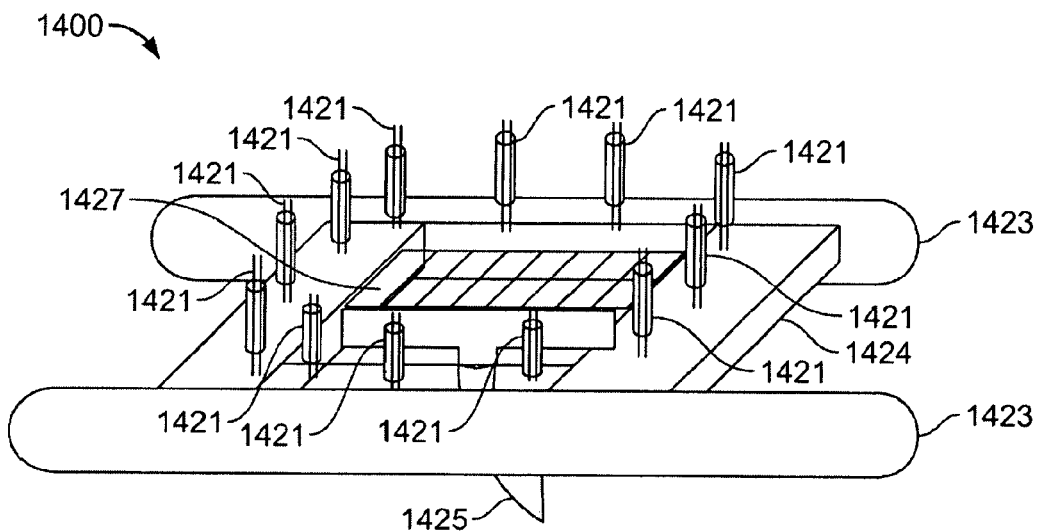

FIGS. 14A and 14B depict an implementation of a self-contained remediation unit 1400. This implementation 1400 is generally disk-shaped and includes two major sets of components: (1) that which is generally visible at or above the surface of the substrate (FIG. 14A) and (2) that which is generally not visible at or above the surface of the substrate (FIG. 14B). This implementation 1400 may find use in coastal and non-coastal waters, and, given its generally circular design, can collect waste in substantially all directions (e.g., over surfaces of 360 degrees).

Starting with FIG. 14A, this implementation includes a deck 1420 that structurally supports two CPCF storage tanks 1413 and 1414. These tanks may take the form of modular Dewars, or refillable containers and the like. In some implementations, alternately, 1413 and 1414 may act as CPCF reservoirs in the active supply of CPCF (e.g., from a barge or another vessel), and/or as components of supplemental CPCF flow systems. Also, 1413 and 1414 may be portable CPCF supply containers retrieved from (and/or recycled to) the hub of FIG. 4 (e.g., item 405). Some implementations are adapted to be controlled by a human operator situated on the deck 1420. Such implementations include mechanical assemblies or controls 1402 for directing the motion (steering and propulsion) of the craft 1400, and/or for operation of the hydraulic and/or risers 1421. In other implementations, the craft 1400 is GPS navigated and remotely controlled. Accordingly, GPS navigational control and antenna 1415 are provided. A roof/shield 1401 made of, e.g., a light-weight reflective material, is provided to protect the CPCF storage tanks 1413 and 1414 and technical staff (e.g., when not operated remotely via GPS), from direct effects of sunlight, wind, and/or waves.

The deck 1420 is supported by an array of pneumatic and/or hydraulic risers 1421. These risers 1421 are coupled to the lower structure 1424 of FIG. 14B, and control the height of the deck relative to the water/substrate surface. Since the central waste tank 1422 (i.e., where collected oil/ice, spill waste products, and other materials being remediated, are deposited and stored) is disposed near the deck 1420, adjusting the pneumatic and/or hydraulic risers 1421 adjusts the height of the waste tank 1422 relative to the substrate surface. The pneumatic and/or hydraulic risers 1421 may be adjusted according to the prevalent wave height, overall turbidity, and/or wind conditions at the spill or remediation site. The central waste tank 1422 may be constructed in various sizes, e.g., from less than 500 gallons to more than 25,000 gallons.

Below the deck 1420 is a lower platform 1426 that may have approximately the same size and shape as the deck 1420. The lower platform 1426 need not be extremely thick, but in some implementations, is fairly stiff and tough. Examples of appropriate materials include single- and multi-phase steels, plastics, composites (e.g., incorporating carbon fiber and/or polyamides) and aluminum alloys. Appropriate thicknesses and sizes vary with the implementations. For example, the lower platform may, depending on the implementation, be between 0.5" and 4" thick. An apron 1417 is coupled to the waste storage tank 1422 and/or lower platform 1426. The apron 1417 can be made of a flexible low temperature polymer, or a synthetic rubber, or the like. It is attached to 1422 and/or 1426 along only its inner circumference, while the bulk apron is allowed to hang freely, e.g., with the outer perimeter extending down into the water column (below the surface of the spilled substrate). The upper surface of the apron 1417 generally defines a path, or 360° surface, from the substrate surface (spill) to the intake of central waste tank 1422.

Extending outwardly from the lower platform 1426 and/or deck 1420 are CPCF supply lines 1419 that are coupled to tanks 1413 and 1414 and slidibly coupled to the pneumatic lifters 1421. These supply lines 1419 may take the form of insulated tubing (e.g., vacuum insulated) coupled to support rods. The supply lines 1419 are each connected to sparging units (drizzle bars or manifolds) 1418 to provide the CPCF delivery systems. The sparging units (drizzle bars or manifolds) can take many forms, in order to preferably deliver CPCF to the surface of the spill substrate (e.g., according to spilled substrate or spill conditions). More particular examples of sparger configurations can be found in, e.g., FIGS. 5-12 and the description therewith. The spargers 1418 cause the substrate that is located at or near the terminus of the apron 1417 to substantially increase in viscosity and to be cryogenically converted via viscous agglomeration, accretion and encapsulation, and/or sequestration via lattice uptake (e.g., to solidify), for efficacy of removal and/or remediation. In some implementation, each sparger unit (or drizzle bar manifold) includes a flotation device so that it remains afloat and does not submerge into the water. Since the supply lines 1419 are slidibly coupled to the pneumatic and/or hydraulic lifters 1421, the sparger units 1418 may move in the vertical direction. In some implementations, the supply lines 1419 may only slide along the upper one-third of the pneumatic and/or hydraulic lifters.

Sensors 1404 (coupled to a controller, e.g., item 104 of FIG. 1) in some implementations may be infrared (IR), near infrared (NIR), and/or or optoacoustic (OA) detectors, to monitor, for example, the thickness and makeup of the ice-oil composite or solid mixed-state (e.g., percent oil vs. water-ice, molecular properties, densities, viscosities, and/or relative concentrations of different types of oil in the composite), and/or for monitoring the thickness of the oil spill at a given location, the relative concentrations, viscosities, molecular and/or other properties of the spilled oils (or other substrates or contaminants). Thus, it can be determined, via monitoring the data from the sensors, the extent to which the substrate at or near the terminus of the apron 1417 has solidified, the concentrations (relative amounts, viscosities, and densities) and/or molecular composition of the ice-oil mixed-state, and such properties can be compared with those of the remaining oil or spill substrate. In this manner the efficiency of the clean-up operation (in terms of the composition of solid mixed-state being removed), as well as the rate and overall effectiveness of the remediation (in terms of the composition of the remaining substrate or oil spill) can be assessed and monitored. A data processor and antenna 1416 can be used to transmit the raw data received from the sensors 1406, and/or analyses of that data, to remote receivers (e.g., to a central hub or remote communications center). The data from such sensors may also be sent (or fed back) to a controller, and used to control the rate, droplet properties, and/or dispersal patterns over which CPCF is delivered to the substrate, the operation of the control arms 1411, 1409, 1408 and 1428 (e.g., the contraction/extension rates and/or forces applied by the hydraulic or pneumatic components), and/or to direct the motion of the vessel 1400.

The viscous agglomerate and/or solidified substrate (or solid ice-oil mixed-state) is collected and stored in the central waste tank 1422 by dragging the agglomerated or solidified substrate up along the apron 1417 towards, and into, the tank 1422. Transport scoops 1406 are disposed along the outside perimeter of the apron 1417, and cover approximately 360 degrees. The transport scoops may be substantially basket-shaped and may have a perforated construction so that liquid substrate passes, while solid substrate is collected. The scoops 1406 may be constructed of various materials, but should—in some implementations—be fairly stiff and rigid, and resistant to low temperatures. Possible materials include single- and multi-phase stainless steel, aluminum alloys, polyethylene, silicon carbide or carbon composite materials that are non-reactive (for use in spills of corrosive liquids, combustibles, and/or toxic/noxious or reactive chemicals).

The scoops 1406 are coupled to crossbars. The crossbars may support between, e.g., 1 and 5 scoops. Visible from this perspective is crossbar 1412 which supports two scoops; crossbar 1410 which supports four scoops; crossbar 1407 which supports four scoops and crossbar 1405 which supports three scoops. Other crossbars are disposed on the opposite (far) side of the craft 1400 and are not visible in this perspective. Attached to each crossbar, respectively, is a control arm 1411, 1409, 1408 and 1428. The crossbars and/or control arms, in some implementations, are self-buoyant (e.g., rigid beams that are encased in buoyant materials or have supplemental buoyant elements affixed) so that they are "free-floating" on one end (at the crossbeam), while constrained via attachment to small freely moving collars (or sleeves with vertical degree of freedom) around the hydraulic or pneumatic lifters 1421. Thus, the scoops 1406, while tethered (with vertical degree of freedom) at their inner end, can respond, automatically, to the motion induced by wind and waves, and remain at (or very close to) the surface of the spill at their outer end. In some implementations, the control arms may slide only along the lower one-third of the hydraulic or pneumatic lifters 1421.

By controlling the control arms 1408, 1409, 1411 and 1428 (and in turn the crossbars 1405, 1407, 1410, and 1412), the corresponding scoops 1406 are caused to drag the agglomerated and/or solidified substrate (e.g., the solid mixed-state of water-ice and oil or other spilled substance) inwardly towards and into the central waste tank 1422. The control arms may be telescoping in some implementations. More particularly, the control arms may be animated by hydraulic or pneumatic action, and may be coupled to the supplies of the hydraulic or pneumatic risers 1421. In some implementations, the dragging action is caused by drawing hydraulic fluid out of the control arms, causing them to shorten, while the action of extension is caused by supply of hydraulic fluid into the control arms. In some implementations, the scoops 1406 have a trapezoidal geometry that allows them to pass freely under the sparger manifolds or drizzle bars 1418.

FIG. 14B illustrates the lower part of the craft 1400. The lower part provides, among other things, the foundation and support structure for the operational components (associated with the upper part of FIG. 14A). It includes sponsons 1423 (e.g., adjustable pontoons), the cross-beams and support structure 1424 (which may, in some implementations, contain supplemental floatation units) that provide buoyancy for the aspects of the system 1400, along with the power and propulsion units (e.g., a diesel powered jet boat drive 1425), and the adjustable hydraulic and/or pneumatic risers 1421 (also visible in FIG. 14A) that can independently raise and lower the deck 1420 and/or platform 1426 as needed (e.g., according to the prevalent wave height and wind conditions at the spill site). The jet boat drive 1425 may be powered by an on-board diesel fuel tank 1427.

The size of the device 1400 can vary depending upon the implementation. Some implementations have a diameter of about 10 feet across, while other implementations may be approximately 100 feet or more across.

Figure 15:
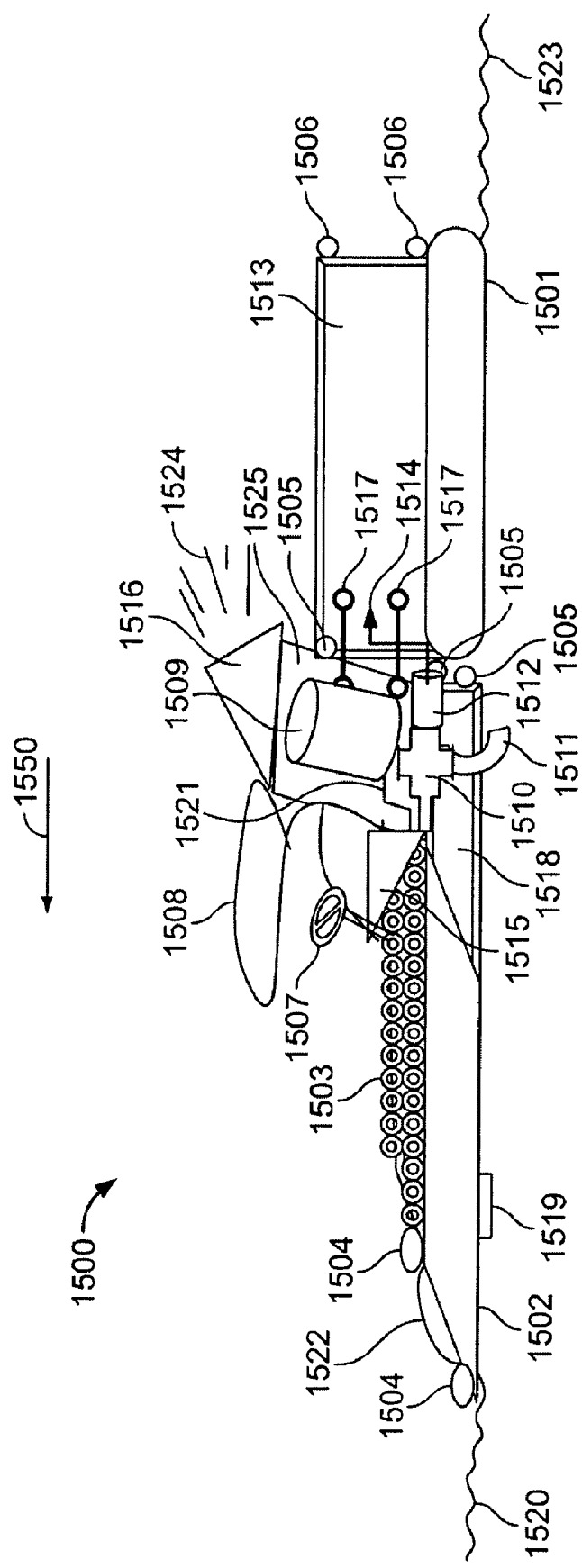
FIG. 15 illustrates an example of a remediation apparatus.

FIG. 15 is an illustration of another implementation of a remediation unit 1500. This craft 1500 can be implemented for use in oil-spills and spills of other immiscible substrates, ranging from small-to-large-scale, and can be used for open-ocean, coastal, inland waterway, and/or estuarine cleanup operations. The craft 1500 travels generally in the direction of arrow 1550, collecting the substrate with a plow tip 1522, causing the substrate 1520 to flow under a sparger array 1503 (which dispenses CPCF and causes it to increase in viscosity and/or solidify). The craft transports some of the agglomerated and/or solid mixed-state of the spill substrate 1520 rearward toward a waste tank 1513.

Generally speaking, the craft 1500 includes three major sub-assemblies. The first sub assembly is the sled unit, which comprises sponsons (e.g., adjustable buoyancy pontoons) 1502, sparger array 1503, sensor pack 1519, plow tip 1522 and attachment rings 1504. In some implementations, there are two sponsons 1502, which are substantially parallel to each other (this perspective hides the distant sponson from view, but it is substantially similar to the near sponson). The two sponsons are separated by a distance that varies with the implementation (e.g., from about less than three feet to more than 25 feet). That space between the sponsons 1502 is occupied by the sparger array 1503. The sparger array 1503 includes, in some implementations, an array of sparging units or drizzle bars (e.g., of FIG. 12) and a support structure to maintain rigidity of the array 1503. Accordingly, the substrate between the sponsons 1502 is exposed to CPCF from the sparger array 1503, which causes the substrate 1520 to become, e.g., a viscous agglomerate or solid ice-oil mixed phase. Attachment rings 1504 can be used for attaching auxiliary capture devices (e.g., interchangeable plow tips 1522). The attachment rings 1504 may also include adjustable buoyancy devices in order to adjust the sparger array depth relative to the substrate 1520 and maintain the most effective position of the plow tip 1522 within the oil-spill boundary layer. The sensor pack 1519 performs functions similar to sensors 1404 of FIG. 14, and may be coupled to a controller (e.g., item 104 of FIG. 1). The controller may be adapted to control the rate of delivery of CPCF to the substrate.

The sled unit, in some implementations, is angled downward toward the substrate 1520 so the substrate 1520 is directed adjacent to the sparger array 1503 and in the direction toward the waste tank 1513 (as the craft 1500 travels in the direction of arrow 1550). The sparging units in the sparger array 1503 are adjustable so that the spargers may be configured at different angles, and for a variety of CPCF dispersion patterns. The sparger array receives CPCF from an on-board CPCF tank 1509 (e.g., a Dewar, modular supply unit, or item 405 of FIG. 4) that is coupled to CPCF supply line 1521. The supply line 1521 is, in some implementations, vacuum insulated. The CPCF tank 1509 may come in various sizes depending on the implementation, e.g., 150, 250, 350 or 500 gallons, and can be re-filled or exchanged for replacement (full) kegs at the on-site central hub (e.g., of FIG. 4) or on-shore CPCF tank. The CPCF tank 1509 is disposed in a housing 1525 that includes a pump, pressure control valves (e.g., keepfulls), a controller and insulated cryogenic conduits and hoses (e.g., 1521) to transfer low pressure CPCF to the sparger array 1503.

The second sub-assembly is the control section. The control section includes controls for operating the craft 1507 (e.g., steering, speed, CPCF delivery rate, etc.), a roof 1508 to protect the operator, a seat for the operator 1515, a deck 1518 that supports the structures that make up the control section, the CPCF tank 1509, the CPCF housing 1525 and several waste and craft transport components. A compressor 1510 has several functions. The compressor 1510 draws in the agglomerate and/or solid mixed-state of the spill substrate (and some spill fluids plus water) from one direction and discharges it at a higher pressure in a second direction. The compressor 1510 can be diesel powered, for example. A jet drive 1511 is coupled to the compressor 1510 (or directly to a diesel power source) to provide motive force to the craft. By discharging the fluid rearward, the craft is able to travel forward. Also, the compressor is coupled to receive the substrate 1520 that passes under the sparger array 1503 and pass it through a vortex chamber 1512, for eventual deposit in the waste tank 1513 via transport path 1514. The compressor 1510 and vortex chamber 1512 cause mechanical and pneumatic fragmentation of the ice-oil solid phase by an auger, and via vortical action by compressed air. In other implementations, the compressor is not used to transport the substrate 1520 into the waste tank 1513. Instead, a blower unit 1516 collects the incoming substrate 1520 and projects it (1524) into the waste tank 1513. Implementations with the blower unit 1516 preferably employ a waste tank 1513 with an open top to allow the projected substrate (1524) to be deposited therein.

The third sub-assembly is the waste section. It includes the waste tank 1513, sponsons (e.g., adjustable buoyancy pontoons) 1501, attachment rings 1505 and 1506, and lock bars 1517 that couple the waste section to the control section. Attachment rings 1505 may further couple the waste section to the control section, and also may provide additional buoyancy control. The waste tank 1513, in some implementations, is designed with a v-shape and efflux valves to additionally function as a separatory funnel-like container for separation of water and oil (or other immiscible substrate) phases.

The rings 1504 and 1505 are also usable for docking the unit at on-site central hub (e.g., of FIG. 4) for servicing (re-fueling, re-filling or recycling/exchange of CPCF kegs, transfer of remediated pollutant substrates to larger holding tanks, etc.), for towing the units, and/or for loading/unloading or storing units on transport vessels.

As the craft moves in direction 1550, the spill site 1523 contains less oil (or other substance being remediated) than substrate 1520.

While the size of the unit 1500 will vary depending on the implementation, possible lengths include less than 12 feet to more than 30 feet. In this implementation, the waste tank 1513 is shown to right of the sparger array 1503. In other implementations, a secondary barge or other type of storage vessel to contain and transport the retrieved product (e.g., cleaned-up oil-spill materials) from the spill site—or the sparger array 1503 and related structure can be towed (e.g., by a barge, tug, or other vessel), and the frozen oil-spill material can be blown forward onto the towing barge (or onto a container onboard the towing vessel).

Figure 16A:
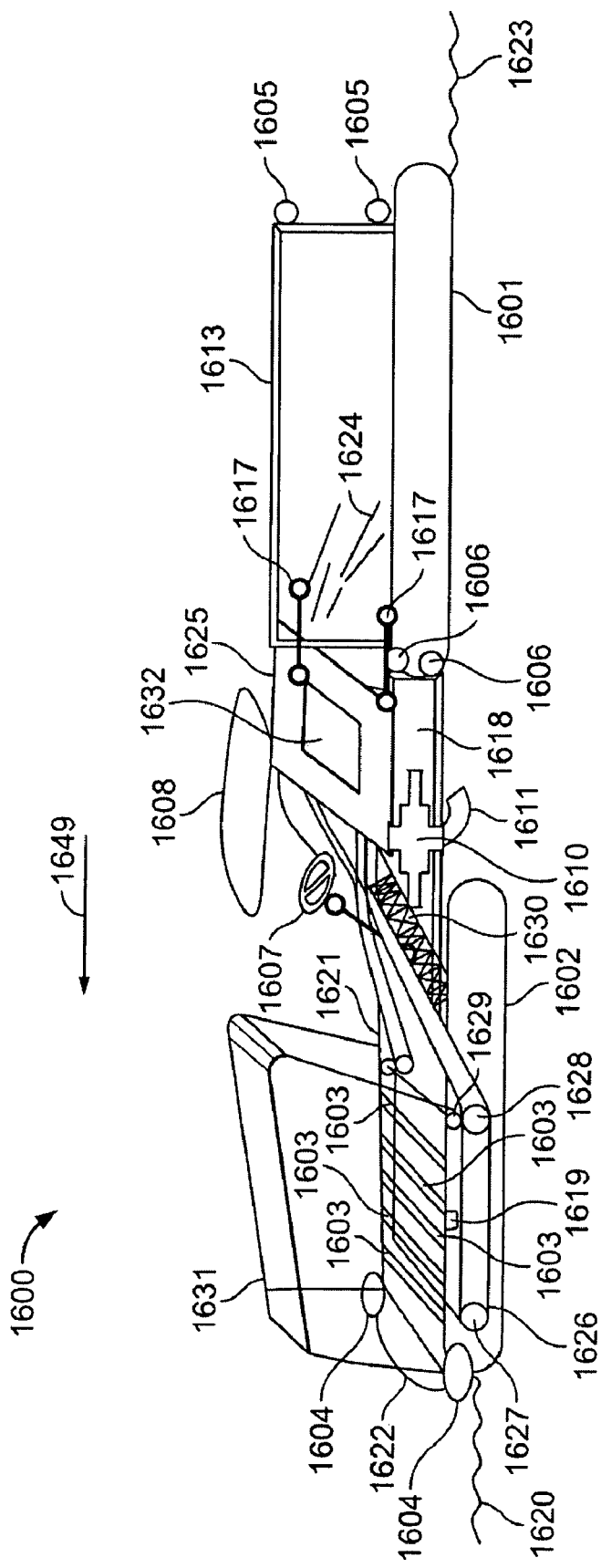
FIG. 16A illustrates an example of a remediation apparatus.

FIG. 16A is an illustration of another implementation of a remediation unit 1600. This craft 1600 can be implemented for use in oil-spills and spills of other immiscible substrates, ranging from small-to-large-scale, and can be used for open-ocean, coastal, inland waterway, and/or estuarine cleanup operations. In the example perspective that is illustrated, the craft 1600 travels generally in the direction of arrow 1649, collecting the substrate 1620 with a plow tip 1622, thereby causing the substrate 1620 to come atop a moving belt 1626 and be cooled by a sparger array 1603 (causing it to increase in viscosity and/or solidify). The moving belt 1626 transports the collected agglomerate and/or solid mixed-state of ice and spill substrate 1620 to a waste tank 1613.

Generally speaking, the craft 1600 includes three major sub-assemblies. The first sub assembly is the catamaran unit, which comprises sponsons (e.g., adjustable buoyancy pontoons) 1602, sparger array 1603, sensor pack 1619, plow tip 1622, belt 1626 and related pulleys (1627, 1628 and 1629) and attachment rings 1604. In some implementations, there are two sponsons 1602, which are substantially parallel to each other (this perspective hides the distant sponson from view, but it is substantially similar to the near sponson). The two sponsons are separated by a distance that varies with the implementation (e.g., from about less than 3 feet to more than 30 feet). That space between the sponsons 1602 is occupied by the sparger array 1603, the belt (or conveyor) 1626 and its related pulleys (1627, 1628 and 1629). The sparger array 1603 includes, in some implementations, an array of sparging units or drizzle bar manifolds (e.g., of FIG. 12) and a support structure to maintain rigidity of the array 1603. Accordingly, the substrate between the sponsons 1602 that is brought upon the belt 1626 is exposed to CPCF by the sparger array 1603. This exposure causes the substrate 1620 to become, e.g., a viscous agglomerate or solid ice-oil mixed phase.

Attachment rings 1604 can be used for attaching auxiliary capture devices (e.g., interchangeable plow tips 1622). The attachment rings 1604 may also include adjustable buoyancy devices in order to adjust the sparger array depth relative to the substrate 1620 and maintain the most effective position of the plow tip 1622 within the oil-spill boundary layer. The sensor pack 1619 performs functions similar to sensors 1404 of FIG. 14, and may be coupled to a controller (e.g., item 104 of FIG. 1). The controller may be adapted to control the rate of delivery of CPCF to the substrate 1620.

The sled unit, in some implementations, is angled downward toward the substrate 1620 so the substrate 1620 is directed onto the belt 1626 and adjacent to the sparger array 1603. The sparging units in the sparger array 1603 are adjustable so that the spargers may be configured at different angles, and for a variety of CPCF dispersion patterns. The sparger array receives CPCF from an on-board CPCF tank (e.g., a Dewar, modular keg, or item 405 of FIG. 4) that is inside the CPCF tank housing 1625 and coupled to CPCF supply line 1621. The supply line 1621 is, in some implementations, vacuum insulated. The CPCF tank may come in various sizes depending on the implementation, e.g., 150, 250, or 350 gallons, and can be re-filled or exchanged for replacement (full) kegs at the on-site central hub (e.g., of FIG. 4) or on-shore CPCF tank. The CPCF tank housing 1625 includes a pump, pressure control valves (e.g., keepfulls or phase separator), a controller and insulated cryogenic conduits and hoses (e.g., 1621) to transfer low pressure CPCF to the sparger array 1603.

The belt 1626 is, in some implementations, made of a material that is highly resistant to low temperatures (e.g., a polymer, synthetic rubber, or other conventional low temperature materials, as available from vendors of cryogenic materials). In some implementations, the belt 1626 is made of a metal mesh, such as stainless steel. A motor 1632 is disposed opposite the CPCF tank housing and, in some implementations, in controlled by the controller (e.g., item 104 of FIG. 1). Motor 1632 causes the upper portion of the belt 1626 to travel toward the waste tank 1613 (naturally, the lower portion of the belt 1626 travels away from the waste tank 1613). The belt 1626 is supported by a front pulley 1627 near the plow tip 1622. In some implementations, front pulley 1627 is a idler puller. Pulleys 1628 and 1629 (also idler pulleys in some implementations) act as pinch rollers (or a capstan) and allow the belt 1626 to incline upwardly relative to the sponsons 1602. Since substantial portions of the top surface of the belt 1626 is carrying waste material, the upper pulley 1629 preferably (in some implementation) contacts a portion of the belt (e.g., the outermost portion(s)) that is not carrying waste material. The belt 1626 may have features such as integral crossbars that prevent the solidified substrate 1620 from sliding downward as the belt 1626 inclines. To prevent the solidified substrate from falling off the sides of the belt 1626 as it inclines, side guides 1630 are disposed on both sides of the inclined section of the belt 1626. At the transition point of the belt's travel (i.e., the point at which a given point on the belt stops traveling toward the waste tank 1613 and beings traveling toward the plow tip 1622), the solidified substrate is ejected (1624) into the waste tank 1613.

Some implementations utilize a hood 1631 over the catamaran section. The hood 1631, among other things, takes advantage of mixed- and vapor-phase cryogenic fluid. Normally, as CPCF is applied to the substrate 1620, some CPCF is immediately transformed into the vapor phase, disperses into the atmosphere, and plays effectively no role in the remediation process. By installing the hood 1631 over the sparger array 1603, the vapor phase cryogenic fluid is kept near the substrate being remediated and/or channeled over the path of the conveyor to assist in maintaining the solid mixed-state and/or agglomerate. In some implementations, the hood 1631 is used to capture and recirculate the vapor phase cryogenic fluid. The hood 1631 may also increase user-friendliness by reducing any impairment in the region of vision for remediation staff and mobile unit operators. In some implementations, hoods of specialized design and composition may be particularly important in operations involving flammables, reactive chemicals, release/dispersion of radioactive materials, and biohazards. More conventional retainers and hoods may also be advantageous in implementations for operations in warmer water and/or at higher air or ground temperatures, as well rougher waters (e.g., to minimize effects of sea-spray and wave action), and for operation in windy conditions.

The second sub-assembly is the control section. The control section includes controls for operating the craft 1607 (e.g., steering, speed, CPCF delivery rate, belt speed, etc.), a roof 1608 to protect the operator, a deck 1618 that supports the structures that make up the control section, the CPCF housing 1625 and several waste and craft transport components. A compressor 1610 has several functions. The compressor 1610 draws in fluid from one direction and discharges it at a higher pressure in a second direction. The compressor 1610 can be diesel powered, for example. A jet drive 1611 is coupled to the compressor 1610 to provide motive force to the craft. By discharging fluid rearward, the craft 1600 is able to travel forward. Steering is accomplished by adjusting the direction of the jet drive 1611.

The third sub-assembly is the waste section. It includes the waste tank 1613, sponsons (e.g., adjustable buoyancy pontoons) 1601, attachment rings 1605 and 1606, and lock bars 1617 that couple the waste section to the control section. Attachment rings 1606 may further couple the waste section to the control section, and also may provide additional buoyancy control. The waste tank 1613, in some implementations, is designed with a v-shape and efflux valves to additionally function as a separatory funnel-like container for separation of water and oil (or other immiscible substrate) phases.

The rings 1604 and 1605 are also usable for docking the unit 1600 at an on-site central hub (e.g., of FIG. 4) for servicing (re-fueling, re-filling or recycling/exchange of CPCF kegs, transfer of remediated pollutant substrates to larger holding tanks, etc.), for towing the unit, and/or for loading/unloading or storing units on transport vessels.

As the craft moves in the direction of arrow 1649, the substrate 1623 contains less oil (or other substance being remediated) than substrate 1620.

While the size of the unit 1600 will vary depending on the implementation, possible lengths include less than 12 feet to more than 30 feet. In this implementation, the waste tank 1613 is shown to right of the sparger array 1603. In other implementations, a secondary barge or other type of storage vessel to contain and transport the retrieved product (e.g., cleaned-up oil-spill materials) from the spill site—or the sparger array 1603 and related structure can be towed (e.g., by a barge, tug, or other vessel), and the frozen oil-spill material can be transported forward on the belt 1626 onto the towing barge (or onto a container onboard the towing vessel).

Figure 16B:
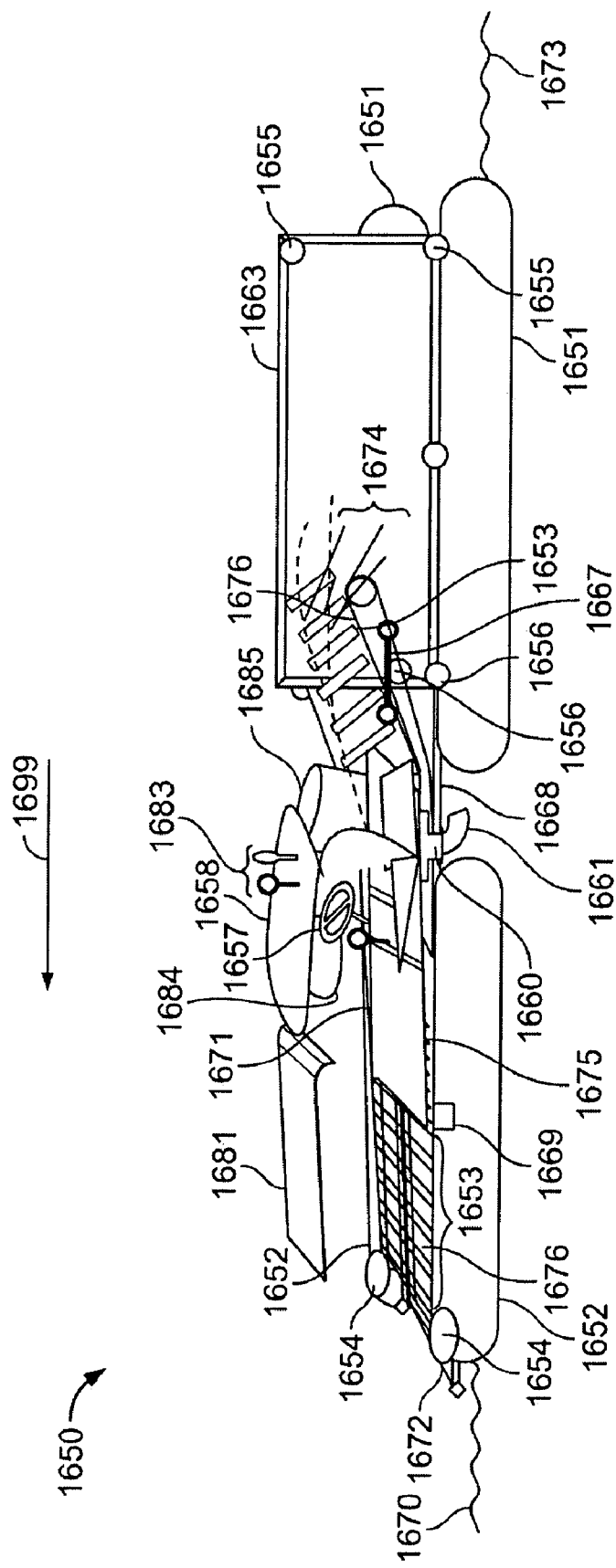
FIG. 16B illustrates an example of a remediation apparatus.

FIG. 16B illustrates yet another implementation of a remediation unit 1650, and is, in context, a variation of the implementation 1600 of FIG. 16A. This craft 1650 can be implemented for use in oil-spills and spills of other immiscible substrates, ranging from small-to-large-scale, and can be used for open-ocean, coastal, inland waterway, and/or estuarine cleanup operations. In the example perspective that is illustrated, the craft 1650 travels generally in the direction of arrow 1699, collecting the substrate 1670 with a plow tip 1672, thereby causing the substrate 1670 to come atop a moving belt 1676 and be cooled by a sparger array 1653 (causing it to increase in viscosity and/or solidify). The moving belt 1676 transports the collected agglomerate and/or solid mixed-state of ice and oil immiscible substrate 1670 to a waste tank 1663.

Generally speaking, the craft 1650 includes three major sub-assemblies. The first sub assembly is the catamaran unit, which comprises sponsons (e.g., adjustable buoyancy pontoons) 1652, sparger array 1653, sensor pack 1669, plow tip 1672, belt 1626 and related pulleys (not visible in this implementation, but similar to items 1627, 1628 and 1629 of FIG. 16A) and attachment rings 1654. In some implementations, there are two sponsons 1652, which are substantially parallel to each other as shown. The two sponsons 1652 are separated by a distance that varies with the implementation (e.g., from about less than 3 feet to more than 30 feet). That space between the sponsons 1652 is occupied by the sparger array (drizzle bar manifolds) 1653, the belt or conveyor 1676 and its related pulleys. The sparger array 1653 includes, in some implementations, an array of sparger units or drizzle bars (e.g., of FIG. 12) and a support structure to maintain rigidity of the array 1653. Accordingly, the substrate between the sponsons 1652 that is brought upon the belt 1676 is exposed to CPCF by the sparger array 1653. This exposure causes the substrate 1670 to become, e.g., a viscous agglomerate or solid ice-oil mixed phase. In this implementation, a sparger array 1653 can also be located near the waste tank 1663. This maintains the substantially frozen state of the substrate 1670, and is useful in applications, e.g., for remediating heavy weight oils, flammable or combustible substrates, toxic, noxious, and/or hazardous substances.

Attachment rings 1654 can be used for attaching auxiliary capture devices (e.g., interchangeable plow tips 1572). The attachment rings 1654 may also include adjustable buoyancy devices in order to adjust the sparger array depth relative to the substrate 1670 and maintain the most effective position of the plow tip 1672 within the oil-spill boundary layer. The sensor pack 1669 performs functions similar to sensors 1404 of FIG. 14, and may be coupled to a controller (e.g., item 104 of FIG. 1). The controller may be adapted to control the rate and/or pattern of delivery of CPCF to the substrate 1670, to operate the conveyors, and/or to direct motion of the vessel (when not operated in GPS mode).

The sled unit, in some implementations, is angled downward toward the substrate 1670 so the substrate 1670 is directed onto the belt 1676 and adjacent to the sparger array 1653. The sparging units in the sparger array 1653 are adjustable so that the spargers may be configured at different angles, and for a variety of CPCF dispersion patterns. The sparger array receives CPCF from an on-board CPCF tank 1685 (e.g., a Dewar, modular keg, or item 405 of FIG. 4) that is coupled to the housing 1675 and CPCF supply line 1671. The supply line 1671 is, in some implementations, vacuum insulated. The CPCF tank 1685 may come in various sizes depending on the implementation, e.g., 150, 250, 350 or 500 gallons, and can be re-filled or exchanged for replacement (full) kegs at the on-site central hub (e.g., of FIG. 4) or on-shore CPCF tank. The housing 1675 includes a conveyor drive assembly coupled to the belt 1676, a pump, pressure control valves (e.g., keepfulls, phase separator), a controller and insulated cryogenic conduits and hoses (e.g., 1671) to transfer low pressure CPCF to the sparger array 1653.

The belt 1676 is, in some implementations, made of a material that is highly resistant to low temperatures (e.g., a polymer, synthetic rubber, or other conventional low temperature materials, as available from vendors of cryogenic materials). In some implementations, the belt 1676 is made of a metal mesh, such as stainless steel. The conveyor drive inside the housing 1675 is, in some implementations, controlled by the controller (e.g., item 104 of FIG. 1). The conveyor drive causes the upper portion of the belt 1676 to travel toward the waste tank 1663 (naturally, the lower portion of the belt 1676 travels away from the waste tank 1663). The belt 1676 is offset to one side of the CPCF tank 1685 and where the operator sits (i.e., adjacent the steering wheel and related controls 1657) so that it has a clear path into the waste tank 1663. The belt 1676 may have features such as integral crossbars that prevent the solidified substrate 1670 from sliding downward as the belt 1676 inclines. At the transition point of the belt's travel (i.e., the point at which a given point on the belt stops traveling toward the waste tank 1663 and beings traveling toward the plow tip 1672), the solidified substrate is ejected (1674) into the waste tank 1663.

Some implementations utilize a hood 1681 over the catamaran section. The hood 1681, among other things, takes advantage of mixed- and vapor-phase cryogenic fluid. As CPCF is applied to the substrate 1670, some CPCF is immediately transformed into the vapor phase, disperses into the atmosphere, and plays effectively no role in the remediation process. By installing the hood 1681 over a portion of the sparger array 1653, the vapor phase cryogenic fluid is kept near the substrate being remediated and/or channeled over the path of the conveyor to assist in maintaining the solid mixed-state and/or agglomerate. In some implementations, the hood 1681 is used to capture and recirculate the vapor phase cryogenic fluid. The hood 1681 may also increase user-friendliness by reducing any impairment in the region of vision for remediation staff and mobile unit operators (when not operated in GPS mode). In some implementations, hoods of specialized design and composition may be particularly important in operations involving flammables, reactive chemicals, release/dispersion of radioactive materials, and biohazards. More conventional retainers and hoods may also be advantageous in implementations for operations in warmer water and/or at higher air or ground temperatures, as well rougher waters (e.g., to minimize effects of sea-spray and wave action), and for operation in windy conditions.

The second sub-assembly is the control section. Main components of the control section include controls for operating the craft 1687 (e.g., steering, speed, CPCF delivery rate, belt speed, etc.), a GPS navigational system and antenna 1683, a roof 1658 to protect the operator, a deck 1658 that supports the structures that make up the control section, housing 1675, CPCF tank or modular CPCF keg 1685 and several waste and craft transport components 1668. Atop the roof 1658 are an antenna 1683 for transmission/reception of GPS signals (e.g., from a central hub like that of FIG. 4 or a land-based control center) and GPS navigational operating system, and a data processor and antenna 1683 for transmission of infrared and/or optoacoustic data from sensor pack 1669. A windshield 1684 provides further protection to the driver (when operated manually, without GPS system).

Also, a compressor 1660 has several functions. The compressor 1660 draws in fluid from one direction and discharges it at a higher pressure in a second direction. The compressor 1660 can be diesel powered, for example. A jet drive 1661 is coupled to the compressor 1660 (or directly to a diesel power source) to provide motive force to the craft. By discharging fluid rearward, the craft 1660 is able to travel forward. Steering is accomplished by adjusting the direction of the jet drive 1661 (either manually or remotely via GPS navigational system).

The third sub-assembly is the waste section. It includes the waste tank 1663, sponsons (e.g., adjustable buoyancy pontoons) 1651, attachment rings 1655 and 1656, and lock bars 1667 that couple the waste section to the control section. Attachment rings 1656 may further couple the waste section to the control section, and also may provide additional buoyancy control. The waste tank 1663, in some implementations, is designed with a v-shape and efflux valves to additionally function as a separatory funnel-like container for separation of water and oil (or other immiscible substrate) phases.

The rings 1654 and 1655 are also usable for docking the unit 1650 at an on-site central hub (e.g., of FIG. 4) for servicing (re-fueling, re-filling or recycling/exchange of CPCF kegs, transfer of remediated pollutant substrates to larger holding tanks, etc.), for towing the unit, and/or for loading/unloading or storing units on transport vessels.

As the craft moves in the direction of arrow 1699, the substrate 1673 contains less oil (or other substance being remediated) than substrate 1670.

While the size of the unit 1650 will vary depending on the implementation, possible lengths include less than 12 feet to more than 30 feet. In this implementation, the waste tank 1663 is shown to right of the sparger array 1653. In other implementations, a secondary barge or other type of storage vessel to contain and transport the retrieved product (e.g., cleaned-up oil-spill materials) from the spill site—or the sparger array 1653 and related structure can be towed (e.g., by a barge, tug, or other vessel), and the frozen oil-spill material can be transported forward on the belt 1676 onto the towing barge (or onto a container onboard the towing vessel).

Figure 17:
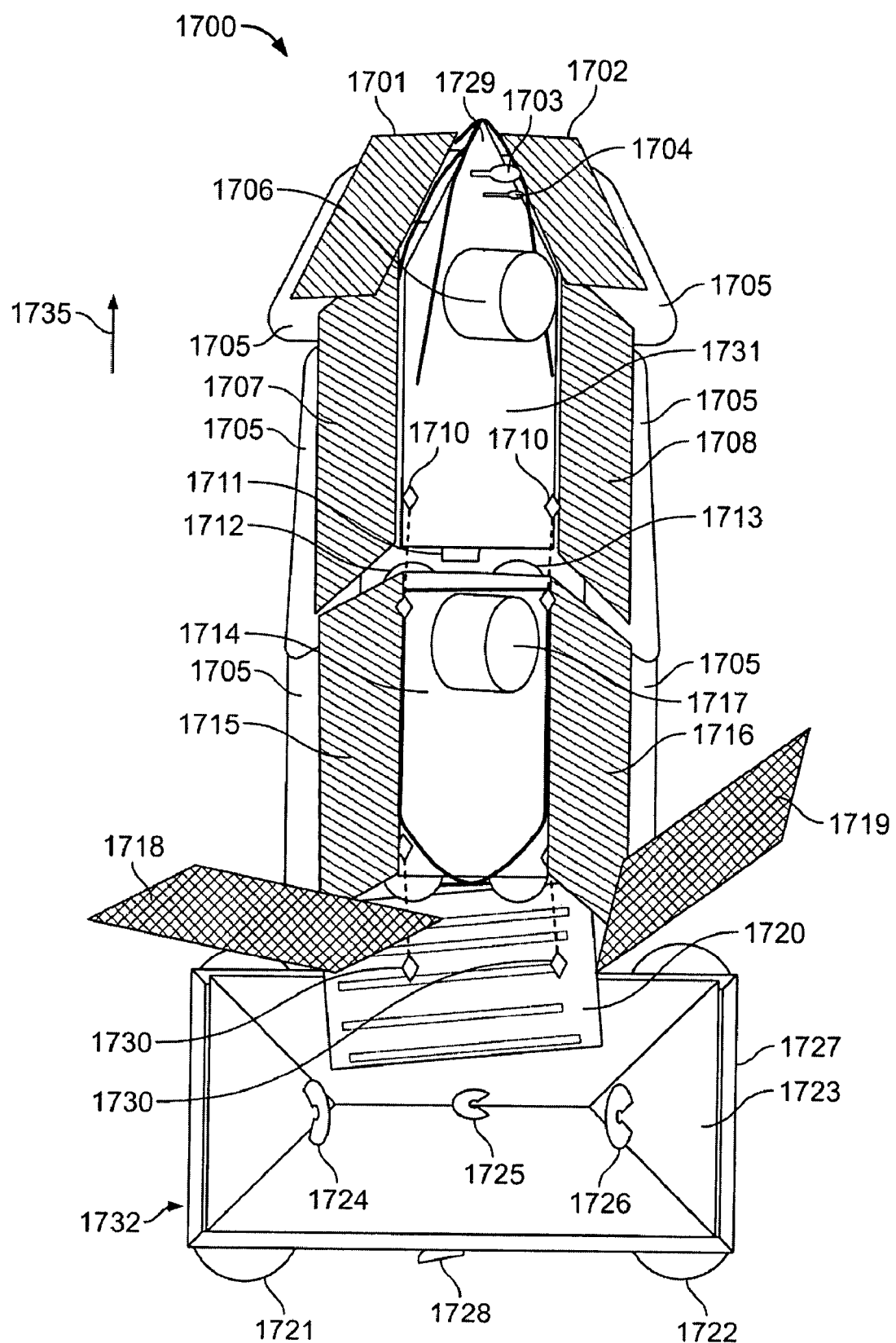
FIG. 17 illustrates an example of a remediation apparatus.

FIG. 17 illustrates another implementation of a remediation vessel 1700. This vessel 1700 is modular in the sense that it can be configured for small jobs or expanded for larger jobs. Generally speaking, this implementation 1700 includes three major elements, namely, a control section (e.g., 1731), one or more auxiliary remediation sections (e.g., 1714), and a waste section (e.g., 1732). The auxiliary remediation section 1714 is optional, e.g., for small jobs it may be omitted. Alternatively, larger jobs may utilize multiple auxiliary remediation sections 1714 in series as well as multiple waste sections 1732 in series and/or (substantially) parallel.

The control section 1731 includes flying bridge 1729 at which the vessel 1700 can be controlled (e.g., by personnel). Also, a GPS antenna and navigation system 1703 and radio frequency broadcast system 1704 are disposed in the flying bridge 1729. The GPS system 1703 allows remote control and/or navigation of the craft 1700. The RF broadcast system 1704 is for transmitting, e.g., data from infrared and optoacoustic sensors affixed to the underside of each sparger array 1701, 1702, 1707, 1708, 1715, and 1716 for monitoring the thickness of the immiscible substrate (e.g., indicating the progress of remediation) and thickness of the solid/semi-solid remediated substrate (e.g., indicating the effectiveness of the remediation operation), respectively.

Coupled to either side of the control section 1731 are sparger arrays and/or drizzle bar manifolds 1701, 1702, 1707 and 1708. These may take the form of an array of sparger units or drizzle bars (e.g., of FIG. 12). The sparger arrays receive CPCF from an on-board CPCF tank 1706. The tank 1706 may take the form of a Dewar, modular keg, and/or may be actively cooled. The tank 1706 may come in various sizes, such as 150, 250, or 500 gallons. Alternatively, the tank 1706 may be a modular unit (e.g., item 405 of FIG. 4). The tank 1706 is coupled to the sparger arrays 1701, 1702, 1707 and 1708, thereby allowing the sparger arrays to deliver CPCF to the substrate. The application of CPCF causes the substrate to increase in viscosity and separate from the bulk fluid e.g., as an agglomerate or a solid mixed-state (as shown, 1705). The control section 1731 is propelled by a jet boat drive 1711.

The auxiliary remediation section 1714 is coupled to the control section 1731 by way of coupling arms (e.g., flex-bars) 1710. The auxiliary remediation section 1714 carries its own CPCF tank 1717, which may take a form similar to tank 1706. Each auxiliary remediation section 1714 may include its own CPCF tank, or tanks may be shared between auxiliary remediation vessels and/or control sections. The CPCF tank 1717 is coupled to sparger array 1715 and 1716 which may take substantially the same form as sparger arrays 1701, 1702, 1707 and 1708. Each sparger array may differ in size, shape and configuration. However, in most implementations, it is preferred that the sparger arrays deliver CPCF to the substrate surface. The auxiliary remediation section is kept buoyant by sponsons (e.g., adjustable buoyancy pontoons) 1702 and 1703.

The auxiliary remediation section 1714 is coupled to the waste section 1732 by coupling arms (e.g., flex-bars) 1730. The waste section collects and stores the solid/semi-solid/mixed phase substrate 1705. As the craft proceeds (i.e., in direction 1735), guide screens 1718 and 1719 capture the solid/semi-solid/mixed phase substrate 1705 and channel it onto conveyor 1720. The conveyor 1720 transports the substrate 1705 into the waste tank 1723. The waste tank 1723 may be modular (e.g., item 418 of FIG. 4) and may also perform liquid-phase separation. Liquid phase release valves 1724, 1725 and 1726 may couple to a pump conduit for purging pollutant waste efflux. These components are kept in substantially operational alignment by a support structure 1727, which in some implementations is made of a stiff material (e.g., single or multi-phase stainless steel). Sponsons (e.g., adjustable buoyancy pontoons) 1721 and 1722 support the waste section 1732. Due to the weight of the substrate that may accumulate in the waste tank 1723, the waste section 1732 may have its own jet drive 1728.

For larger spills (or emergencies), one or more auxiliary remediation units 1714 may be inserted and coupled (e.g., as middle sections) between the control section 1731 and waste section(s) 1732 in order to increase the remediation rate, e.g., the surface area remediated per pass of the vessel 1700. Such multi-unit systems will also be employed to address the need for more rapid remediation in special applications and/or hazardous conditions, e.g., for spills of combustible materials, reactive chemicals, toxic/noxious wastes, or to reduce exposure of the populace to harmful materials released in (or associated with) cases of chemical, biological, and/or radiological (nuclear) threats.

The size of the vessel and its sections will vary depending on the implementation. For example, the control section 1731 may be designed as jet boats fabricated by modification of 16 foot or 21 foot catamaran and "trimaran" vessels, or as larger 30 foot or 40 foot barge-type vessels. Other sizes are possible, e.g., less than 16 feet up to more than 40 feet. The size of the vessel may affect the size of the CPCF tank (e.g., 1706). Modular (recyclable) 150, 250, or 350 gallon CPCF kegs may be inserted into housings into smaller vessels (e.g., 16 or 21 foot control or auxiliary remediation sections), whereas refillable 500-2,500 gallon cryogenic supply tanks may be installed on larger vessels (e.g., 30 or 40 foot barge-type control or auxiliary remediation sections).

FIGS. 18A and 18B depict two additional implementations of remediation vessels (1800 and 1850, respectively), which are particularly well-suited for remediating heavier grade oils (e.g., gear oils and crude oils).

FIG. 18A illustrates a first particular implementation of a GPS navigated mobile remediation vessel 1800. The vessel 1800 includes several major components, including sparger array 1801 (see, e.g., FIG. 12), a CPCF tank 1802 coupled to the array 1801 via CPCF piping 1822 (which is insulated, e.g., vacuum insulated), a conveyor 1816, a waste tank 1803 and sleuth components (including 1804, 1808, 1810, 1811, 1812, 1813 and 1814). The vessel 1800 is kept afloat by sponsons (e.g., adjustable buoyancy pontoons) 1818. In this perspective only one sponson is visible (i.e., the lee sponson), but in some implementations a second sponson (i.e., a starboard sponson) is provided as well. The CPCF tank 1802 may take many forms (e.g., a Dewar jar or akin to item 405 of FIG. 4) and be a variety of sizes (e.g., less than 50 gallons to more than 500 gallons).

The vessel 1800 may be unmanned and controlled remotely. A GPS antenna 1806 receives and transmits GPS-related navigational data for directing the craft. An RF receiver/transmitter 1807 transmits real-time data from infrared and optoacoustic sensors 1805 installed under each sparger manifold 1801. The RF receiver/transmitter 1807 may also receive signals that relate to the delivery of CPCF (e.g., flow rate). Alternatively, a controller (e.g., item 104 of FIG. 1) may receive data from the sensors 1805 and automatically control the remediation operation. The controller may be onboard the vessel 1800 or may be remote from it.

The sparger array 1801 delivers CPCF (shown as droplets 1819) onto the substrate 1820. This causes the substrate (e.g., an oil-water mixture) to increase in viscosity and become at least partially solid/semi-solid. The vessel 1800 travels substantially in the direction indicated by arrow 1824 due to, e.g., a diesel-powered jet drive 1817. Accordingly, front guide plates and ramps 1815 channel the substrate 1820 (which has become, e.g., a viscous agglomerate or solid phase due to exposure to CPCF) onto the conveyor 1816. The conveyor 1816 can be either passive or actively cooled. In implementations that utilize an actively cooled conveyor, the conveyor 1816 is coupled to the CPCF tank 1802 and dispenses CPCF through the conveyor belt. This maintains the viscosity of the substrate 1820, and may induce further phase changes (e.g., viscous agglomeration to sequestration by lattice uptake). An actively cooled conveyor is discussed in greater detail in connection with FIG. 18C. The conveyor 1826 includes a drive system to move the belt, and the belt may be constructed of a metal mesh or some polymer or composite material capable of withstanding low temperatures (e.g., low temperature materials available from vendors of cryogenic supplies).

The conveyor 1816 carries the solid/semi-solid substrate 1820 toward the sleuth components. The material falls off of the conveyor 1816 and drops into the sleuth well 1814 (which is supported by sleuth platform 1813). Transport scoops 1808 (coupled to attachment cables) rotate about a shaft with a rotating cam 1811. As the scoops 1808 rotate, they capture material deposited in the sleuth well 1814 and transport it onto the starboard conveyor 1812. The starboard conveyor 1812 may be actively cooled. Regardless, the starboard conveyor transports the material from the scoops 1808 into the waste tank 1803.

As a result, the substrate 1821 behind the vessel contains less contaminate than substrate 1820 ahead of the vessel.

FIG. 18B illustrates a second particular implementation of a GPS navigated mobile remediation vessel 1850. The vessel 1850 includes several major components, including sparger array 1851 (see, e.g., FIG. 12), a CPCF tank 1852 coupled to the array 1851 via CPCF piping 1872 (which is insulated, e.g., vacuum insulated), a conveyor 1866, and waste tanks 1853A and 1853B (and associated conveyor 1854). The vessel 1850 is kept afloat by sponsons (e.g., adjustable buoyancy pontoons) 1868. In this perspective only one sponson is visible (i.e., the lee sponson), but in some implementations a second sponson (i.e., a starboard sponson) is provided as well. The CPCF tank 1852 may take many forms (e.g., a Dewar jar or akin to item 405 of FIG. 4) and be a variety of sizes (e.g., less than 50 gallons to more than 500 gallons).

The vessel 1850 may be unmanned and controlled remotely. A GPS antenna 1856 receives and transmits GPS-related navigational data for directing the craft. An RF receiver/transmitter 1857 transmits real-time data from infrared and optoacoustic sensors 1855 installed under each sparger manifold 1851. The RF receiver/transmitter 1857 may also receive signals that relate to the delivery of CPCF (e.g., flow rate). Alternatively, a controller (e.g., item 104 of FIG. 1) may receive data from the sensors 1855 and automatically control the remediation operation. The controller may be onboard the vessel 1850 or may be remote from it.

The sparger array 1851 delivers CPCF (shown as droplets 1869) onto the substrate 1870. This causes the substrate (e.g., an oil-water mixture) to increase in viscosity and become at least partially solid/semi-solid. The vessel 1850 travels substantially in the direction indicated by arrow 1874 due to, e.g., a diesel-powered jet drive 1867. Accordingly, front guide plates and ramps 1865 channel the substrate 1870 (which has become, e.g., a viscous agglomerate or solid phase due to exposure to CPCF) onto the conveyor 1866. The conveyor 1866 can be either passive or actively cooled. In implementations that utilize an actively cooled conveyor, the conveyor 1866 is coupled to the CPCF tank 1852 and dispenses CPCF through the conveyor belt. This maintains the viscosity of the substrate 1870, and may induce further phase changes (e.g., sequestration by lattice uptake). An actively cooled conveyor is discussed in greater detail in connection with FIG. 18C. The conveyor 1876 includes a drive system to move the belt, and the belt may be constructed of a metal mesh or some polymer or composite material capable of withstanding low temperatures (e.g., low temperature materials available from vendors of cryogenic supplies).

The conveyor 1866 carries the solid/semi-solid substrate 1870 toward a second conveyor 1854. Depending on the implementation, conveyor 1854 may be actively cooled. Conveyor 1854 deposits the substrate 1870 into primary waste tank 1853A, which in some implementations is sufficiently wide to encompass the width of the conveyor 1866. As the primary waste tank 1853A fills, its contents are transferred to the secondary waste tank 1853B (e.g., gravitationally transported or pumped).

As a result, the substrate 1871 behind the vessel contains less contaminate than substrate 1870 ahead of the vessel.

Figure 18C:
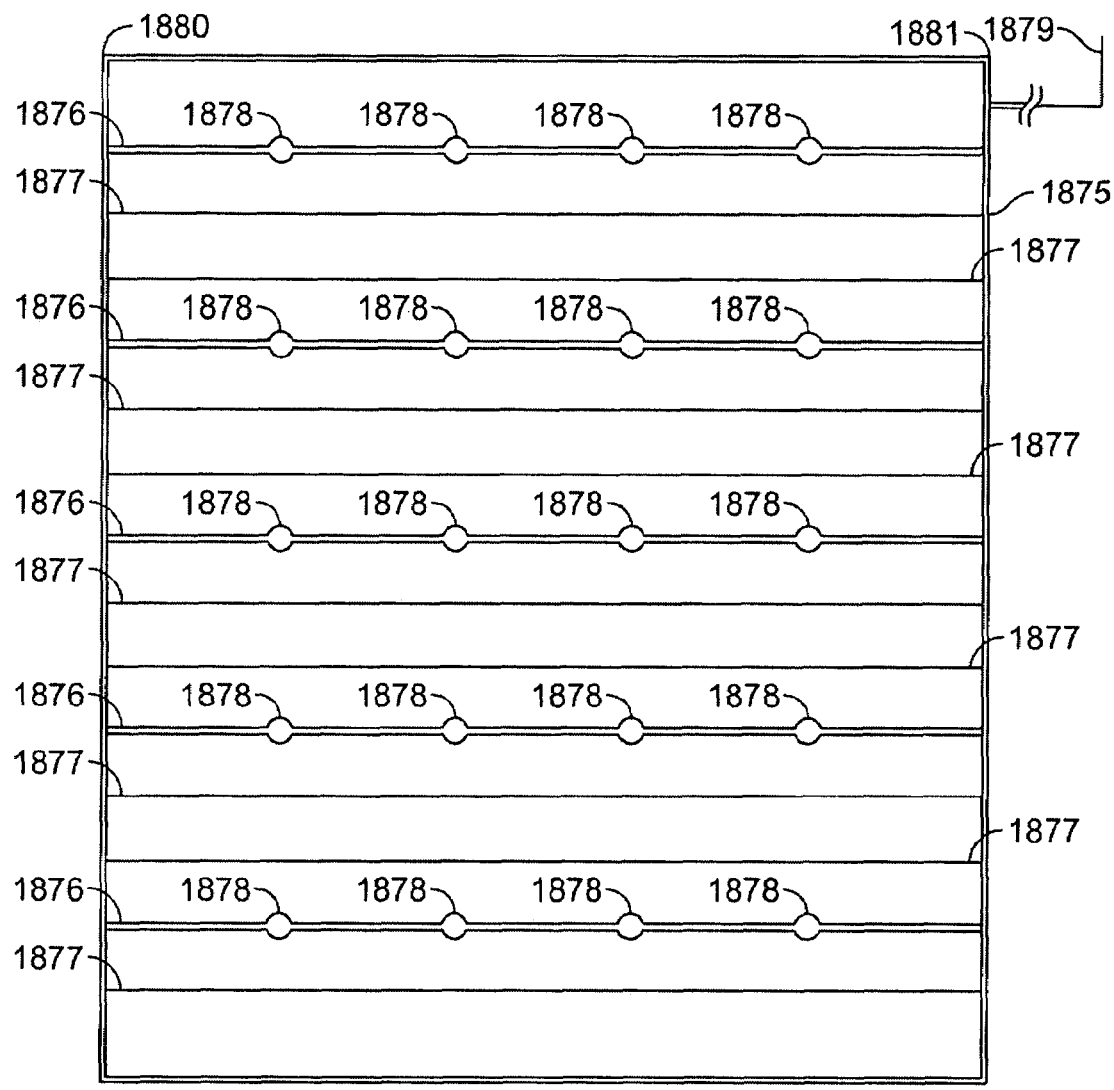
FIG. 18C illustrates an example of an apparatus for dispensing CPCF.
Figure 19A:
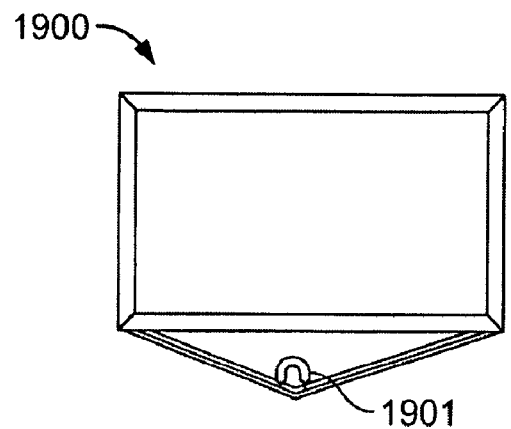
FIGS. 19A-19D illustrate an example of a waste tank.
Figure 19B:
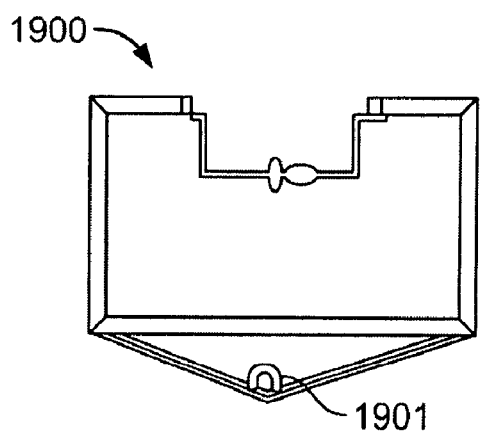
Figure 19C:
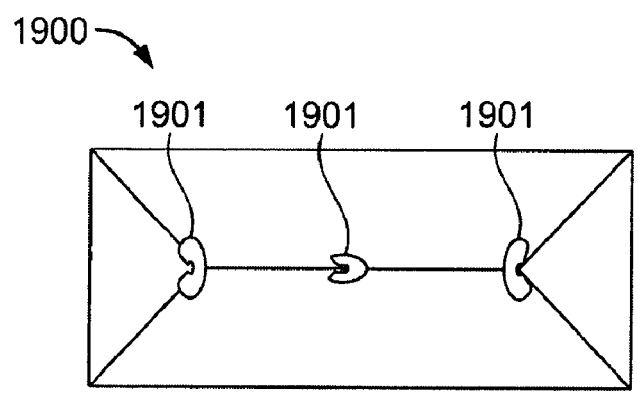
Figure 19D:
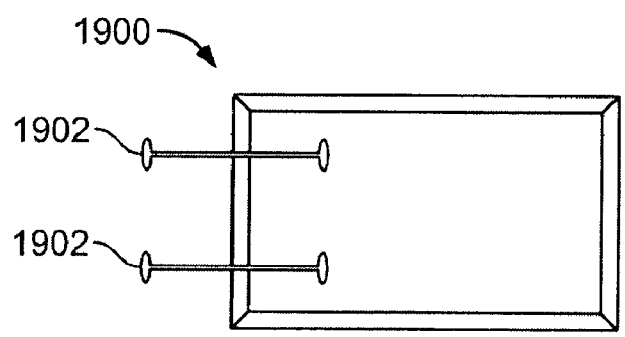

FIG. 18C depicts a section 1875 of an actively cooled conveyor belt. The belt includes side members 1880 and 1881. In between the side members 1880 and 1881 are at least two types of longitudinal members: cooling members 1876 and standard members 1877. The standard members are members that simply support what is being transported by the belt. The cooling members 1876 may take the form of or include CPCF dispensers 1878 (e.g., sparger bars, drip bars, etc) that dispense droplets of CPCF upon the material transported by the belt. Accordingly, the transported material is cooled as it travels on the belt.

Waste Tanks

FIGS. 19A-19D illustrate a rear view, front view, top view and side view, respectively, of a waste tank 1900. Tank 1900, in various sizes, is adaptable for use with all of the foregoing remediation vessels and apparatus. The tank 1900 is a modular bi-modal waste receptacle for intermediary storage of pollutant substrate (e.g., oil-ice-water mixed-phase) and separation of the aqueous and immiscible pollutant substrate phases. These waste receptacles, which may be available in various sizes, e.g., 500, 1,000, 2,500, or 5,000 gallons (volumetric capacity), are modular. In other words, they can be recycled/exchanged for empty replacement tanks (or directly emptied) at an on-site central hub (e.g., of FIG. 4) or at an on-shore pollutant waste storage tank. Modular waste receptacles are designed with a 'V'-shape and efflux valves 1901 to additionally function as a separatory funnel-like container for separation of water and oil (or other immiscible substrate) phases. Coupling bars 1902 are for attaching (or locking) the waste tank 1900 to the vessel.

Figure 20:
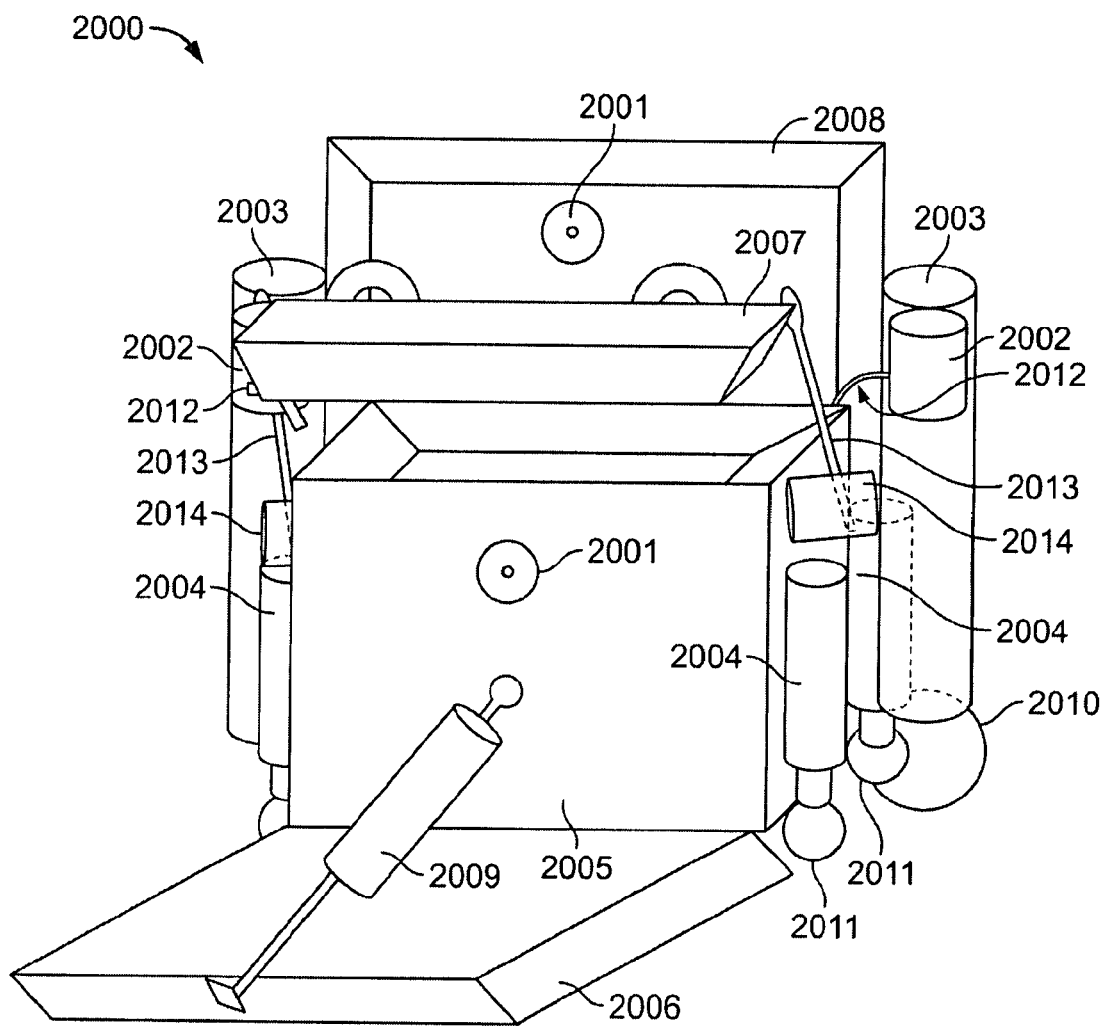
FIG. 20 illustrates an example of a remediation apparatus.

FIG. 20 illustrates a quarantine receptacle 2000 that may be used as a remediation device in and of itself, or may be used to quarantine a "dirty bomb" or terrorist device (e.g., item 1900) that is filled with CPCF to deactivate, contain, and/or sequester such devices or apparatus. The quarantine receptacle 2000 is constructed as a vacuum insulated container (e.g., that is steel, lead and composite layered), lined with non-reactive material for the cryogenic deactivation, sequestration, and quarantine of harmful incendiary, reactive chemical, biological, and/or radiological devices. The receptacle is operated by remote control (e.g., via transceivers 2001) in order to increase safety of personnel, and to minimize exposure to and harmful or toxic materials. A fork lift unit (having wheels 2010) transports the receptacle 2000 to the item to be quarantined. The receptacle 2000 is placed over a suspected harmful device (e.g., a waste tank 1900), and as the receptacle body 2005 is filled with CPCF (condensed liquid nitrogen or a liquefied inert gas, e.g., argon or helium) via CPCF lines 2012 which are coupled to CPCF cartridges 2002 located within the wheel lift assemblies 2003. The bottom plate 2006, which has a tapered edge, augmented with a narrow "plow-like" blade, is slid under the suspected device and locked into place using hydraulic cylinder 2009. Upon filling the receptacle with CPCF, the top plate 2007 is lowered into place (via arms 2013 coupled to hydraulic cylinders 2014), and locked, to seal and quarantine the suspected device. Bollide or ball-like wheels, or a tractor-tread unit or the like 2011 then drop down from assemblies 2004 and lock into place to facilitate transport of the receptacle 2000. The bottom 2006 and top plates 2007 are contoured, or stepped (in the manner of a safe) to effectively seal the unit 2000, and the entire process is operated remotely in some implementations. Links (sensors) 2001 to the remote controller are located on the front of the container, and the fork-lift unit 2008 (which moves via driven fork lift wheels 2010). The wheels 2001 are lowered automatically upon the locking of the top plate 2007 into place, or via remote control. Quarantine receptacles 2000 may be produced in a range of sizes and materials to deal with specific threats and security applications.

Phase Transitions

Figure 21:
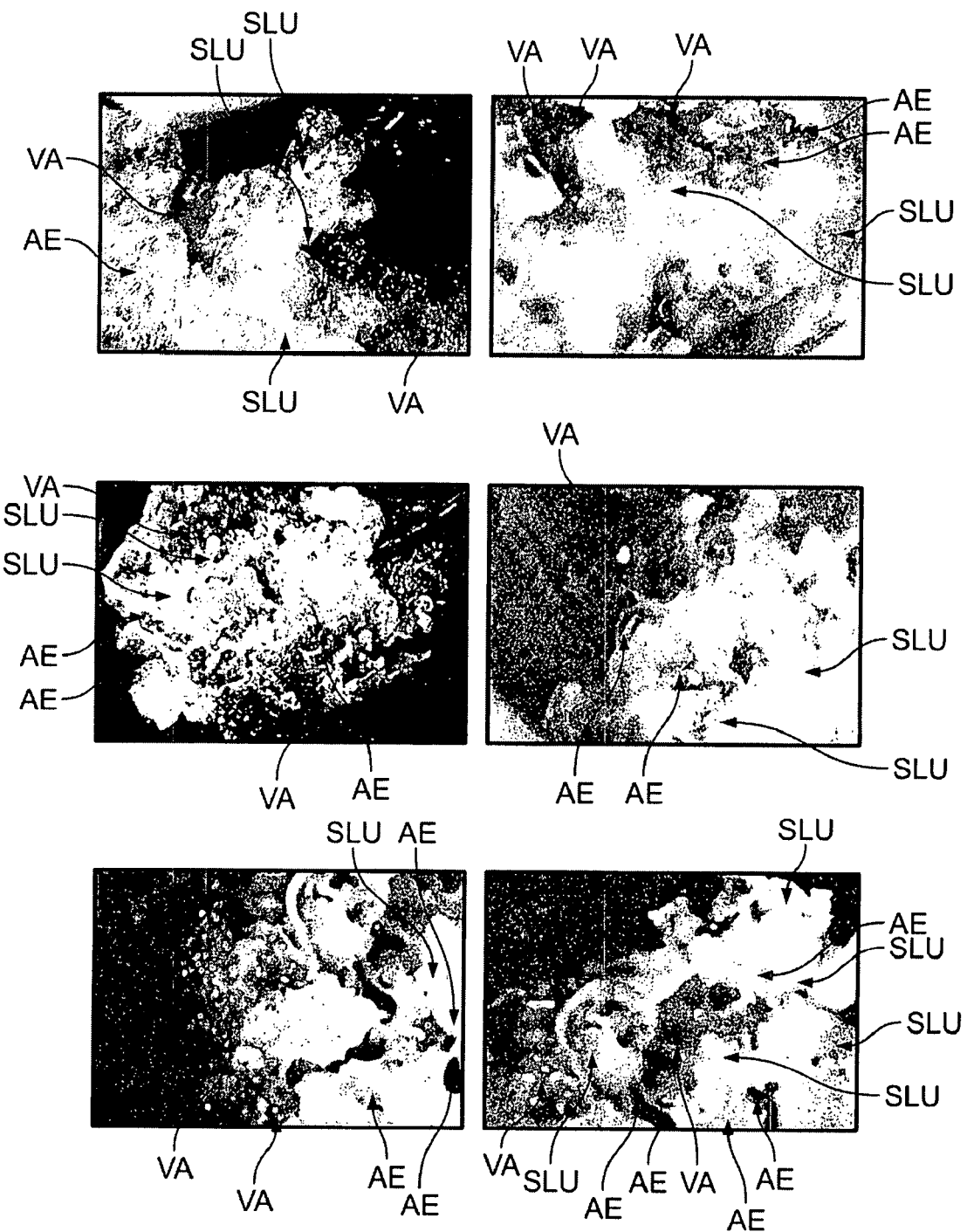
FIGS. 21 and 22 illustrate viscous agglomeration, accretion and encapsulation, and sequestration by lattice uptake.

FIG. 21 illustrates an example of a polluted substrate exposed to CPCF. In this example, the pollutant is oil. As shown, the substrate has transitioned into various stages of viscous agglomeration (identified by arrows marked VA), accretion and encapsulation (identified by arrows marked AE), and sequestration by lattice uptake (identified by arrows marked SLU).

Figure 22:
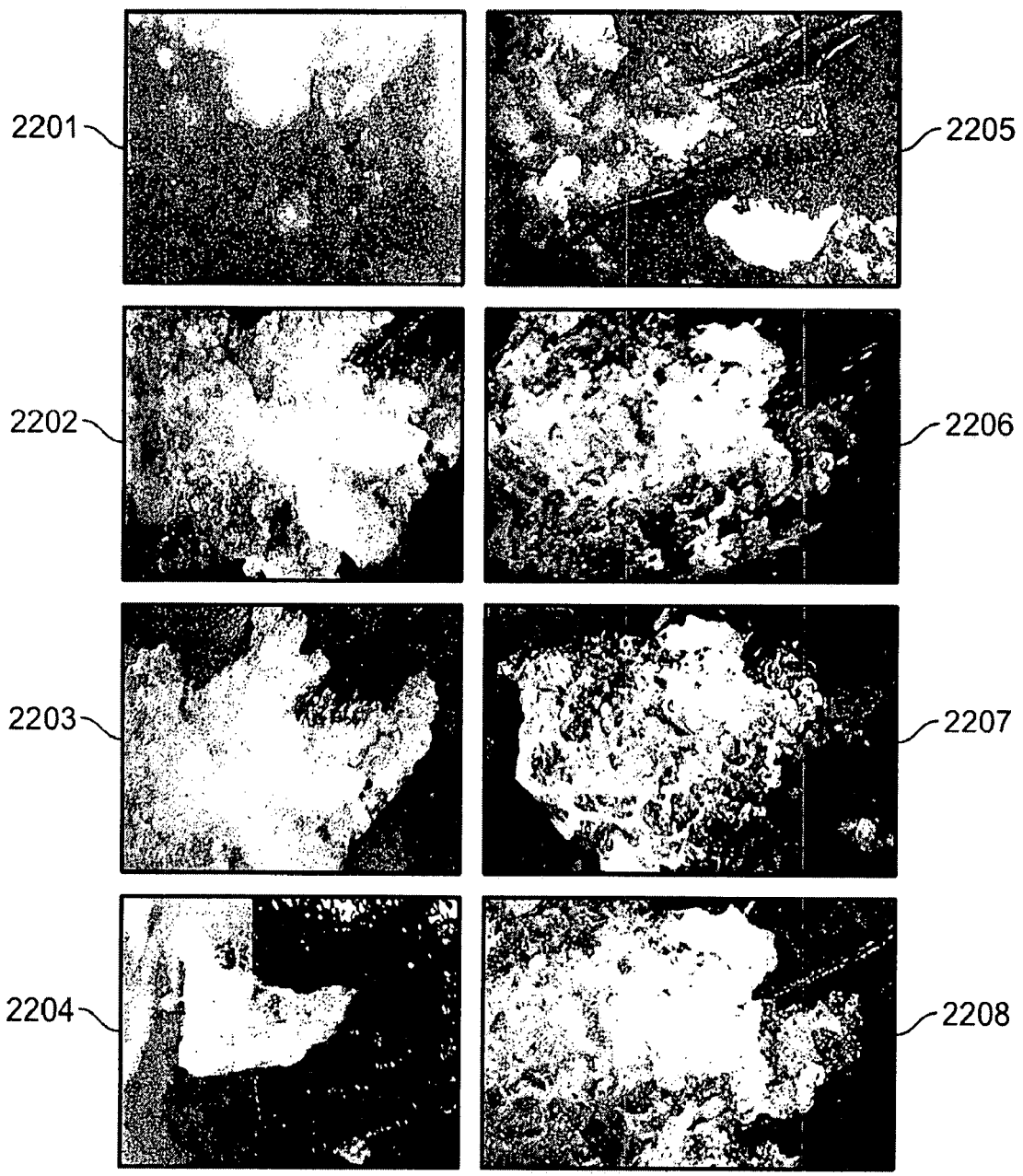

FIG. 22 illustrates examples of a polluted substrate transitioning through various stages (through slides 2201 through 2208) of viscous agglomeration, accretion and encapsulation, and sequestration by lattice uptake.

Other Applications

The delivery and distribution of condensed liquid-phase cryogenic fluids via the disclosed and related apparatus and methodology are also applicable in emergency situations, and in events associated with extreme hazards and potentially catastrophic results to a given community, or to the general populace. The prospective applications of this technology in the areas of national defense and homeland security are various, e.g., its use as a functional component in strategic response plans that deal with specific cases of nuclear, chemical, and biological threats. This disclosure provides the capacity to afford potentially important and life-saving contributions in that regard. For example, liquid phase cryogens, e.g., condensed phases of liquefied nitrogen (LN), helium (LHe), argon (LAr), and other non-reactive or inert gases, can be used in emergency situations and potentially catastrophic circumstances, at the site of a hazardous spill of reactive chemicals, flammable or combustible liquids, and/or noxious or toxic waste; additionally, condensed phase cryogenic fluids can be used in homeland security operations to effect: a reduction in the rate of dispersion of chemical, biological, or radioactive materials, a reduction in the risk to personnel engaged in the dis-arming of devices that pose a nuclear, chemical, or biological threat, and a reduction in the potential for detonation of such devices and/or release of the hazardous materials they may contain; to affect the cytolysis (lethality) and/or diminish the replication rate of hazardous biological agents (e.g., bacteria, viruses); as well as to reduce the reactivity of harmful chemicals or chemically reactive agents, to lower the flashpoint of a flammable substrate or explosive, for transient containment of a nuclear device or radioactive materials (e.g., an un-detonated "dirty bomb"), and/or to remediate the products of such a chemical or biological attack.

Environmental Impact

Some implementations are consistent with a new or higher standard of environmental consciousness, i.e., one that: a) affects the environment less and/or remains neutral or inert in its interactions with the environment; b) iterates a standard, defines the criteria for compliance, and sets boundary conditions for environmentally-neutral technologies, processes for development, extraction of natural resources, and operations relating to environmental clean-up and remediation; c) establishes clear and functionally viable protocols for environmentally-neutral technologies, along with goals and time frames for discrete levels of attainment, and guidelines that enable and encourage compliance with such highly beneficial but more restrictive standards.

Some implementations that rely on the use of CPCF are held to a standard of "environmental-neutrality," and are described as being "environmentally-neutral" remediation systems—where "environmental-neutrality" relates to a standard for environmental clean-up and remediation, and the term "environmentally-neutral" relates to (or classifies) a technology or remediation operation that neither employs as an active agent in any clean-up process or remediation operation, nor transports to the spill site or remediation environment for use as such an active agent, any material that is not natural or "normal" to (e.g., normally found in), and/or already present in that environment or ecosystem. "Environmental-neutrality" can provide a clear and measurable basis for accurately describing the class of all "environmentally-neutral" technologies, and/or to quantify precisely the degree of compliance or level of environmental-neutrality attained. In addition to its determinable property of neutrality (or inertness) and its high level of environmental-consciousness, it is this ability to quantitatively assess and evaluate a given technology or process, precisely, in terms of the absence of its interaction with the environment (neutrality) or the lack thereof, that distinguishes and differentiates some implementations from those conventionally described as being "environmentally-friendly," or those that maintain a sufficient level of environmental consciousness to be referred to as being "green (or blue) technologies."

Other criteria often cited regarding environmental clean-up and remediation operations, e.g., in the environmental literature, by regulatory agencies, and/or in protocols for technological processes, per se, include "sustainability" and the goals (and suggested guidelines) for "sustainable development." "Environmental sustainability" relates to the ability of the environment to continue to function properly indefinitely. The term "sustainable development" relates to a standard which, as defined by the United Nations Brundtland Commission (1987, led by the former Norwegian Prime Minister Gro Harlem Brundtland) and promulgated by the U.N. Division for Sustainable Development (UN-DESA, 2007), additionally includes social and economic concerns, and promotes development that "meets the needs of the present without compromising the ability of future generations to meet their own needs."

Some implementations may signal a new state-of-the-art in environmental remediation, as those implementations that employ CPCF as the active agent in an environmental clean-up or remediation process are environmentally-neutral, and are orders of magnitude faster and more effective than other remediation methods. Such implementations are also consistent with (and/or incorporate) the principles and criteria of "environmental sustainability" since these CPCF based implementations and applications act to minimize environmental degradation due to spills of oil and/or other pollutants or toxic/noxious wastes. These implementations may employ CPCF to capture and remove these spilled substrates and their degradation products, and the resultant environmentally-neutral remediation acts to halt/reverse the degradation processes at that spill site.

With particular regard to some implementations' production and use of CPCFs, liquefied air or LN are environmentally-neutral and are neither xenotrophs (e.g., substances foreign to, or not naturally found in, the given environment), nor have any polluting or contaminating long- or short-term impact on the environment, nor yield any negative residual effect(s). This is because, for example, nitrogen comprises about 78% of air, on average, with oxygen about 21%, and the total of argon, carbon dioxide, helium, NOx, SOx, etc., being <1%. Moreover, the liquefication and/or production of CPCF is temporary and, e.g., subsequent to its use as active agent in the cryogenically induced remediation processes, the CPCF evaporates, and is naturally returned to the environment in its ambient gas (or vapor) state, while leaving the remediated substrate (or pollutant waste) contained and stored in a condensed state (solid and/or liquid).

Efficiency Compared with Other Approaches

The following is a brief overview of the efficiency of an implementation of a remediation approach that utilizes CPCF (i.e., consistent with the disclosure herein) as compared to other approaches that do not utilize CPCF.

Efficiency of the Exxon Valdez Cleanup Utilizing Non-CPCF Remediation

The Exxon Valdez left the Alyeska Pipeline Terminal at 9:12 p.m., Alaska Standard Time, on Mar. 23, 1989. The 987 ft ship was loaded with 53,094,510 gallons (1,264,155 barrels) of North Slope crude oil bound for Long Beach, Calif. Less than three hours later, the Exxon Valdez collided and was grounded at Bligh Reef, rupturing 8 of its 11 cargo tanks, some 10.8 million gallons of crude oil were spewing into Prince William Sound. Computations aboard the Exxon Valdez showed that 5.8 million gallons had gushed from the tanker in the first 3¼ hours. Weather conditions at the site were reported as being at a temperature of 33° F., with slight drizzle of mixed rain/snow, north winds at 10 knots, and a visibility 10 miles at the time of the grounding. The waters of Prince William Sound, and eventually more than 1,000 miles of beach in Southcentral Alaska, would be fouled by a spill of 10.8 million gallons of crude oil. Three years after the spill, in 1992, the Coast Guard declared the cleanup complete. While, to this day, some claim there are still observable quantities of oil in the effected area, and while many environmental problems remain, and wildlife are still recovering from this disaster, assume, arguendo, for the purpose of computing a rough estimate of the clean-up and remediation efficiency of the spill, that the total 10.8 million gallons was remediated in the stated 3 years. Also assume for the purpose of this estimate, that the remediation operation was running 7 days per week and averaged 10 hours/day over this period (ignoring seasonal variabilities in daylight working hours and the effects of the Alaskan weather). Published reports indicate that the total workforce consisted of about 11,000 Alaskan residents, along with Exxon employees, and private contractors brought in to assist in the clean-up operation Thus, it can be very roughly estimated that:

Thus (By Assumption 1):

Total Remediation Time=10 hr/day×365 day/yr×3 yr=10,950 hr and 10.8×10$^6$ (or 10.8 million) gal÷10,950 hr=986 gal/hr or 10.8×10$^6$ gal±42 gal/bbl÷10,950 hr=23.48 bbl/hr If it is assumed that this total workforce was actively performing duties in the clean-up of the oil-spill at any given time, then the average hourly rate, or amount of oil removed per hour by each worker is:

986 gal/hr÷11,000 workers=0.0896 or ≈0.1 gal/hr/worker=2.38×10$^{-3}$ bbl/hr/worker If it is assumed (at the other extreme) that only about 1 out of every 10 workers (or ⅒$^{th}$ of this workforce) was working at any given time, then the average hourly rate per worker for the clean-up of the Exxon Valdes spill as:

986 gal/hr÷1,100 workers=0.896 or ≈1 gal/hr/worker=2.38×10$^{-2}$ bbl/hr/worker

Efficiency of the Puget Sound Cleanup Utilizing Non-CPCF Remediation

In October 2004, more than 1,000 gallons of crude oil was spilled into the Dalco Passage of the Puget Sound, a channel between Tacoma and Vason, Wash., from a (then) unknown source. In December 2004, oil sample tests, independently conducted by both state and federal laboratories, indicated that a Polar Texas oil tanker, owned by Conoco-Phillips, was the source of the spilled oil that soiled beaches around Dalco Passage. The cleanup costs drew, inter alia, upon nearly $2 million from federal and state oil spill contingency funds. Countering claims that that remediation of the spill had been completed effectively, in a Dec. 23, 2004 press release, Rear Admiral Jeffrey Garrett of the U.S. Coast Guard (USCG) indicated that there was "more work to do" before determining the actual cleanup rate, the overall effectiveness of the remediation effort, and "what enforcement action, if any, to take." Cleanup operations extended through January 2005 (without any clear consensus as to its actual completion or the criteria for determination of its success). For purposes of this analysis, in order to minimize the time for remediation of this oil spill, consider only the earliest claims for completion of the clean-up: the dates of Dec. 23, 2004, and Jan. 15, 2005. Thus, here consider that ≦1,000 gallons of oil (and oil-water mixtures) was been cleaned-up in a time period estimated as being either 84 or about 116 days. Assume that clean-up and remediation efforts proceeded on a daily basis, and an average of 8-10 hours/day.

Thus, for the October 2004, Dalco Passage (Conoco-Phillips) spill, where the source of ≈1,000 gallons of spilled crude oil impacted the Puget Sound, Dalco Passage, and coastline (coastal rocks and beaches) in the Tacoma and Vason, Wash. area, from the USCG and EPA databases (see, e.g., www.epa.gov/oilspill/pdfs/0107update.pdf) the most and least favorable estimates for the remediation times and efficiencies of ≈1,000 gal of crude oil, degradation products, and water-oil mixtures, respectively, in ≈84 or ≈116 days (normalized to 8 hr/day actual clean-up work schedule) as follows:

Maximum Efficiency:

1,000 gal oil÷84 days=11.905 gal/day (i.e. per daily work period)

→1,000 gal oil÷8 hr/day×84 days=1.488 gal/hr (average) or considering 10 hr/day work periods:

1,000 gal oil÷10 hr/day×84 days=1.19 gal/hr (average)

Alternately, taking the clean-up period ≈116 days (assuming likewise 8-10 hr/day work periods)

Minimum efficiency estimates for the remediation of 1,000 gal of oil are:

1,000 gal oil÷116 days=8.62 gal/day (i.e. per daily period)

→1,000 gal oil÷8 hr/day×116 days=1.078 gal/hr or considering 10 hr/day work periods:

1,000 gal oil÷10 hr/day×116 days=0.86 gal/hr

Efficiency of a CPCF-Based Cleanup Apparatus

It is instructive to compare the clean-up rates estimated above for the case of the 1989 Exxon-Valdes spill and from USCG and the EPA findings in the case of the October 2004 Puget Sound spill, with those clean-up and/or remediation rates for crude oil, computed by computational/analytic testing ("testing") of CPCF-based remediation apparatus. Measurements and data as to clean-up rates (e.g., for crude and processed oils, and other non-polar or immiscible chemicals and pollutants) and remediation efficiencies are determined in terms of the times required for remediation of ≧99% of the spill substrate. This testing further considered other criteria, including the monitoring of water quality issues, e.g., attaining potable water quality subsequent to remediation, and maintaining a standard of "environmental-neutrality." Analyses were also conducted for assessment of ratios of oil-to-ice-to-water for each type of oil or other immiscible substrate tested. Additional concerns include measurements based on initial spill, water, and environmental conditions, e.g., air vs. water temperatures, relative viscosities and molecular composition of the spilled substrates, presence of volatiles, flammables/combustibles, reactive chemicals, and biological materials (non-harmful protists, algal cells, etc.), as well as with case-specific materials for use in applications (e.g., stainless steel, alloys, silicon carbide, polyethylene and other polymers, composites, etc.) and the composition of the CPCF (e.g., liquefied air, liquefied nitrogen or helium or argon, etc.) to be used for specific applications in cryogenically inducing the state(s) of viscous agglomeration, accretion and encapsulation, and/or sequestration via lattice uptake.

Testing considers a range of marine and freshwater samples (e.g., varying in turbidity, salinity, pH, detrital organic matter (DOM, DOC), algal, phyto- and zooplankton population dynamics), and including samples from seawaters, brackish and estuarine systems, rivers, lakes, streams and tributaries, tap, well, and distilled waters, tested over temperatures ranging from 0-45° C., and pressures from ≈0.5-3 bar. However the variation in such properties does not, in most cases, substantial alter mean values.

Testing was performed, e.g., using a simple handheld sparging system (an example of one type of a handheld sparging system is illustrated in FIG. 13), under conditions that are most consistent with (or least dissimilar to) the properties of the spilled oil, and where comparative data is the mean value (or average) computed from a minimum of 3 runs in cleaning-up or remediating the same (or highly similar) type of oil (or other substrate) in order to assure a valid and accurate basis for comparison with those rates, efficiencies, and/or results published or otherwise promulgated as pertaining to such past spills. As in the case of Puget Sound (Dalco Passage) crude oil spill, testing was normalized to 8-10 hr work periods, and generated results and/or ranges of:

For crude oil #1, #2, and motor oils 5, 10, 20, 30 W, and 5-20 W, 10-30 W blends
Class-1, Average Remediation Rate: ≈27.86 gal/hr/worker →27.86 gal/hr/worker×8 hr/day=222.88 gal/day/worker For crude oil #3, 50 W, 20-50 W motor oil, ≧90 W gear, hydraulic, vacuum pump oils
Class-2, Average Remediation Rate Range: ≈19.84-22.78 gal/hr/worker →19.84 gal/hr/worker×8 hr/day=158.72 gal/day/worker →22.78 gal/hr/worker×8 hr/day=182.24 gal/day/worker For processed vegetable oils (soybean, corn, olive, safflower)
Class-3, Average Remediation Rate Range: ≈17.22-23.63 gal/hr/worker →17.22 gal/hr/worker×8 hr/day=137.76-189.04 gal/day/worker →23.63 gal/hr/worker×8 hr/day=137.76-189.04 gal/day/worker For processed mineral oils
Class-4, Average Remediation Rate: ≈25.03 gal/hr/worker →25.03 gal/hr/worker×8 hr/day=200.24 gal/day/worker For synthetic "racing" oils with high performance over high/low temperature/viscosity ranges
Class-5, Average Remediation Rate: ≈8.5 gal/hr/worker →8.5 gal/hr/worker×8 hr/day=68 gal/day/worker Thus, the performance of CPCF based technology in comparison with the Exxon-Valdes clean-up operation shows, respectively, for the full workforce (>11,000, as declared) and for $1/10^{th}$ of the workforce (1,100), averaging 8-10 hr/day work periods:

Exxon Average: ≈0.1 gal/hr/worker (1,100 workers)

→0.1 gal/hr/worker×8 hr/day=0.8 or <1 gal/day/worker

→0.1 gal/hr/worker×10 hr/day=1 gal/day/worker

Exxon Average: 0.896 or ≈1 gal/hr/worker (11,000 workers)

→0.896 gal/hr/worker×8 hr/day=7.2 gal/day/worker

→0.896 gal/hr/worker×10 hr/day=8.96 or ≈9 gal/day/worker vs.

CPCF Method—Average rate for clean-up and remediation of crude oil #1, and/or #2:

≈27.86 gal/hr/worker→≈222.88 gal/day/worker or comparatively the CPCF technology shows capacity for out-performing the Exxon-Valdes clean-up rate by:

222.88 gal/day/worker÷1 gal/day/worker=222.88× or 22,288%

222.88 gal/day/worker÷7.2 gal/day/worker=30.95× or 3,095%

222.88 gal/day/worker÷8.96 gal/day/worker=24.875× or 2,487%

Therefore, crediting the Exxon-Valdes clean-up with operating 365 days/year and 8-10 hr/day, the CPCF technology, using, e.g., a handheld device with a single 8 inch long CPCF sparging unit, shows the capacity for out-performing the Exxon-Valdes method at a rate of over 222 times faster (if Exxon's full workforce was operating daily), and by approximately 25-30 times faster (if only $1/10^{th}$ of Exxon's full workforce was operating daily) and with a relative efficiency increase (performance advantage) in the CPCF technology of:

(222.88 gal/day/worker−1 gal/day/worker)÷1 gal/day/worker=221.88× or 22,188%

(222.88 gal/day/worker−7.2 gal/day/worker)÷7.2 gal/day/worker=29.95× or 2,995%

(222.88 gal/day/worker−8.96 gal/day/worker)÷8.96 gal/day/worker=23.875× or 2,387%

Next, the performance of CPCF based technology in comparison with the clean-up operation of the October 2004 Puget Sound oil-spill shows:

CPCF Method—Maximum rate for clean-up and remediation of crude oil #1, and/or #2:

≈27.86 gal/hr/worker→≈222.88 gal/day/worker vs.
Puget Sound (Dalco Passage)—Maximum rate, clean-up/remediation of crude oil (type=?):

1.488 gal/hr/worker→11.905 gal/day/worker (84 day estimate)

1.078 gal/hr/worker→8.62 gal/day/worker (116 day revised estimate)

Likewise a comparative analysis of clean-up or remediation rates, and the performance advantage (relative increase in efficiency) shows the CPCF based technology has the capacity to out-perform the method employed in the Puget Sound (Dalco Passage) spill, operating 8-10 hr/day and 7 days/week and shows for the 84 day clean-up:

222.88 gal/day÷11.905 gal/day=1,872% or 18.72× faster

→CPCF Technology has capacity for remediation of crude oil at a rate of 18.72 times or 1,872% faster than the method employed in the Puget Sound remediation operation (if completed in 84 days)

and with a relative efficiency increase (performance advantage) in the CPCF technology of:

(222.88 gal/day−11.905 gal/day)÷11.905 gal/day=1,772% or 17.723× as effective

Now, considering the revised rate of clean-up/remediation for Puget Sound, with a completion time of 116 days, the CPCF rate is higher by:

222.88 gal/day÷8.62 gal/day=2,586% or 25.856× faster with a relative efficiency increase (performance advantage) in the CPCF technology of:

(222.88 gal/day−8.62 gal/day)/8.62 gal/day=2,486% or 24.856× as effective

The data may be summarized as follows:

TABLE 1

CPCF REMEDIATION RATES vs. EXXON-VALDES (1989) AND PUGET SOUND (2005) SPILLS, AND AVERAGE PUBLISHED RATES

| REMEDIATED SUBSTANCE | RATE: CPCF | RATE: EXXON-VALDES SPILL | RATE: PUGET SOUND SPILL | RATE: AVG PUBLISHED |
|---|---|---|---|---|
| Class-1: Crude Oils #1, #2; Motor Oils: 5, 10, 20, 30 W; Blends: 5-20 W, 10-30 W | 27.86 gal/hr (per worker) | ≦1.0 gal/hr (per worker) | 1.078-1.488 gal/hr (per worker) | 4-4.5 gal/hr (per worker) |
| Class-2: Crude Oil #3; Motor Oils: 50 W Blends: 20-50 W | 19.84-22.78 gal/hr (per worker) | N/A | N/A | 4-4.5 gal/hr (per worker) |
| Class-3: Vegetable Oils: Corn, Soy, Olive, Safflower | 17.22-23.62 gal/hr (per worker) | N/A | N/A | ≦3.25 gal/hr (per worker) |
| Class-4: Mineral Oils | 25.03 gal/hr (per worker) | N/A | N/A | N/A |
| Class-5: Synthetic Oils | 8.5 gal/hr (per hour) | N/A | N/A | N/A |

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

A number of implementations have been described. Nevertheless, it will be understood that various modifications may be made without departing from the spirit and scope of the invention. Accordingly, other implementations are within the scope of the claims.

What is claimed is:

1. A system for remediating an immiscible pollutant comprising:
   a cryogenic fluid source adapted for providing a condensed-phase cryogenic fluid;
   a cryogenic fluid transport structure coupled to the cryogenic fluid source adapted for transporting the cryogenic fluid;
   a low pressure applicator coupled to the cryogenic fluid transport structure adapted for dispensing the cryogenic fluid in a substantially condensed phase, wherein the low pressure applicator comprises a drizzle bar comprising at least one hole array;
   a collector adapted for capturing at some of the immiscible pollutant after exposure to the cryogenic fluid; and
   a storage structure, coupled to the collector, adapted for storing the immiscible pollutant.

2. The system of claim 1 wherein the cryogenic fluid is liquefied nitrogen.

3. The system of claim 1 wherein the cryogenic fluid is liquefied air.

4. The system of claim 1 wherein the cryogenic fluid is liquefied helium.

5. The system of claim 1 wherein the cryogenic fluid source comprises a multistage compressor.

6. The system of claim 1 wherein the cryogenic fluid source comprises a cascade liquefaction system.

7. The system of claim 1 wherein the cryogenic fluid source comprises a pump to pressurize the cryogenic fluid transport structure.

8. The system of claim 1 wherein the cryogenic fluid source comprises a vacuum flask.

9. The system of claim 1 wherein the cryogenic fluid transport structure is vacuum insulated.

10. The system of claim 1 wherein the cryogenic fluid transport structure comprises a valve to control the rate of cryogenic fluid transport to the low pressure applicator.

11. The system of claim 1 wherein the pressure of cryogenic fluid within the cryogenic fluid transport structure is less than about 50 psi.

12. The system of claim 1 wherein the cryogenic fluid transport structure comprises a pressure relief valve.

13. The system of claim 1 wherein the cryogenic fluid transport structure comprises a keepfull.

14. The system of claim 1 wherein the low pressure applicator dispenses the cryogenic fluid at about atmospheric pressure.

15. The system of claim 1 wherein the at least one hole array comprises holes having a diameter equal to or greater than about 0.1 millimeters.

16. The system of claim 1 comprising:
one or more sensors disposed proximate to the immiscible pollutant adapted to generate one or more data signals;
a controller coupled to the sensors, cryogenic fluid source and cryogenic fluid transport structure, wherein the controller is adapted to control any of the cryogenic fluid source or cryogenic fluid transport structure in response to the one or more data signals.

17. The system of claim 16 wherein the one or more sensors includes an infrared sensor.

18. The system of claim 16 wherein the one or more sensors includes an optoacoustic sensor.

19. The system of claim 16 wherein the one or more sensors includes a temperature sensor.

20. The system of claim 16 wherein the controller is adapted to adjust the fluid flow rate through the cryogenic fluid transport structure.

21. The system of claim 1 wherein the cryogenic fluid transport structure comprises one or more pressure release valves adapted to open at a predetermined threshold pressure.

22. The system of claim 1 wherein the low pressure applicator and cryogenic fluid transport structure are arranged such that the cryogenic fluid does not reach its saturation point within the fluid transport structure.

23. The system of claim 1 wherein the pressure within the low pressure applicator is at approximately atmospheric pressure.

24. The system of claim 1 wherein the low pressure applicator dispenses cryogenic fluid in droplets.

25. A system for remediating an immiscible pollutant comprising:
a cryogenic fluid source adapted for providing a condensed-phase cryogenic fluid;
a cryogenic fluid transport structure coupled to the cryogenic fluid source adapted for transporting the cryogenic fluid;
a low pressure applicator coupled to the cryogenic fluid transport structure adapted for dispensing the cryogenic fluid in a substantially condensed phase;
a collector adapted for capturing at some of the immiscible pollutant after exposure to the cryogenic fluid;
a storage structure, coupled to the collector, adapted for storing the immiscible pollutant;
one or more sensors disposed proximate to the immiscible pollutant adapted to generate one or more data signals; and
a controller coupled to the sensors, cryogenic fluid source and cryogenic fluid transport structure, wherein the controller is adapted to control any of the cryogenic fluid source or cryogenic fluid transport structure in response to the one or more data signals, wherein the controller is adapted to adjust the fluid flow rate through the cryogenic fluid transport structure.

26. The system of claim 25 wherein the low pressure applicator comprises a drizzle bar comprising at least one hole array.

27. The system of claim 25 wherein the cryogenic fluid is liquefied nitrogen.

28. The system of claim 25 wherein the cryogenic fluid transport structure comprises a valve to control the rate of cryogenic fluid transport to the low pressure applicator.

29. The system of claim 25 wherein the pressure of cryogenic fluid within the cryogenic fluid transport structure is less than about 50 psi.

30. The system of claim 25 wherein the cryogenic fluid transport structure comprises a pressure relief valve.

31. The system of claim 25 wherein the cryogenic fluid transport structure comprises a keepfull.

32. The system of claim 25 wherein the low pressure applicator dispenses the cryogenic fluid at about atmospheric pressure.

33. The system of claim 26 wherein the at least one hole array comprises holes having a diameter equal to or greater than about 0.1 millimeters.

34. The system of claim 25 wherein the one or more sensors includes an infrared sensor.

35. The system of claim 25 wherein the cryogenic fluid transport structure comprises one or more pressure release valves adapted to open at a predetermined threshold pressure.

36. The system of claim 25 wherein the low pressure applicator and cryogenic fluid transport structure are arranged such that the cryogenic fluid does not reach its saturation point within the fluid transport structure.

37. The system of claim 25 wherein the pressure within the low pressure applicator is at approximately atmospheric pressure.

38. The system of claim 25 wherein the low pressure applicator dispenses cryogenic fluid in droplets.

39. The system of claim 25 wherein the low pressure applicator comprises a sparger bar.

40. The system of claim 39 wherein the sparger bar is constructed of a sintered metal.

41. The system of claim 40 wherein the metal comprises brass, bronze or stainless steel.

42. The system of claim 39 wherein the sparger bar is constructed of a sintered composite.

43. The system of claim 39 wherein the sparger bar is constructed of a sintered material comprising silicon carbide.

44. The system of claim 39 wherein the mean porosity of the sparger bar is between about 1 micron and 10 microns.

45. The system of claim 25 wherein the low pressure applicator comprises a spray bar comprising at least one nozzle.

46. The system of claim 45 further comprising means for adjusting an aperture size of at least one nozzle.

* * * * *

UNITED STATES PATENT AND TRADEMARK OFFICE
CERTIFICATE OF CORRECTION

PATENT NO. : 7,604,732 B2  Page 1 of 1
APPLICATION NO. : 11/839077
DATED : October 20, 2009
INVENTOR(S) : Ronald De Strulle It is certified that error appears in the above-identified patent and that said Letters Patent is hereby corrected as shown below:

Column 40
Line 29, after "at" insert -- least --.

Column 41
Line 63, after "at" insert -- least --.

Signed and Sealed this

Sixth Day of April, 2010

David J. Kappos
*Director of the United States Patent and Trademark Office*